US 9,986,086 B2

(12) United States Patent
Kim

(10) Patent No.: US 9,986,086 B2
(45) Date of Patent: May 29, 2018

(54) MOBILE TERMINAL AND METHOD OF OPERATING THE SAME

(71) Applicant: SAMSUNG ELECTRONICS CO., LTD., Suwon-si (KR)

(72) Inventor: Yun-jung Kim, Seongnam-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days. days.

(21) Appl. No.: 14/800,103

(22) Filed: Jul. 15, 2015

(65) Prior Publication Data

US 2016/0036965 A1 Feb. 4, 2016

(30) Foreign Application Priority Data

Jul. 31, 2014 (KR) .................. 10-2014-0098643
Nov. 11, 2014 (KR) .................. 10-2014-0156242
Jun. 2, 2015 (KR) .................. 10-2015-0078247

(51) Int. Cl.
*H04M 1/725* (2006.01)
*G06F 3/01* (2006.01)
(Continued)

(52) U.S. Cl.
CPC ........ *H04M 1/72577* (2013.01); *G06F 3/017* (2013.01); *H04M 1/67* (2013.01);
(Continued)

(58) Field of Classification Search
CPC .... H04M 1/72577; G06F 3/017; H04W 4/005
See application file for complete search history.

(56) References Cited

U.S. PATENT DOCUMENTS 7,202,773 B1    4/2007  Oba et al.
7,378,939 B2 *  5/2008  Sengupta ............... H04M 1/67
                                                       340/5.53
(Continued)

FOREIGN PATENT DOCUMENTS

EP    2 428 869 A1    3/2012
EP    2 600 319 A1    6/2013
(Continued)

OTHER PUBLICATIONS

Communication dated Nov. 13, 2015 issued by the International Searching Authority in counterpart International Application No. PCT/KR2015/007837 (PCT/ISA/220/210/237).
(Continued)

*Primary Examiner* — Kamran Afshar
*Assistant Examiner* — Minjung Kim
(74) *Attorney, Agent, or Firm* — Sughrue Mion, PLLC

(57) ABSTRACT

A mobile terminal and a method of operating the mobile terminal are provided. The mobile terminal includes a sensor configured to sense a motion of the mobile terminal, and a communication interface configured to receive, from a wearable device corresponding to the mobile terminal, information of a motion of the wearable device, the motion of the wearable device being sensed during a time period from a start time requested by the mobile terminal. The mobile terminal further includes a controller configured to determine whether the motion of the mobile terminal and the motion of the wearable device have a correlation of a level or greater, and unlock the mobile terminal, in response to the controller determining that the motion of the mobile terminal and the motion of the wearable device have the correlation of the level or greater.

22 Claims, 49 Drawing Sheets

(51) Int. Cl.
*H04M 1/67* (2006.01)
*H04W 4/00* (2018.01)

(52) U.S. Cl.
CPC ......... *H04M 1/7253* (2013.01); *H04W 4/005* (2013.01); *H04M 2250/12* (2013.01)

(56) References Cited

U.S. PATENT DOCUMENTS

| | | | |
|---|---|---|---|
| 8,364,167 B1 * | 1/2013 | Sylvain | H04W 4/023 455/456.1 |
| 8,620,841 B1 * | 12/2013 | Filson | H04L 12/1895 706/12 |
| 8,904,479 B1 * | 12/2014 | Johansson | G06F 21/36 382/181 |
| 9,152,309 B1 * | 10/2015 | Arrehn | G06F 3/04845 |
| 2007/0188323 A1 * | 8/2007 | Sinclair | G06F 21/445 340/568.1 |
| 2007/0213045 A1 | 9/2007 | Hermansson et al. | |
| 2009/0153342 A1 | 6/2009 | Thorn | |
| 2011/0018731 A1 | 1/2011 | Linsky et al. | |
| 2011/0183706 A1 | 7/2011 | Jung et al. | |
| 2012/0062381 A1 * | 3/2012 | Liu | G01S 11/06 340/572.1 |
| 2012/0064951 A1 | 3/2012 | Agevik et al. | |
| 2013/0045774 A1 | 2/2013 | Arat | |
| 2013/0057496 A1 | 3/2013 | Hong et al. | |
| 2013/0282815 A1 | 10/2013 | Du | |
| 2014/0155031 A1 | 6/2014 | Lee et al. | |
| 2014/0282877 A1 * | 9/2014 | Mahaffey | H04L 63/0853 726/3 |
| 2014/0325614 A1 | 10/2014 | Rhelimi | |
| 2014/0349629 A1 * | 11/2014 | Chan | H04W 8/22 455/418 |
| 2015/0022438 A1 * | 1/2015 | Hong | H04M 1/7253 345/156 |
| 2015/0031333 A1 * | 1/2015 | Lee | H04B 1/385 455/411 |
| 2016/0105923 A1 * | 4/2016 | Chen | H04W 88/02 455/41.2 |
| 2016/0277891 A1 * | 9/2016 | Dvortsov | H04W 4/008 |

FOREIGN PATENT DOCUMENTS

| | | |
|---|---|---|
| EP | 2 882 174 A2 | 6/2015 |
| JP | 2001-195368 A | 7/2001 |
| JP | 2007-329599 A | 12/2007 |
| JP | 2011-511335 A | 4/2011 |
| JP | 2013-109695 A | 6/2013 |
| JP | 2014-110638 A | 6/2014 |
| KR | 10-2013-0025325 A | 3/2013 |
| KR | 10-2014-0074155 A | 6/2014 |
| KR | 10-2015-0022600 A | 3/2015 |

OTHER PUBLICATIONS

Communication dated Dec. 11, 2015 issued by the European Patent Office in counterpart European Patent Application No. 15178062.4.
Communication dated Nov. 8, 2017, issued by the Australian Patent Office in counterpart Australian Application No. 2015297204.
Communication dated Apr. 2, 2018 by the Japanes patent Office in counterpart japanese Patent Application No. 2017-504396.

* cited by examiner

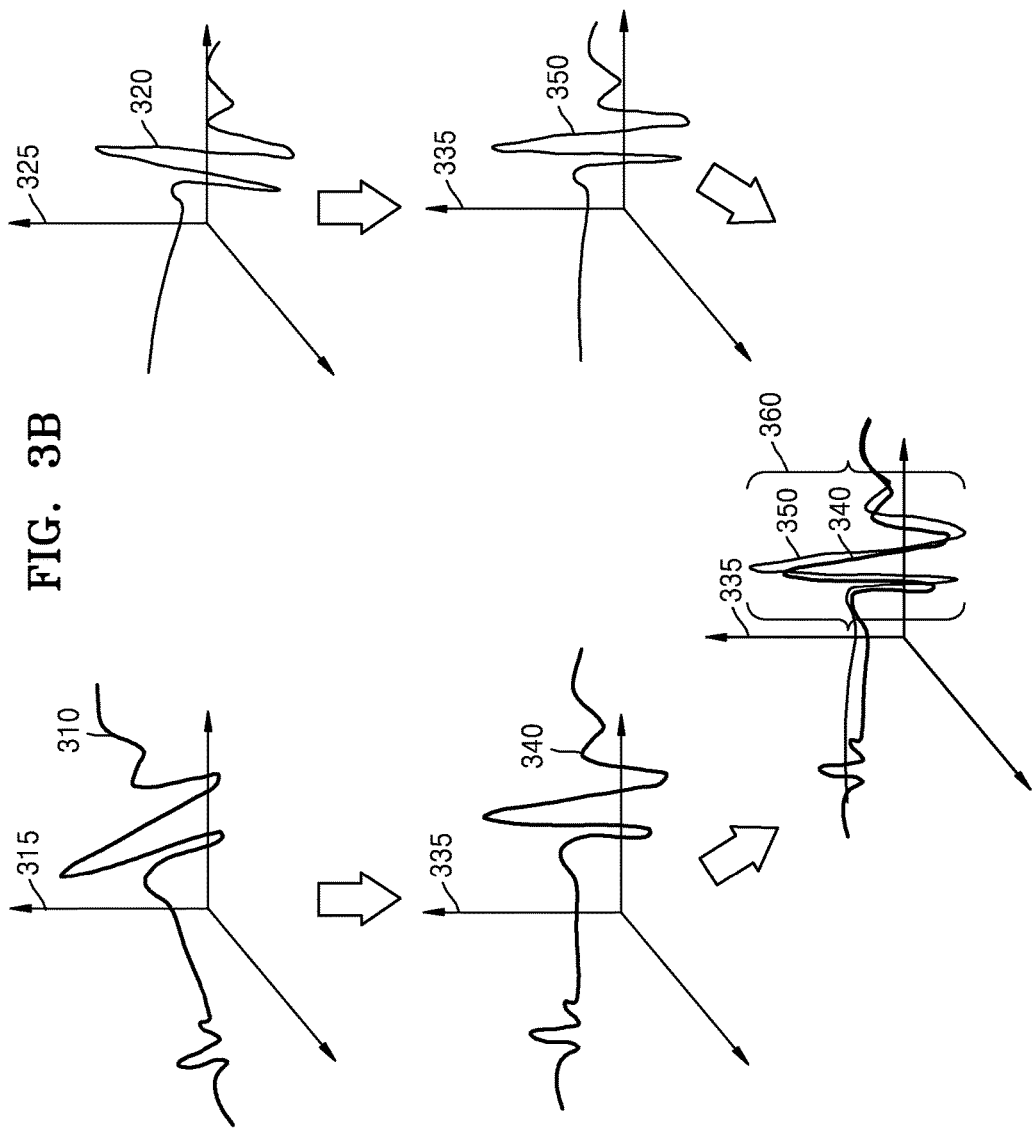

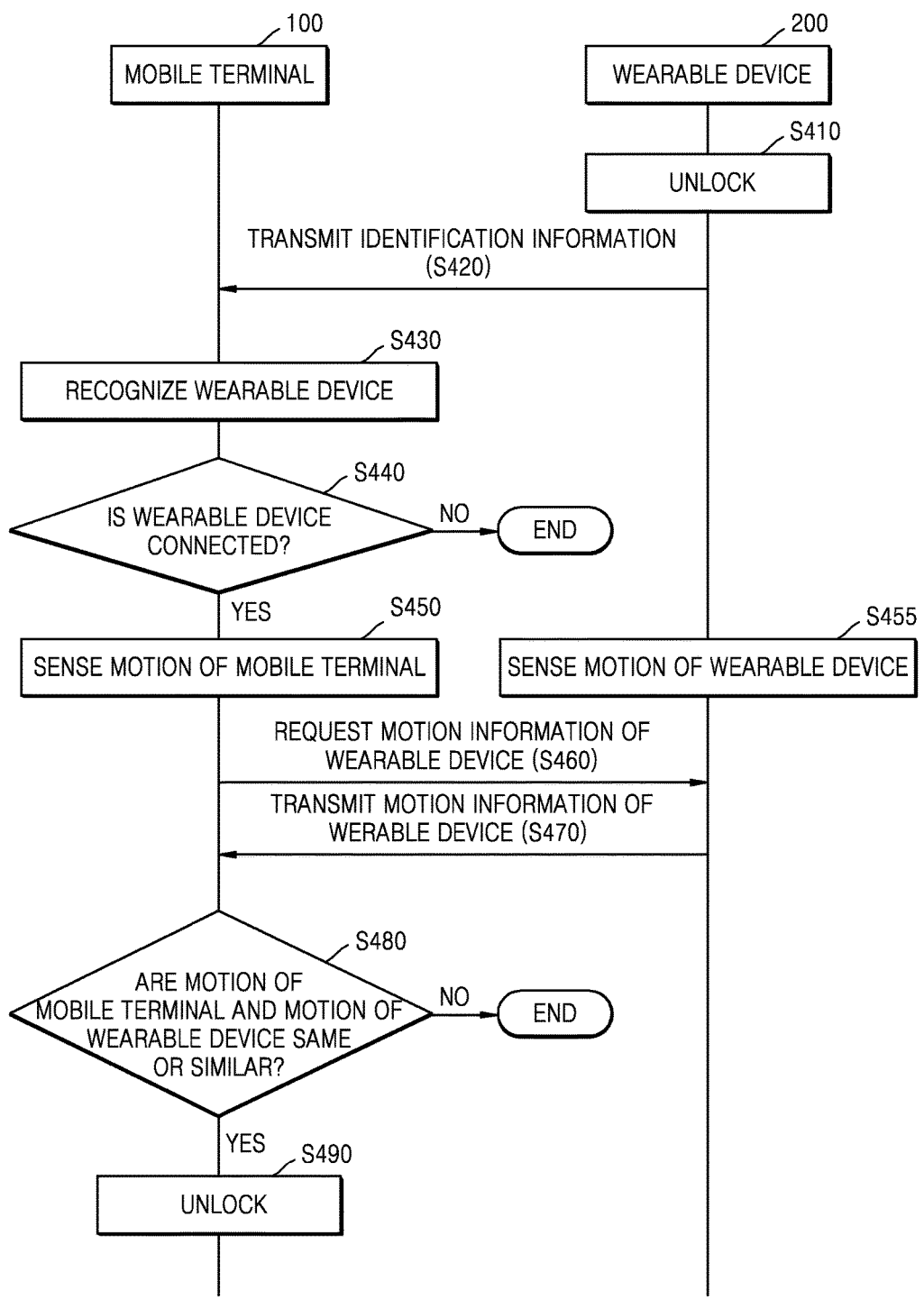

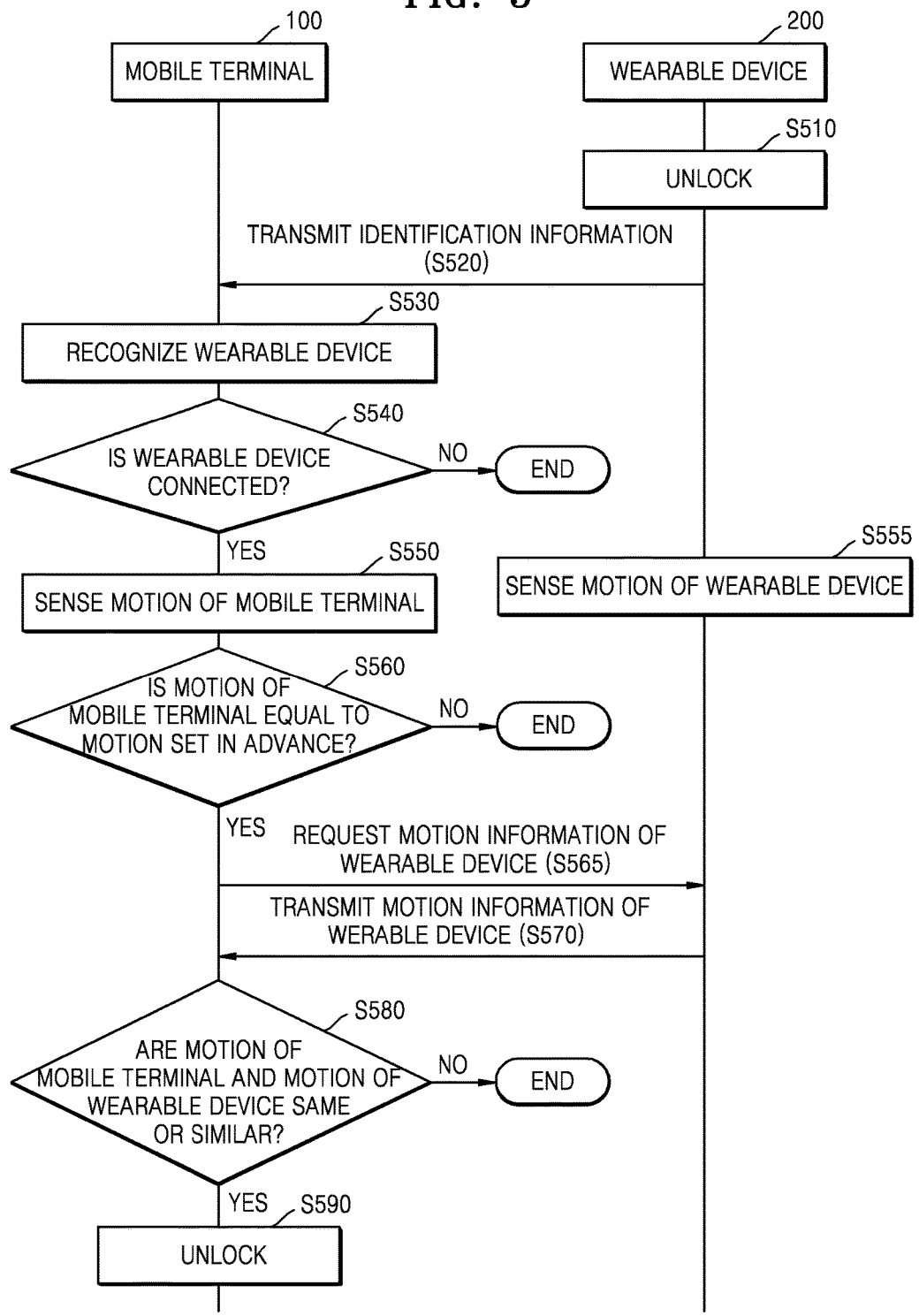

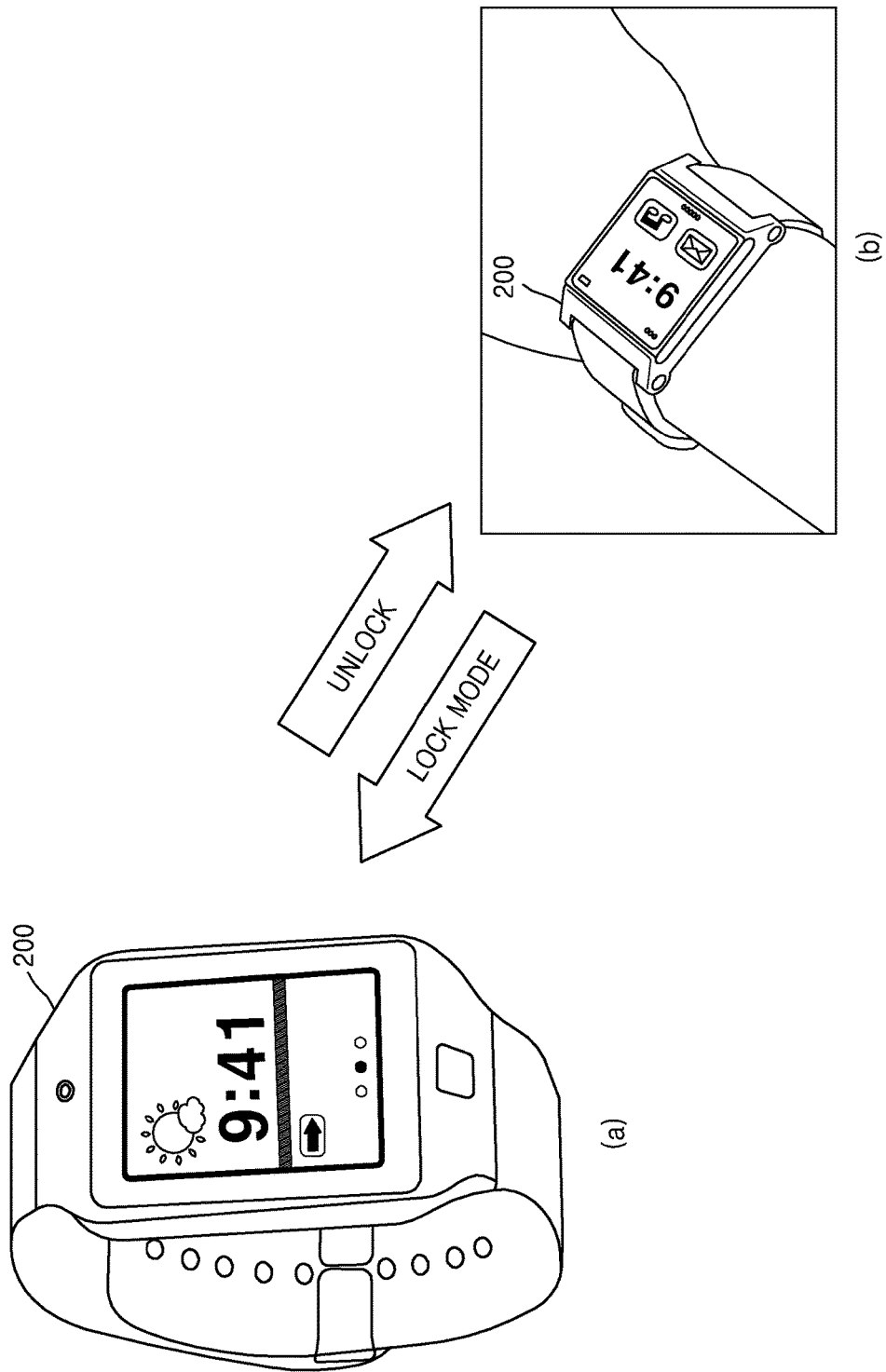

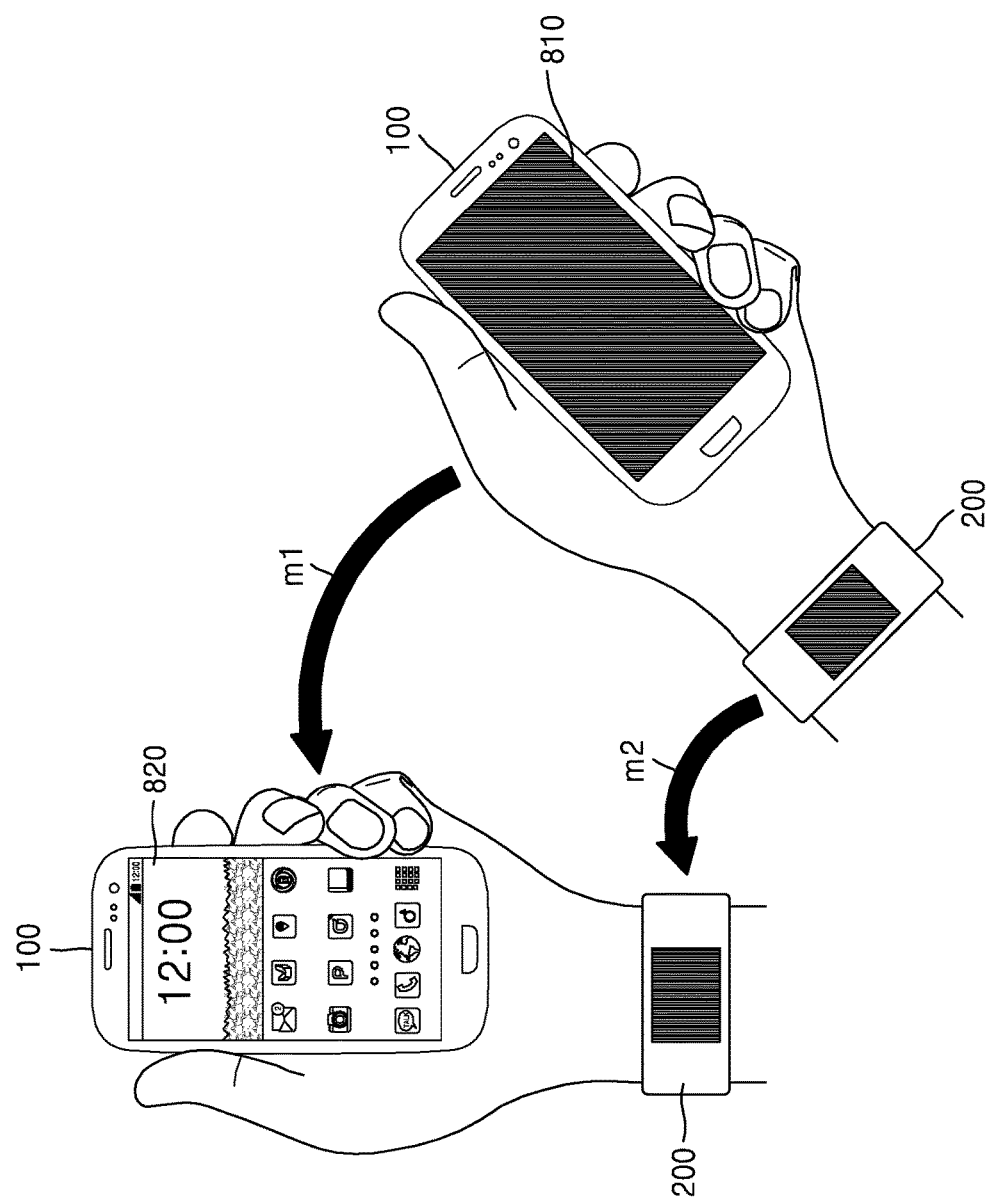

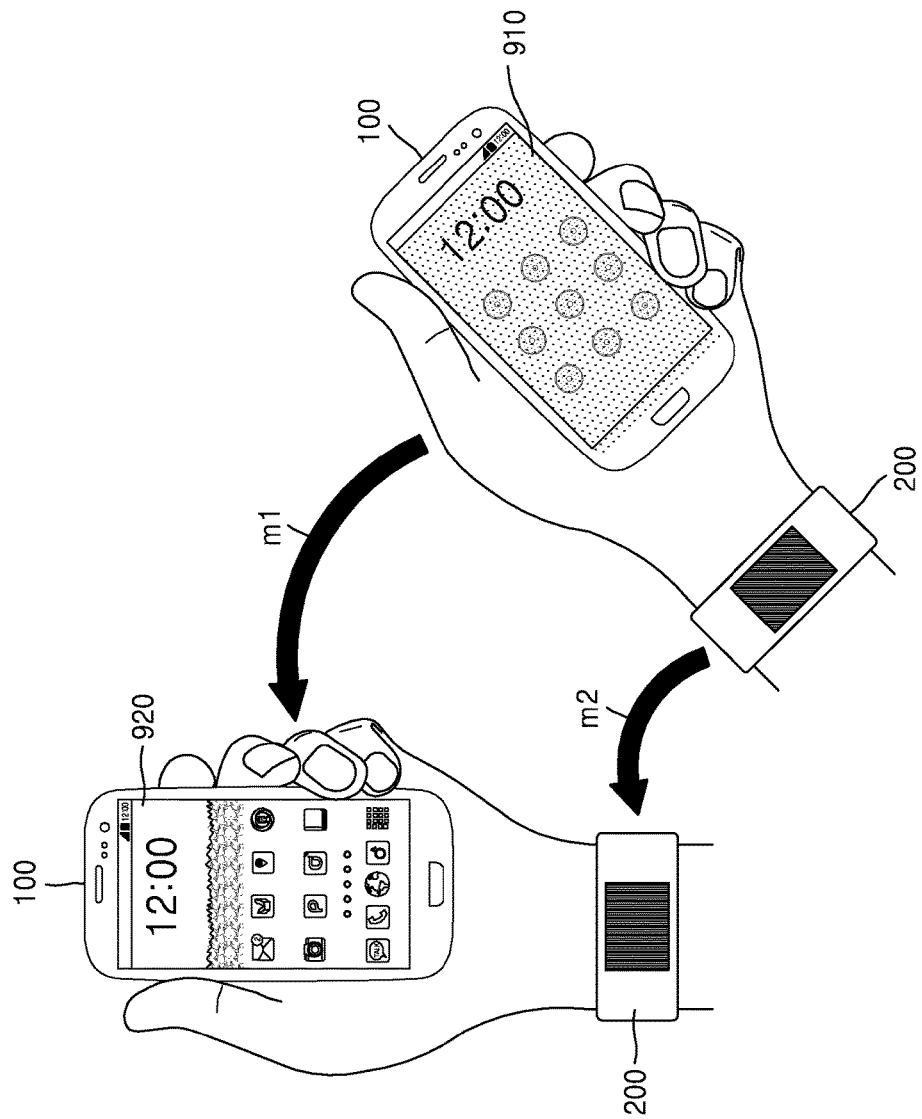

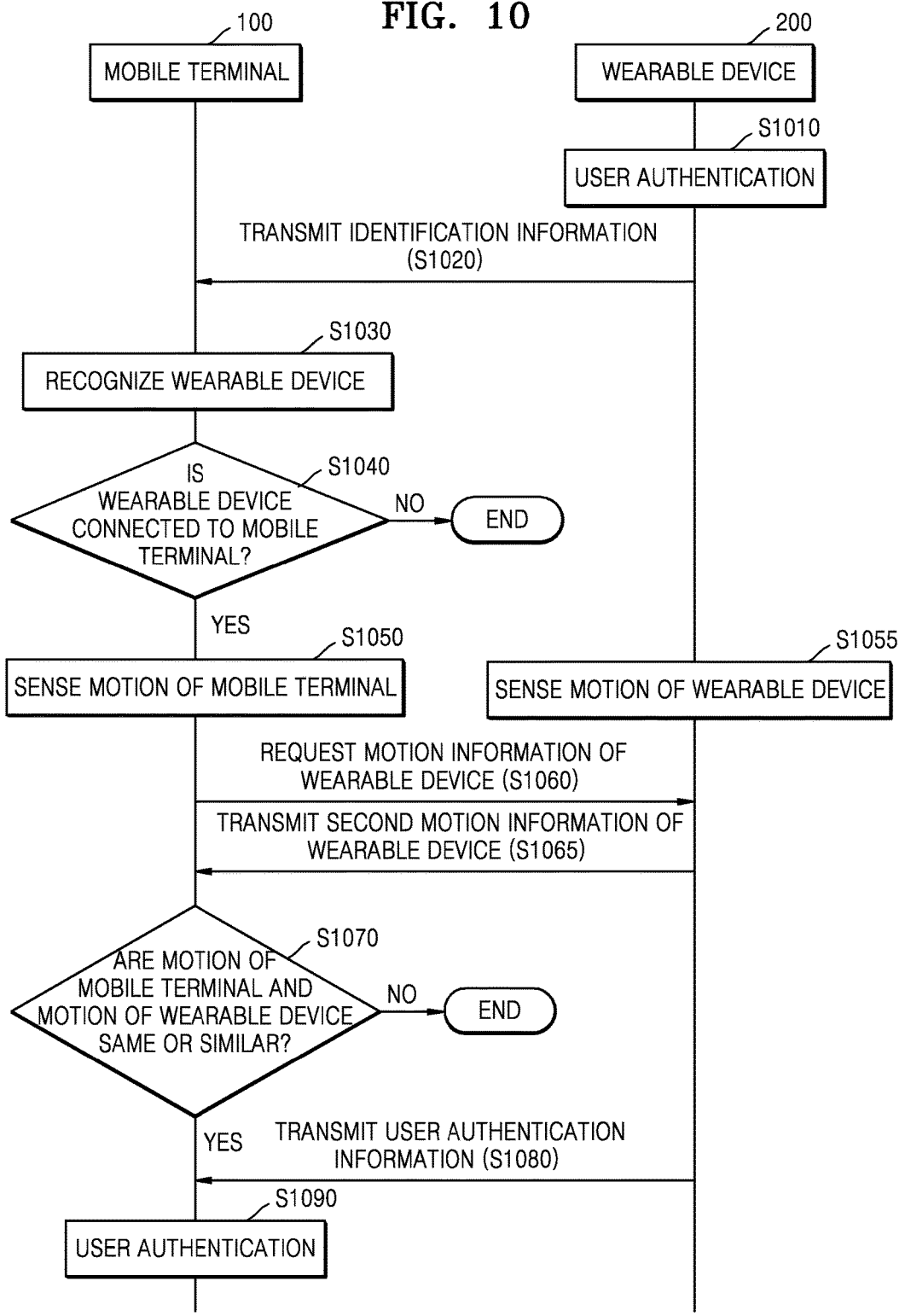

(a)　　　　　　　　　　(b)

(a)  (b)

MOBILE TERMINAL AND METHOD OF OPERATING THE SAME

CROSS-REFERENCE TO RELATED APPLICATIONS

This application claims priority from Korean Patent Application Nos. 10-2014-0098643, filed on Jul. 31, 2014, 10-2014-0156242, filed on Nov. 11, 2014, and 10-2015-0078247 filed on Jun. 2, 2015, in the Korean Intellectual Property Office, the disclosures of which are incorporated herein by reference in their entireties.

BACKGROUND

1. Field

Apparatuses and methods consistent with exemplary embodiments relate to a mobile terminal and a method of operating the mobile terminal.

2. Description of the Related Art

A mobile terminal is a portable device having one or more functions among a function of performing voice and video calls while being carried, a function of inputting or outputting information, and a function of storing data. Such a mobile terminal may also have complicated functions such as taking a picture or a video, reproducing a music file or a video file, playing a game, receiving a broadcast, and communicating via wireless Internet, and thus may be a multimedia player.

Also, various kinds of wearable devices that a user may wear have been developed, and thus a technology that allows the user to use the mobile terminal more conveniently may be needed.

SUMMARY

Exemplary embodiments address at least the above problems and/or disadvantages and other disadvantages not described above. Also, the exemplary embodiments are not required to overcome the disadvantages described above, and may not overcome any of the problems described above.

Exemplary embodiments provide a mobile terminal, a lock mode of which is released by a user when a motion of the mobile terminal is equal to a motion of a wearable device, and a method of operating the mobile terminal.

According to an aspect of an exemplary embodiment, there is provided a mobile terminal including a sensor configured to sense a motion of the mobile terminal, and a communication interface configured to receive, from a wearable device corresponding to the mobile terminal, information of a motion of the wearable device, the motion of the wearable device being sensed during a time period from a start time requested by the mobile terminal. The mobile terminal further includes a controller configured to determine whether the motion of the mobile terminal and the motion of the wearable device have a correlation of a level or greater, and unlock the mobile terminal, in response to the controller determining that the motion of the mobile terminal and the motion of the wearable device have the correlation of the level or greater.

The sensor may be further configured to sense the motion of the mobile terminal during a time period identical to the time period during which the motion of the wearable device is sensed.

The wearable device may be unlocked.

The controller may be further configured to determine whether the motion of the mobile terminal and a motion set in advance have a correlation of a level or greater, and the communication interface may be further configured to receive, from the wearable device, the information of the motion of the wearable device, in response to the controller determining that the motion of the mobile terminal and the motion set in advance have the correlation of the level or greater.

The mobile terminal may further include a display, the controller may be further configured to recognize that the wearable device is within a distance range from the mobile terminal, and the display may be configured to display a message notifying that the mobile terminal may be unlocked if the motion of the mobile terminal and the motion of the wearable device are the same or similar, in response to the controller recognizing that the wearable device is within the distance range.

The controller may be further configured to control the mobile terminal to perform an operation corresponding to an operation that the wearable device is performing, in response to the controller determining that the motion of the mobile terminal and the motion of the wearable device have the correlation of the level or greater.

The communication interface may be further configured to receive, from the wearable device, information of content that the wearable device is reproducing, in response to the controller determining that the motion of the mobile terminal and the motion of the wearable device have the correlation of the level or greater, and the controller may be further configured to control the mobile terminal to reproduce the content based on the information of the content.

The communication interface may be further configured to receive, from the wearable device, information of a web page that the wearable device is displaying, in response to the controller determining that the motion of the mobile terminal and the motion of the wearable device have the correlation of the level or greater, and the mobile terminal may further include a display configured to display the web page based on the information of the web page.

The communication interface may be further configured to receive, from the wearable device, information of a call the wearable device is connecting, in response to the controller determining that the motion of the mobile terminal and the motion of the wearable device have the correlation of the level or greater, and the controller may be further configured to control the mobile terminal to connect the call based on the information of the call.

The communication interface may be further configured to receive, from the wearable device, information of an application corresponding to a message the wearable device receives, in response to the controller determining that the motion of the mobile terminal and the motion of the wearable device have the correlation of the level or greater, and the controller may be further configured to control the mobile terminal to execute the application based on the information of the application.

According to an aspect of another exemplary embodiment, there is provided a method of operating a mobile terminal, the method including sensing a motion of the mobile terminal, and receiving, from a wearable device corresponding to the mobile terminal, information of a motion of the wearable device, the motion of the wearable device being sensed during a time period from a start time requested by the mobile terminal. The method further includes determining whether the motion of the mobile terminal and the motion of the wearable device have a correlation of a level or greater, and unlocking the mobile terminal, in response to the determining that the motion of the mobile terminal and the motion of the wearable device have the correlation of the level or greater.

The sensing may include sensing the motion of the mobile terminal during a time period identical to the time period during which the motion of the wearable device is sensed.

The method may further include determining whether the motion of the mobile terminal and a motion set in advance have a correlation of a level or greater, and the receiving may include receiving, from the wearable device, the information of the motion of the wearable device, in response to the determining that the motion of the mobile terminal and the motion set in advance have the correlation of the level or greater.

The method may further include recognizing that the wearable device is within a distance range from the mobile terminal, and displaying a message notifying that the mobile terminal may be unlocked if the motion of the mobile terminal and the motion of the wearable device are the same or similar, in response to the recognizing that the wearable device is within the distance range.

The method may further include performing an operation corresponding to an operation that the wearable device is performing, in response to the determining that the motion of the mobile terminal and the motion of the wearable device have the correlation of the level or greater.

The method may further include receiving, from the wearable device, information of content that the wearable device is reproducing, in response to the determining that the motion of the mobile terminal and the motion of the wearable device have the correlation of the level or greater, and reproducing the content based on the information of the content.

The method may further include receiving, from the wearable device, information of a web page that the wearable device is displaying, in response to the determining that the motion of the mobile terminal and the motion of the wearable device have the correlation of the level or greater, and displaying the web page based on the information of the web page.

The method may further include receiving, from the wearable device, information of a call the wearable device is connecting, in response to the determining that the motion of the mobile terminal and the motion of the wearable device have the correlation of the level or greater, and connecting the call based on the information of the call.

The method may further include receiving, from the wearable device, information of an application corresponding to a message the wearable device receives, in response to the determining that the motion of the mobile terminal and the motion of the wearable device have the correlation of the level or greater, and executing the application based on the information of the application.

According to an aspect of another exemplary embodiment, there is provided a mobile terminal including a sensor configured to sense an input for unlocking the mobile terminal, and a motion of the mobile terminal, and a communication interface configured to request a wearable device corresponding to the mobile terminal for a motion of the wearable device, in response to the sensor sensing the input, and receive, from the wearable device, information of the motion of the wearable device, the motion of the wearable device being sensed during a time period from a start time requested by the mobile terminal, and a controller configured to determine whether the motion of the mobile terminal and the motion of the wearable device have a correlation of a level or greater, and unlock the mobile terminal, in response to the controller determining that the motion of the mobile terminal and the motion of the wearable device have the correlation of the level or greater.

The input may include a hold and a lift of the mobile terminal.

According to an aspect of another exemplary embodiment, there is provided a mobile terminal including a controller configured to determine whether a first data of the mobile terminal and a second data of a wearable device connected to the mobile terminal have a correlation greater than or equal to a level, the first data and the second data being of a same type of data, and the first data and the second data being obtained during a same time period. The controller is further configured to perform an operation corresponding to an operation that the wearable device is performing, in response to the controller determining that the first data and the second data have the correlation greater than or equal to the level.

The mobile terminal may further include a sensor configured to sense a bio signal of a user of the mobile terminal as the first data, and a communication interface configured to receive, from the wearable device, information of a bio signal of a user of the wearable device as the second data.

The mobile terminal may further include a sensor configured to sense a touch pattern on the mobile terminal as the first data, and a communication interface configured to receive, from the wearable device, information of a touch pattern on the mobile terminal that the wearable device photographs as the second data.

The mobile terminal may further include a camera configured to photograph an image of a user of the mobile terminal as the first data, and a communication interface configured to receive, from the wearable device, an image of a user of the wearable device as the second data.

The performed operation may include at least one among an unlock of the mobile terminal, an authentication of a user of the mobile terminal, a display of a web page, a connection of a call, an execution of an application, a display of a message, a reproduction of content, and a switch from a common mode to a personal mode of the mobile terminal.

BRIEF DESCRIPTION OF THE DRAWINGS

The above and/or other aspects will be more apparent by describing certain exemplary embodiments with reference to the accompanying drawings in which:

FIG. 3B is a diagram illustrating a method of determining whether a motion of a wearable device is equal to a motion of a mobile terminal in the mobile terminal, according to an exemplary embodiment;

FIG. 4 is a flowchart of an interaction between a mobile terminal and a wearable device, according to an exemplary embodiment;

FIG. 5 is a flowchart illustrating an interaction between a mobile terminal and a wearable device to perform an unlocking operation of the mobile terminal, according to an exemplary embodiment;

FIG. 6 is a diagram showing an example in which a wearable device enters a lock mode or an unlock mode depending on whether a user wears the wearable device or not, according to an exemplary embodiment;

FIGS. 8A, 8B, 9A, and 9B are diagrams showing operations of unlocking a lock mode of a mobile terminal, if a user of the mobile terminal and a wearer of a wearable device are the same person, according to an exemplary embodiment;

FIG. 10 is a flowchart illustrating a method of performing a user authentication in a mobile terminal, in a case where a wearable device perform the user authentication, according to an exemplary embodiment;

DETAILED DESCRIPTION OF THE EXEMPLARY EMBODIMENTS

Figure 1:
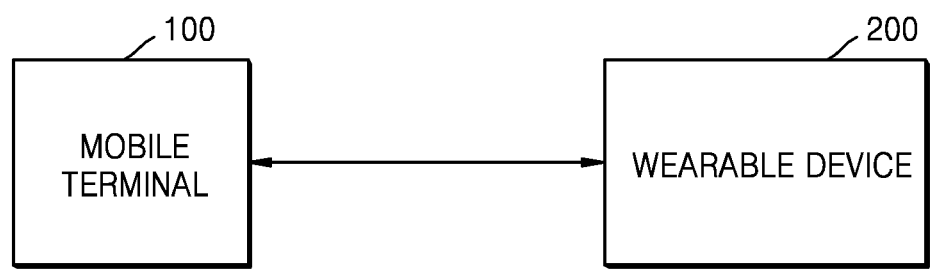
FIG. 1 is a diagram showing an interaction between a mobile terminal and a wearable device, according to an exemplary embodiment.

Exemplary embodiments are described in greater detail herein with reference to the accompanying drawings.

In the following description, like drawing reference numerals are used for like elements, even in different drawings. The matters defined in the description, such as detailed construction and elements, are provided to assist in a comprehensive understanding of the exemplary embodiments. However, it is apparent that the exemplary embodiments can be practiced without those specifically defined matters. Also, well-known functions or constructions are not described in detail because they would obscure the description with unnecessary detail.

It will be understood that the terms "comprises" and/or "comprising" used herein specify the presence of stated features or components, but do not preclude the presence or addition of one or more other features or components. In addition, the terms such as "unit," "-er (-or)," and "module" described in the specification refer to an element for performing at least one function or operation, and may be implemented in hardware, software, or the combination of hardware and software.

As used herein, the term "and/or" includes any and all combinations of one or more of associated listed items. Expressions such as "at least one of," when preceding a list of elements, modify the entire list of elements and do not modify the individual elements of the list.

FIG. 1 is a diagram showing an interaction between a mobile terminal 100 and a wearable device 200, according to an exemplary embodiment.

The mobile terminal 100 according to an exemplary embodiment may be formed in various types. For example, the mobile terminal 100 may be a mobile phone, a smart phone, a laptop computer, a tablet PC, an electronic book terminal, a digital broadcasting terminal, a personal digital assistant (PDA), a portable multimedia player (PMP), a navigation system, an MP3 player, a digital camera, an internet protocol television (IPTV), a digital TV, or a CE appliance (for example, a refrigerator or an air conditioner having a display device), but is not limited thereto.

Also, the wearable device 200 according to an exemplary embodiment may include a watch, a band, or a bracelet that a user may wear on the wrist, but is not limited thereto, that is, the wearable device 200 may include glasses, a helmet, a hat, a ring, shoes, earrings, a hair band, clothes, gloves, or a thimble.

The mobile terminal 100 and the wearable device 200 according to the exemplary embodiment may communicate with each other. For example, the mobile terminal 100 may transmit or receive data to/from the wearable device 200 via short-range communication. Here, the short range communication may be performed in wireless fidelity (Wi-Fi), near field communication (NFC), Bluetooth, an infrared ray method, and ZigBee, but is not limited thereto.

Also, the wearable device 200 according to the exemplary embodiment may transmit user authentication information or device identification information of the wearable device 200 to the mobile terminal 100, and the mobile terminal 100 may transmit user authentication information or terminal identification information of the mobile terminal 100 to the wearable device 200.

Here, the user authentication information may include a user ID, user password, and user account. Also, the device identification information or the terminal identification information is exclusive information for distinguishing the device or the terminal from other devices, and may include, for example, the model name and serial number of the device.

Also, the mobile terminal 100 stores the user authentication information or the device identification information of the wearable device 200, and may register the wearable device 200 in the mobile terminal 100.

Also, the wearable device 200 according to the exemplary embodiment may regularly transmit the device identification information one way, and may broadcast the device identification information to outside the wearable device 200 via Bluetooth low energy (BLE) communication.

In addition, the mobile terminal 100 may recognize the existence of the wearable device 200 that is around the mobile terminal 100, based on the device identification information that the mobile terminal 100 has received. Also, the wearable device 200 may recognize the existence of the mobile terminal 100 that is around the wearable device 200, based on the terminal identification information that the wearable device 200 has received.

Also, the mobile terminal 100 may determine whether the recognized wearable device 200 is connected to the mobile terminal 100, by comparing the user authentication information or the device identification information of the recognized wearable device 200 with the user authentication information or the device identification information of the registered wearable device.

In addition, the mobile terminal 100 may acquire motion information of the mobile terminal 100 by sensing movement of the mobile terminal 100.

Here, the motion information of the mobile terminal 100 may include values obtained by sensing movement of the mobile terminal 100 by using a geomagnetic sensor, a location sensor, an acceleration sensor, a proximity sensor, or a gyroscope sensor, for example, a directionality value, a velocity value, or an acceleration value of the mobile terminal 100, but is not limited thereto.

Also, the wearable device 200 according to the exemplary embodiment may sense movement of the wearable device 200. For example, the wearable device 200 may sense the movement of the wearable device 200 by using a geomagnetic sensor, a location sensor, an acceleration sensor, a proximity sensor, or a gyroscope sensor, and may acquire motion information of the wearable device 200, wherein the motion information may include a directionality value, a velocity value, or an acceleration value of the wearable device 200.

Also, the mobile terminal 100 according to the exemplary embodiment may sense a touch input to the mobile terminal 100. Also, the mobile terminal 100 may sense a bio signal of a user of the mobile terminal 100. Also, the mobile terminal 100 may sense various signals transmitted from external devices that are around the mobile terminal 100 (for example, the wearable device 200). This will be described in more detail later.

Also, the wearable device 200 according to the exemplary embodiment may include a camera to capture images. Also, the wearable device 200 may sense a bio signal of a wearer of the wearable device 200. Also, the wearable device 200 may sense various signals transmitted from external devices that are around the wearable device 200 (for example, the mobile terminal 100). This will be described in more detail later.

In addition, the wearable device 200 according to the exemplary embodiment may transmit information sensed by the wearable device 200 to the mobile terminal 100 connected to the wearable device 200.

For example, the motion information of the wearable device 200 that the wearable device 200 sensed itself may be transmitted to the mobile terminal 100 connected to the wearable device 200.

Otherwise, the wearable device 200 may transmit the bio signal information of the wearer of the wearable device 200, image information captured by the wearable device 200, and signal information of the external devices sensed by the wearable device 200 to the mobile terminal 100 that is connected to the wearable device 200.

Accordingly, the mobile terminal 100 according to the exemplary embodiment may compare the information that the mobile terminal 100 itself sensed with the information sensed by the wearable device 200, and may execute an operation set in advance if the information sensed by the mobile terminal 100 is the same as the information sensed by the wearable device 200.

Also, if the information sensed by the mobile terminal 100 is the same as the information sensed by the wearable device 200, the mobile terminal 100 may determine that the user of the mobile terminal 100 is wearing the wearable device 200.

Also, the operation set in advance may be an operation related to an operation that is currently being performed by the wearable device 200. For example, if the wearable device 200 is in an unlock mode, a lock mode of the mobile terminal 100 may be unlocked. If the wearable device 200 displays a web page, the mobile terminal 100 may display the web page that is currently being displayed on the wearable device 200. Otherwise, if the wearable device 200 reproduces a piece of content, the mobile terminal 100 may reproduce the piece of content successively. Otherwise, if the wearable device 200 receives a request for making a phone call, the mobile terminal 100 may make the phone call. If the wearable device 200 receives an alarm message, the mobile terminal 100 may execute an application related to the alarm message. However, one or more exemplary embodiments are not limited to the above examples, and other various operations may be performed.

Figure 2:
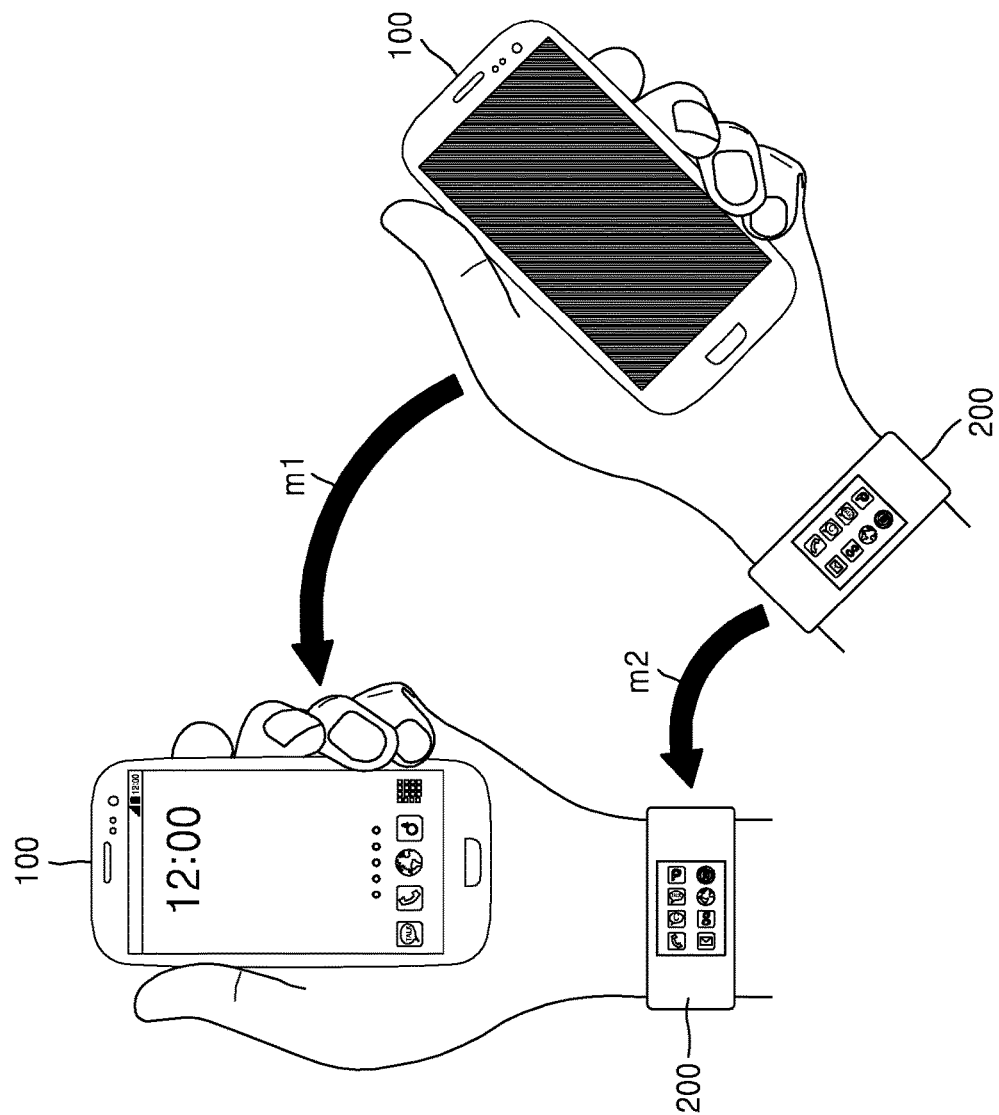
FIG. 2 is a diagram illustrating an operation of releasing a lock mode of a mobile terminal, when a motion of the mobile terminal is equal to a motion of a wearable device, according to an exemplary embodiment.

FIG. 2 is a diagram showing an operation of unlocking a lock mode of the mobile terminal 100, when a motion of the mobile terminal 100 is equal to a motion of the wearable device 200, according to an exemplary embodiment.

FIG. 2 shows a state where a user of the mobile terminal 100 holds the mobile terminal 100 with a hand while wearing the wearable device 200 on a wrist. In FIG. 2, the wearable device 200 is a wrist watch, but is not limited thereto.

As shown in FIG. 2, when the user of the mobile terminal 100 moves the hand holding the mobile terminal 100 while wearing the wearable device 200 on the wrist (the wrist of the hand holding the mobile terminal 100), a movement of the mobile terminal 100 coincides with a movement of the wearable device 200. That the movement of the mobile terminal 100 coincides with the movement of the wearable device 200 denotes that motion information of the mobile terminal 100 and the wearable device 200 (for example, directions, sizes, velocities, and patterns of the movements of the mobile terminal 100 and the wearable device 200) is the same, or that a difference between the motion information of the mobile terminal 100 and the motion information of the wearable device 200 is within a predetermined range.

For example, a motion pattern of the mobile terminal 100 may be equal to a motion pattern of the wearable device 200. As shown in FIG. 2, when the user picks up the mobile terminal 100 with the hand wearing the wearable device 200, the motion pattern of the mobile terminal 100 (a first motion pattern m1) may indicate a rotation by a predetermined angle in a counter-clockwise direction. Also, a motion pattern (a second motion pattern m2) of the wearable device 200, which is sensed by the wearable device 200, may also indicate the rotation by the predetermined angle in the counter-clockwise direction.

When the motion information of the mobile terminal 100 is the same as the motion information of the wearable device 200, and the wearable device 200 is in an unlock state through a predetermined authentication process, the mobile terminal 100 unlocks the lock mode thereof.

For example, when the wearable device 200 is in the unlock state, the wearable device 200 may transmit a signal indicating the unlock state to the mobile terminal 100. Also, the wearable device 200 may transmit the motion information thereof to the mobile terminal 100.

However, one or more exemplary embodiments are not limited thereto, that is, the mobile terminal 100 may unlock the lock mode thereof when the motion information of the mobile terminal 100 is the same as the motion information of the wearable device 200 without regard to the unlock state of the wearable device 200.

In FIG. 2, a display of the wearable device 200 is activated to indicate an unlocking of the lock mode of the wearable device 200. However, one or more exemplary embodiments are not limited thereto, and the display of the wearable device 200 may be inactivated (the display is turned off). In FIG. 2, displays of the wearable device 200 and the mobile terminal 100 are located at the same side based on the hand of the user, but the displays of the mobile terminal 100 and the wearable device 200 may be located opposite to each other based on the hand of the user.

Accordingly, when the first motion pattern m1 sensed by the mobile terminal 100 and the second motion pattern m2 sensed by the wearable device 200 show the same pattern as each other, the mobile terminal 100 determines that the first motion pattern is the same as the second motion pattern. In addition, the mobile terminal 100 may determine that the user of the mobile terminal 100 and the wearer of the wearable device 200 are the same person. Accordingly, the mobile terminal 100 determines whether the user of the mobile terminal 100 wears the wearable device 200 by comparing the first motion pattern of the mobile terminal 100 with the second motion pattern of the wearable device 200.

Also, the mobile terminal 100 may unlock the lock mode of the mobile terminal 100 when the motion information of the mobile terminal 100 is the same as the motion information of the wearable device 200, and the lock mode of the wearable device 200 is unlocked through predetermined authentication processes.

For example, as shown in FIG. 2, the mobile terminal 100 displays a home screen on the display of the mobile terminal 100, which had been in the inactivated state. That is, the user may unlock the mobile terminal 100 only with a motion without directly inputting a password to the mobile terminal 100 to unlock the lock mode of the mobile terminal 100.

Figure 3A:
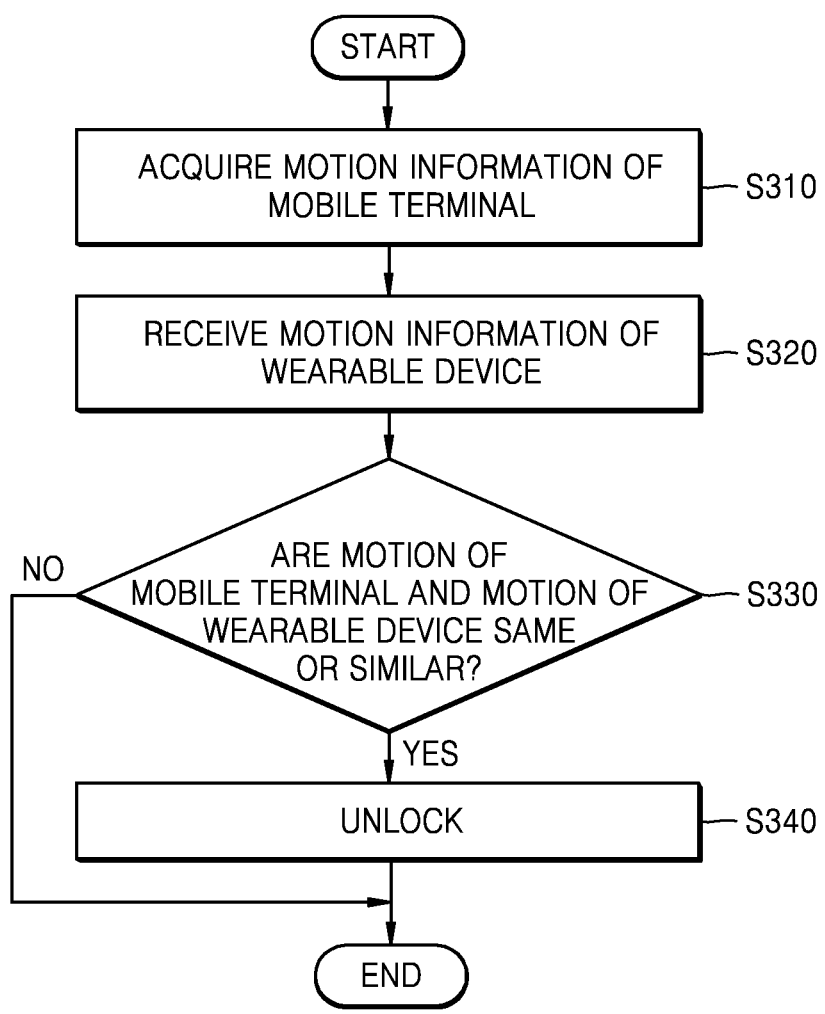
FIG. 3A is a flowchart of a method of operating a mobile terminal, according to an exemplary embodiment.

FIG. 3A is a flowchart of a method of operating the mobile terminal 100, according to an exemplary embodiment, and FIG. 3B is a diagram illustrating a method of determining whether a motion of the wearable device 200 is the same as a motion of the mobile terminal 100 in the mobile terminal 100, according to the exemplary embodiment.

In operation S310, the mobile terminal 100 acquires motion information of the mobile terminal 100 by sensing the motion of the mobile terminal 100. For example, the mobile terminal 100 may measure a moving direction, a velocity, and variation in the velocity of the mobile terminal 100 by using a geomagnetic sensor, a location sensor, an acceleration sensor, a proximity sensor, or a gyroscope sensor to sense the motion of the mobile terminal 100.

In operation S320, the mobile terminal 100 receives motion information of the wearable device 200, which is sensed by the wearable device 200, from the wearable device 200 connected to the mobile terminal 100. For example, the wearable device 200 connected to the mobile terminal 100 may measure a moving direction, a velocity, and variation in the velocity of the wearable device 200 by using a geomagnetic sensor, a location sensor, an acceleration sensor, a proximity sensor, or a gyroscope sensor to sense the motion of the wearable device 200. The mobile terminal 100 may receive time information about the motion information of the wearable device 200. Also, the mobile terminal 100 may request the wearable device 200 for the motion information of the wearable device 200, and the wearable device 200 may transmit the motion information thereof, which is sensed by the wearable device 200, to the mobile terminal 100.

In operation S330, the mobile terminal 100 determines whether the motion of the mobile terminal 100 and the motion of the wearable device 200 are the same or similar. Here, that the motion of the mobile terminal 100 is the same as the motion of the wearable device 200 does not denote that the motions are physically equal to each other, but may denote that the motion information of the mobile terminal 100 (for example, a direction, a size, and a velocity of a movement the mobile terminal 100) coincides with the motion information of the wearable device 200 (for example, a direction, a size, and a velocity of a movement of the wearable device 200) within a predetermined range. Also, that the motion of the mobile terminal 100 is the same as the motion of the wearable device 200 may denote that the motion information of the mobile terminal 100 and the motion information of the wearable device 200 have a correlation of a predetermined level or greater.

The mobile terminal 100 may compare the motion information of the mobile terminal 100, which is sensed at the same time as the motion information of the wearable device 200, with the motion information of the wearable device 200, based on the time information with respect to the motion information of the wearable device 200. Hereinafter, this will be described below with reference to FIG. 3B.

Referring to FIG. 3B, an acceleration value according to time sensed by the wearable device 200 is shown as a first graph 310, and the first graph 310 is generated based on a coordinate system 315 of the wearable device 200. Also, an acceleration value according to time sensed by the mobile terminal 100 is shown as a second graph 320, and the second graph 320 is generated based on a coordinate system 325 of the mobile terminal 100.

In addition, because the coordinate system 315 of the wearable device 200 is different from the coordinate system 325 of the mobile terminal 100, a process of converting the acceleration values of the wearable device 200 and the mobile terminal 100 into values on the same coordinate system is needed. For example, the wearable device 200 may convert the acceleration value on the coordinate system 315 of the wearable device 200 into an acceleration value on a reference coordinate system 335 by using a geomagnetic sensor, and then, may generate a third graph 340 based on the converted acceleration value. Otherwise, the mobile terminal 100 may receive the acceleration value sensed by the acceleration sensor of the wearable device 200 and geomagnetic values sensed by the geomagnetic sensor, and then, may convert the first graph 310 into the third graph 340. Also, the mobile terminal 100 may convert the acceleration value on the coordinate system 325 of the mobile terminal 100 into an acceleration value on the reference coordinate system 335 by using a geomagnetic sensor, and may generate a fourth graph 350 based on the converted acceleration value.

Here, the reference coordinate system 335 is a coordinate system that may be applied independently from a kind of a device. For example, the reference coordinate system 335 may include three axes (X-axis, Y-axis, and Z-axis). Based on a user, the X-axis denotes a reference axis crossing the user in a back and forth direction, the Y-axis denotes a reference axis crossing the user in left and right directions, and the Z-axis denotes a reference axis crossing the user in up and down directions. The X-axis, the Y-axis, and the Z-axis may be perpendicular to each other, but are not limited thereto.

The mobile terminal 100 compares the third graph 340 with the fourth graph 350 on the same reference coordinate system 335 to compare the acceleration values with respect to a predetermined time period 360 on the third and fourth graphs 340 and 350, thereby determining whether the motion of the mobile terminal 100 is the same as the motion of the wearable device 200. For example, if a difference between the acceleration value of the wearable device 200 and the acceleration value of the mobile terminal 100 within the predetermined time period 360 is equal to or less than a predetermined value, the mobile terminal 100 may determine that the motion information of the mobile terminal 100 (for example, the acceleration value of the mobile terminal 100) and the motion information of the wearable device 200 (for example, the acceleration value of the wearable device 200) have a correlation of a predetermined level or greater. That is, the mobile terminal 100 may determine that the motion of the mobile terminal 100 is the same as the motion of the wearable device 200.

Also, the mobile terminal 100 may determine whether the motion of the mobile terminal 100 is the same as that of the wearable device 200 by magnifying or reducing the motion information transmitted from the wearable device 200 by a preset ratio according to a kind of the wearable device 200 (that is, the motion information of the wearable device 200 varies depending on the kind of the wearable device 200 because a wearing state and a wearing position vary depending on the kind of the wearable device 200), and by comparing the expanded or reduced motion information of the wearable device 200 with the motion information of the mobile terminal 100. For example, if the wearable device 200 is a smart watch, a location of holding the mobile terminal 100 with a hand and a location of wearing the smart watch may be apart about 5 cm from each other, and the motion information may be expanded by the preset ratio while taking the distance (5 cm) into account.

Referring again to FIG. 3A, in operation S340, when the motion of the mobile terminal 100 and the motion of the wearable device 200 are determined to be the same or similar, the mobile terminal 100 unlocks a lock mode thereof. An unlock state of the mobile terminal 100 may be a state in which a home screen is displayed on a display of the mobile terminal 100. Otherwise, the unlock state of the mobile terminal 100 may be a state in which a menu of applications installed on the mobile terminal 100 is displayed on the display of the mobile terminal 100 and a menu of an application is selected to execute the selected application, but is not limited thereto.

FIG. 4 is a flowchart of an interaction between the mobile terminal 100 and the wearable device 200, according to an exemplary embodiment.

Referring to FIG. 4, in operation S410, the wearable device 200 is in a state in which a lock mode is unlocked. For example, an unlock state of the wearable device 200 may be a state in which a home screen is displayed on a display of the wearable device 200. Otherwise, menus of applications installed on the wearable device 200 are displayed on the display of the wearable device 200, and thus, if a menu of an application is selected, the selected application may be executed.

A lock mode state of the wearable device 200 may be a state in which the display of the wearable device 200 is inactivated. Otherwise, if the wearable device 200 is a watch, the lock mode state may be a state in which time information is only displayed on the display of the wearable device 200. Otherwise, the lock mode state may be a state in which menus of some of the applications installed on the wearable device 200 are displayed on the display of the wearable device 200 so that other applications that are not displayed on the display of the wearable device 200 may not be executed.

In operation S420, the wearable device 200 transmits identification information to the mobile terminal 100 that is in a predetermined distance range. For example, if the mobile terminal 100 and the wearable device 200 are located apart from each other within the predetermined distance range, the mobile terminal 100 and the wearable device 200 may transmit/receive user identification information and device identification information to/from each other via short-range communication.

In operation S430, the mobile terminal 100 recognizes the wearable device 200 that is within the predetermined distance range from the mobile terminal 100.

In operation S440, the mobile terminal 100 determines whether the recognized wearable device 200 is a wearable device connected to the mobile terminal 100. For example, the mobile terminal 100 may compare the identification information transmitted from the wearable device 200 with the identification information of the wearable device 200 that is registered in the mobile terminal 100 to determine whether the recognized wearable device 200 is a wearable device connected to the mobile terminal 100.

When the recognized wearable device 200 is determined to be a wearable device connected to the mobile terminal 100, in operation S450, the mobile terminal 100 senses a motion of the mobile terminal 100 to acquire motion information of the mobile terminal 100. For example, the mobile terminal 100 may sense a direction, a velocity, and a variation in the velocity of a movement of the mobile terminal 100 by using a geomagnetic sensor, a location sensor, an acceleration sensor, a proximity sensor, or a gyroscope sensor. Because operation S450 of FIG. 4 corresponds to operation S310 shown in FIG. 3, detailed descriptions thereof are omitted.

In operation S455, the wearable device 200 senses a motion of the wearable device 200 to acquire motion information of the wearable device 200. Here, the wearable device 200 may sense the motion of the wearable device 200 at the same time the mobile terminal 100 senses the motion of the mobile terminal 100 in operation S450. For example, the wearable device 200 may measure a direction, a velocity, and a variation in the velocity of a movement of the wearable device 200 by using a geomagnetic sensor, a location sensor, an acceleration sensor, a proximity sensor, or a gyroscope sensor.

In operation S460, the mobile terminal 100 requests the wearable device 200 for the motion information of the wearable device 200. The mobile terminal 100 may request the wearable device 200 for the motion information of the wearable device 200 after setting a time range. The mobile terminal 100 may set a start time and a finish time of the motion information to be requested, and then, may request the wearable device 200 for the motion information of the wearable device 200. For example, if the mobile terminal 100 is to compare the motion information sensed by the mobile terminal 100 from a first time to a second time with the motion information of the wearable device 200, the mobile terminal 100 may request the wearable device 200 for the motion information sensed by the wearable device 200 from the first time to the second time.

In operation S470, the wearable device 200 transmits the motion information of the wearable device 200 to the mobile terminal 100. Also, the mobile terminal 100 and the wearable device 200 may set the time range in advance. That is, the mobile terminal 100 may transmit the start time for requesting the motion information to the wearable device 200, and the wearable device 200 may transmit to the mobile terminal 100 the motion information included in the set time range from the start time. For example, if the set time range is 100 ms, and the mobile terminal 100 transmits information of the start time (13:30:50.10) to the wearable device 200, the wearable device 200 may sense the motion information for 100 ms from the start time (13:30:50.10) transmitted from the mobile terminal 100, and then, transmits the motion information of the wearable device 200 to the mobile terminal 100. Operation S470 of FIG. 4 corresponds to operation S320 of FIG. 3, and thus, detailed descriptions thereof are omitted here.

In operation S480, the mobile terminal 100 compares the motion of the mobile terminal 100 with the motion of the wearable device 200 that is transmitted from the wearable device 200, and determines whether the motion of the mobile terminal 100 and the motion of the wearable device 200 are the same or similar. Operation S480 of FIG. 4 corresponds to operation S330 of FIG. 3, and thus, detailed descriptions thereof are omitted here.

When the motion of the mobile terminal 100 and the motion of the wearable device 200 are determined to be same or similar, in operation S490, the mobile terminal 100 unlocks a lock mode of the mobile terminal 100. Operation S490 of FIG. 4 corresponds to operation S340 of FIG. 3, and thus, detailed descriptions thereof are omitted here.

FIG. 5 is a flowchart illustrating an interaction between the mobile terminal 100 and the wearable device 200 to perform an unlocking operation of the mobile terminal 100, according to an exemplary embodiment.

Operations S510 to S555 of FIG. 5 correspond to operations S410 to S455 of FIG. 4, and thus, detailed descriptions thereof are not provided.

Referring to FIG. 5, in operation S560, the mobile terminal 100 determines whether the sensed motion of the mobile terminal 100 is equal to a motion set in advance, i.e., whether the sensed motion of the mobile terminal 100 and the motion set in advance have a correlation of a predetermined level or greater. For example, the predetermined motion may be a motion of holding and lifting the mobile terminal 100, a motion of shaking the mobile terminal 100 to the left and right, a motion of shaking the mobile terminal 100 up and down, a motion of moving the mobile terminal 100 to the right, a motion of moving the mobile terminal 100 to the left, and a motion of moving the mobile terminal 100 upward, but is not limited thereto.

When the sensed motion of the mobile terminal 100 is determined to be equal to the motion set in advance, in operation S565, the mobile terminal 100 requests the wearable device 200 for the motion information of the wearable device 200, which is sensed by the wearable device 200.

Operations S570 to S590 of FIG. 5 correspond to operations S470 to S490 of FIG. 4, and thus, detailed descriptions thereof are omitted.

FIG. 6 is a diagram showing an example in which the wearable device 200 enters a lock mode or an unlock mode depending on whether a user wears the wearable device 200 or not, according to an exemplary embodiment.

In FIG. 6, the wearable device 200 is a watch, but is not limited thereto. That is, the wearable device 200 according to one or more exemplary embodiments may include a band, a bracelet, glasses, a helmet, a hat, a ring, shoes, earrings, a hair band, clothes, gloves, or a thimble.

The wearable device 200 according to the exemplary embodiment may be in a lock mode or an unlock mode, depending on whether wearable device 200 is worn or not. For example, if the user wears the wearable device 200, the wearable device 200 may be unlocked.

On the other hand, if the user is not wearing the wearable device 200, the unlock mode of the wearable device 200 may become locked.

For example, as shown in FIG. 6, if the wearable device 200 is a watch, a wearing state of the wearable device 200 may be sensed based on whether a buckle of the watch is coupled. Here, the wearable device 200 senses a state of the buckle by using a pressure sensor, and if the buckle of the wearable device 200 is coupled, the wearable device 200 may recognize that the user is wearing the wearable device 200. However, if the buckle of the watch is not coupled, the wearable device 200 may recognize that the user is not wearing the wearable device 200.

Otherwise, the wearable device 200 may sense the wearing state thereof by using a ground sensor. For example, as shown in FIG. 6, if the wearable device 200 is a watch, a watchstrap may include the ground sensor, and when the watchstrap contacts the wrist of the user, the wearable device 200 may recognize that the user is wearing the wearable device 200.

Also, if the wearable device 200 is glasses, the glasses may include the ground sensor at an end of the temples or at a nose pad. Thus, if the glasses contact the ears or nose of the user, the wearable device 200 may recognize that the user is wearing the wearable device 200.

Also, if the wearable device 200 is a ring, the ring may include a ground sensor at a band of the ring. Thus, if the user wears the ring and the ring contacts a finger of the user, the wearable device 200 may recognize that the user is wearing the wearable device 200.

For example, portion (a) of FIG. 6 denotes that the user is not wearing the wearable device 200 (for example, a watch), and the wearable device 200 may operate in the lock mode. Also, portion (b) of FIG. 6 denotes that the user is wearing the wearable device 200, and the wearable device 200 may be unlocked. The lock mode of the wearable device 200 is similar to that of the mobile terminal 100, and unlocking of the lock mode may be similar to that of the mobile terminal 100, but is not limited thereto.

As shown in portion (a) of FIG. 6, if the wearable device 200 operates in the lock mode, information such as the time and weather may only be displayed on the display of the wearable device 200.

As shown in portion (b) of FIG. 6, if the lock mode of the wearable device 200 is unlocked, the home screen may be displayed on the display of the wearable device 200. Otherwise, menus of applications installed on the wearable device 200 may be displayed on the display of the wearable device 200. When an application is selected, the selected application may be executed, but is not limited thereto.

Figure 7:
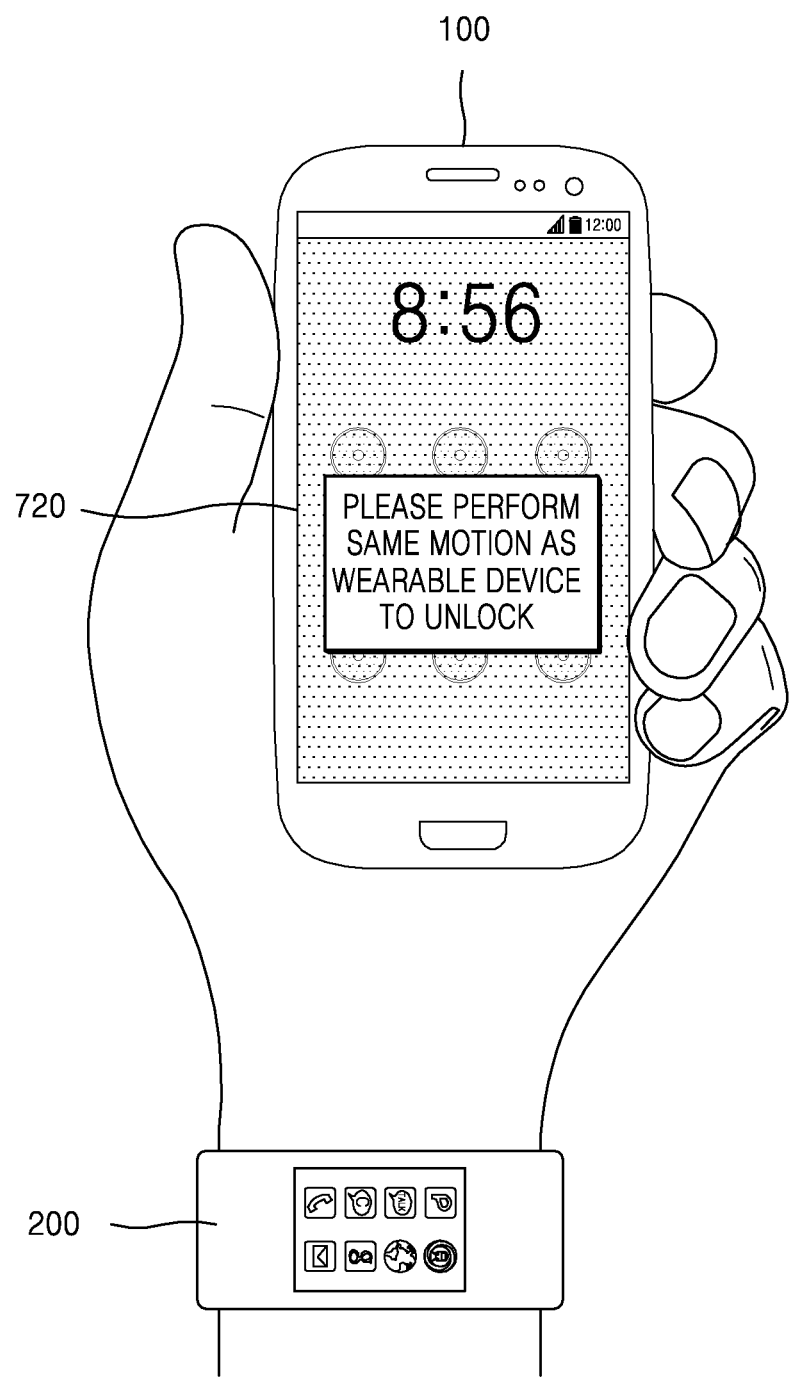
FIG. 7 is a diagram showing an example of displaying a motion unlock function notification message on a mobile terminal, according to an exemplary embodiment.

FIG. 7 is a diagram showing an example of displaying a motion unlock function notification message 720 on the mobile terminal 100, according to an exemplary embodiment.

Referring to FIG. 7, the mobile terminal 100 according to the exemplary embodiment may display the motion unlock function notification message 720 if it is determined that the wearable device 200 connected to the mobile terminal 100 is within a predetermined range.

For example, the mobile terminal 100 may recognize that the wearable device 200 is nearby based on short-range communication, and may determine whether the recognized wearable device 200 is a wearable device connected to the mobile terminal 100. Here, if the recognized wearable device 200 is connected to the mobile terminal 100 and the lock mode of the wearable device 200 is unlocked, the mobile terminal 100 may display the motion unlock function notification message 720 on the mobile terminal 100.

The motion unlock function notification message 720 may be a message notifying that the lock mode of the mobile terminal 100 may be unlocked, if the mobile terminal 100 sense the same motion as the wearable device 200 connected to the mobile terminal 100.

Otherwise, the motion unlock function notification message 720 may be a message displaying a predetermined motion and notifying that the lock mode of the mobile terminal 100 may be unlocked if the predetermined motion is performed.

For example, the motion unlock function notification message 720 may be displayed as a text or an image on a pop-up window, as shown in FIG. 7, but is not limited thereto, that is, the motion unlock function notification message 720 may be output as a voice. Accordingly, the user may easily recognize that the lock mode of the mobile terminal 100 may be unlocked if the user is wearing the mobile terminal 100 and the wearable device 200 connected to the mobile terminal 100 and if the same motion is sensed by the mobile terminal 100 and the wearable device 200.

FIGS. 8A to 9B are diagrams showing operations of unlocking a lock mode of the mobile terminal 100, if a user of the mobile terminal 100 and a wearer of the wearable device 200 are the same person, according to an exemplary embodiment.

FIGS. 8A to 9B show that the user of the mobile terminal 100 holds the mobile terminal 100 in his/her hand and wears the wearable device 200 on his/her wrist. In FIGS. 8A to 9B, the wearable device 200 is a watch that may be worn on the wrist, but is not limited thereto.

The mobile terminal 100 according to the exemplary embodiment may sense the motion of the mobile terminal 100, and the wearable device 200 according to the exemplary embodiment may sense the motion of the wearable device 200.

For example, as shown in FIGS. 8A, 8B, 9A, and 9B, if the user holds the mobile terminal 100 in his/her hand and lifts the mobile terminal 100 (the hand holding the mobile terminal 100 rotates by a predetermined angle in a counter-clockwise direction), the mobile terminal 100 may sense a direction in which the mobile terminal 100 moves, a moving distance of the mobile terminal 100, a rotating angle of the mobile terminal 100, and distances from the wearable device 200 before and after moving.

Also, if the wearer of the wearable device 200 raises his/her hand wearing the wearable device 200 (the wrist wearing the wearable device 200 rotates by a predetermined angle in a counter-clockwise direction), the wearable device 200 may sense a direction in which the wearable device 200 moves, a moving distance of the wearable device 200, a rotating angle of the wearable device 200, and distances from the mobile terminal 100 before and after moving. Also, the wearable device 200 may transmit the motion information thereof to the mobile terminal 100.

The mobile terminal 100 may compare the motion information of the mobile terminal 100 with the motion information of the wearable device 200. Here, the mobile terminal 100 may determine that the motion of the mobile terminal 100 is the same as the motion of the wearable device 200, provided that the motion information of the mobile terminal 100 (for example, a moving direction, a moving distance, a moving angle, a velocity, variation in the velocity, and distances from the wearable device 200 before and after moving) coincides with the motion information of the wearable device 200 (for example, a moving direction, a moving distance, a moving angle, a velocity, variation in the velocity, and distances from the mobile terminal 100 before and after moving) within a predetermined range.

In addition, if the motion of the mobile terminal 100 is the same as that of the wearable device 200 and the lock mode of the wearable device 200 is unlocked, the mobile terminal 100 may display a home screen 820 on the display thereof.

Figure 8A:
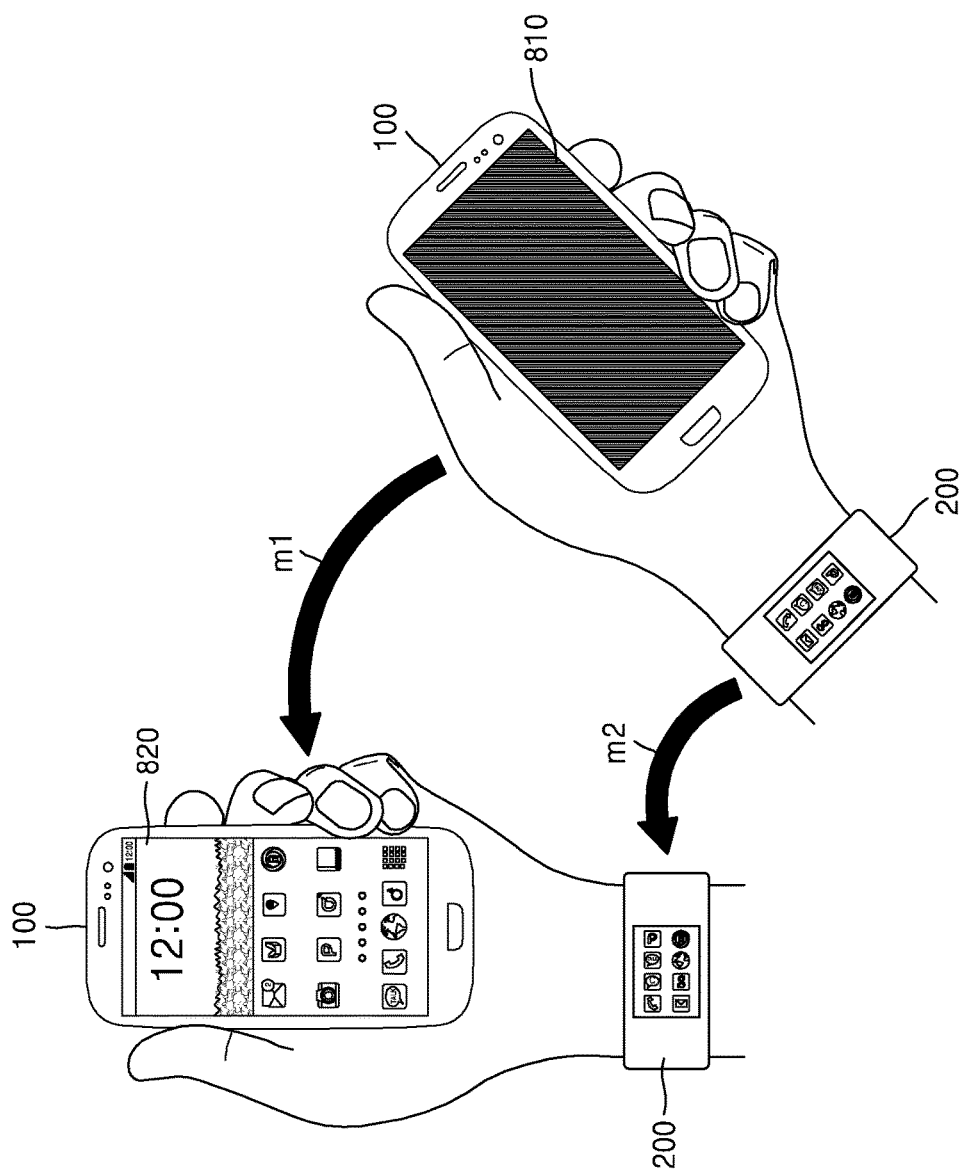

For example, as shown in FIG. 8A, the display of the mobile terminal 100 may be in an inactivated state 810. For example, the inactivated state 810 may be a turned-off state of the display of the mobile terminal 100. However, the display of the wearable device 200 may be in a turned-on state (activated state). If the motion of the mobile terminal 100 is the same as the motion of the wearable device 200 and the lock mode of the wearable device 200 is unlocked in a state where the mobile terminal 100 is in the inactivated state, the mobile terminal 100 may display the home screen 820 on the display thereof.

The home screen 820 may include icons corresponding to predetermined applications or a preset image, but is not limited thereto.

Otherwise, as shown in FIG. 8B, in a state where the display of the mobile terminal 100 and the display of the wearable device 200 are both turned off (inactivated states), if the motion of the mobile terminal 100 is the same as the motion of the wearable device 200 and the lock mode of the wearable device 200 is unlocked, the mobile terminal 100 may display the home screen 820 on the display thereof.

Figure 9A:
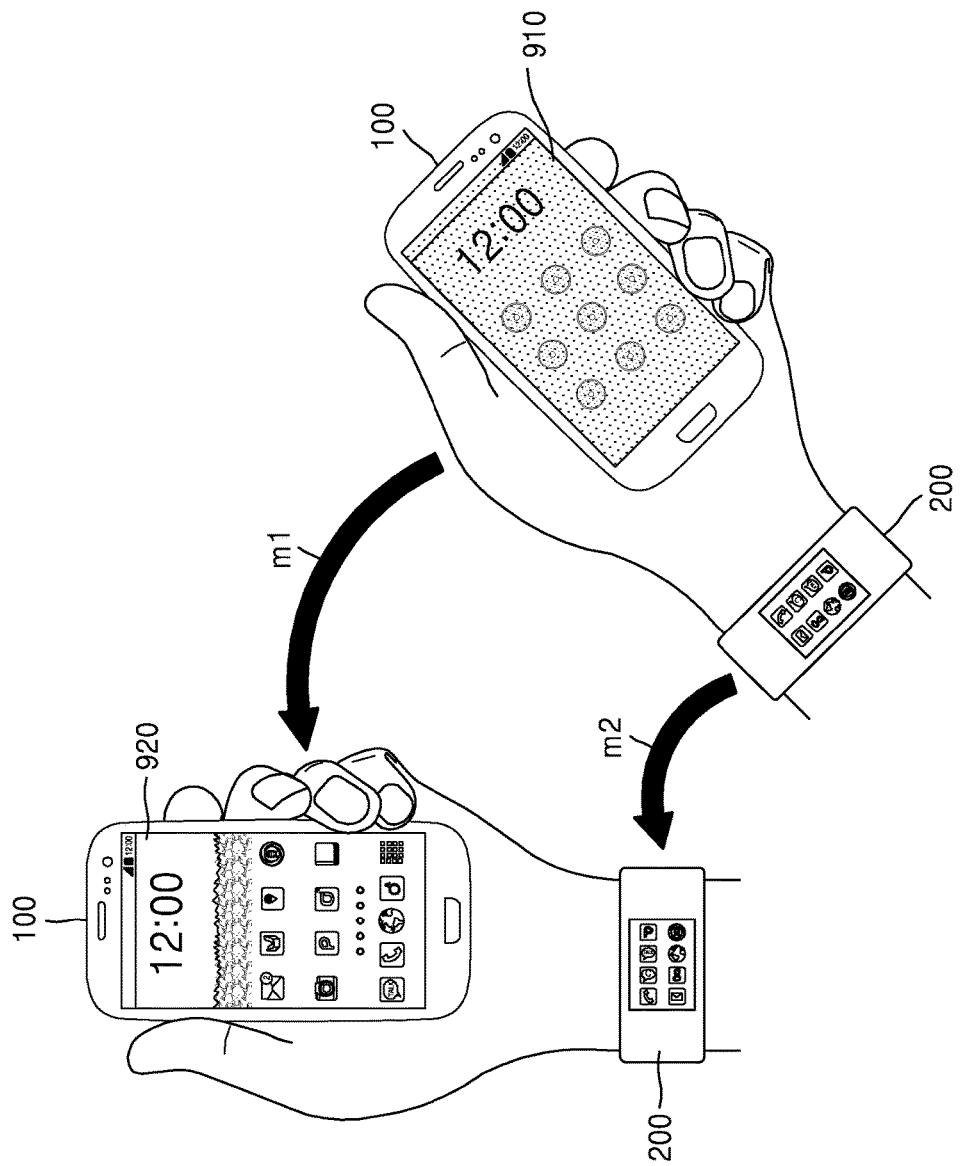

Otherwise, as shown in FIG. 9A, the mobile terminal 100 may display a lock mode screen 910 on the display thereof. The lock mode screen 910 may include a screen to which a password for unlocking the lock mode may be input. For example, the password for unlocking the lock mode may be a line pattern connecting a plurality of buttons, or a password consisting of numbers or characters, but is not limited thereto. Also, the display of the wearable device 200 may be in a turned on state (activated state).

If the motion of the mobile terminal 100 is the same as the motion of the wearable device 200 and the lock mode of the wearable device 200 is unlocked in a state where the lock mode screen 910 is displayed on the mobile terminal 100, the mobile terminal 100 may display a home screen 920 on the display thereof.

Otherwise, as shown in FIG. 9B, in a state where the lock mode screen 910 is displayed on the display of the mobile terminal 100 and the display of the wearable device 200 is in a turned off state (inactivated state), if the motion of the mobile terminal 100 is the same as the motion of the wearable device 200 and the lock mode of the wearable device 200 is unlocked, the mobile terminal 100 may display the home screen 920 on the display of the mobile terminal 100.

If the lock mode of the wearable device 200 is unlocked and the mobile terminal 100 recognizes that the user of the mobile terminal 100 is wearing the wearable device 200, the mobile terminal 100 may unlock the lock mode thereof without additionally requesting input of the password for unlocking the lock mode thereof.

Accordingly, in a case where a user holds the mobile terminal 100 in his/her hand while wearing the wearable device 200 on his/her wrist of the hand holding the mobile terminal 100, if the lock mode of the wearable device 200 is unlocked, the lock mode of the mobile terminal 100 may be unlocked only by a motion without passing through a predetermined authentication process (for example, inputting password or pattern) to unlock the lock mode of the mobile terminal 100.

Figure 11:
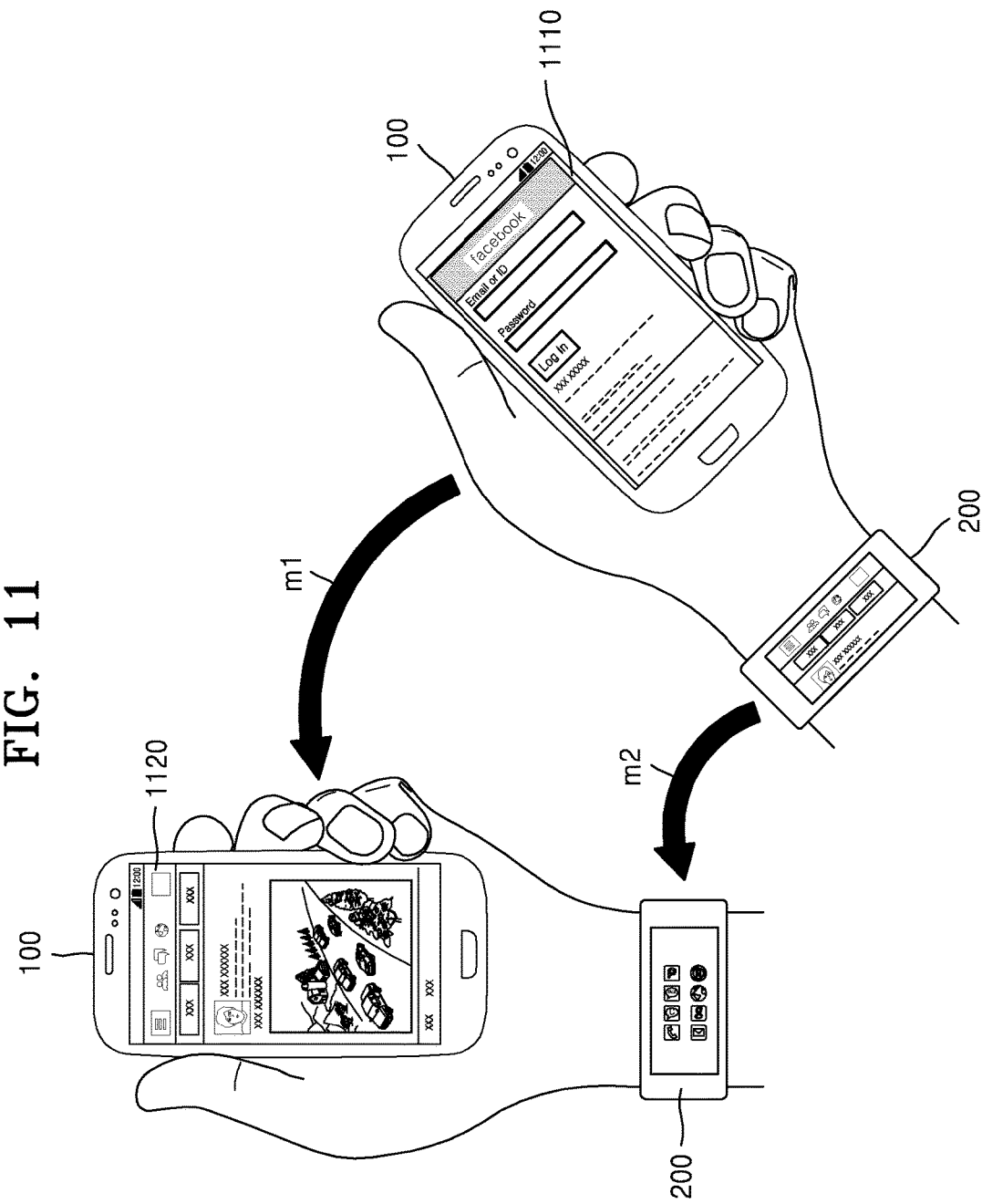
FIG. 11 is a diagram illustrating the method of FIG. 10.

FIG. 10 is a flowchart illustrating a method of performing a user authentication in the mobile terminal 100, in a case where the wearable device 200 performs the user authentication, according to an exemplary embodiment, and FIG. 11 is a diagram illustrating the method of FIG. 10.

According to the mobile terminal 100 of the exemplary embodiment, in a case where the motion of the mobile terminal 100, sensed by the mobile terminal 100, is the same as the motion of the wearable device 200, sensed by the wearable device 200, connected to the mobile terminal 100, if the wearable device 200 has already performed the user authentication, the mobile terminal 100 may perform the user authentication without inputting user authentication information to the mobile terminal 100. This will be described below in more detail.

Referring to FIG. 10, the wearable device 200 may perform a user authentication process in operation S1010.

The user of the wearable device 200 may input user authentication information (for example, user ID and password) to the wearable device 200 to perform user authentication with respect to a network or system. The user authentication denotes that the user is authorized to access the network or system.

For example, the user of the wearable device 200 may log-in to a site providing a service by using the user authentication information.

Referring back to FIG. 10, the wearable device 200 may transmit identification information to the mobile terminal 100 that is within a distance range set in advance, in operation S1020.

The mobile terminal 100 may recognize the wearable device 200 that is within the preset distance range from the mobile terminal 100, in operation S1030.

Also, the mobile terminal 100 may determine whether the recognized wearable device 200 is connected thereto in operation S1040.

In addition, in the flowchart of FIG. 10, operation S1010, in which the wearable device 200 displays a web page, is prior to operations S1020 to S1040, but is not limited thereto. That is, operation S1010 may be performed between operation S1020 and operation S1040, or may be performed between operation S1040 and operation S1050.

If the recognized wearable device 200 is connected to the mobile terminal 100, the mobile terminal 100 senses the motion thereof to acquire the motion information of the mobile terminal 100, in operation S1050.

In addition, the wearable device 200 senses the motion thereof to acquire the motion information of the wearable device 200 in operation S1055. Here, the wearable device 200 may sense the motion of the wearable device 200 at the same time when the mobile terminal 100 senses the motion thereof (operation S1050).

The mobile terminal 100 may request the wearable device 200 for the motion information of the wearable device 200 in operation S1060.

The wearable device 200 may transmit the motion information thereof to the mobile terminal 100 in operation S1065.

The mobile terminal 100 may determine whether the motion of the mobile terminal 100 is the same as the motion of the wearable device 200, in operation S1070.

The above described operations S1020 to S1070 of FIG. 10 correspond to operations S420 to S480 of FIG. 4, and thus, detailed descriptions thereof are omitted here.

If it is determined that the motion of the mobile terminal 100 is the same as the motion of the wearable device 200, the mobile terminal 100 may receive user authentication information from the wearable device 200, in operation S1080.

The mobile terminal 100 may access the network or system authenticated by the wearable device 200 based on the user authentication information transmitted from the wearable device 200, in operation S1090.

For example, referring to FIG. 11, the user authentication is already performed by the wearable device 200 with respect to a social network service (SNS) page, and the wearable device 200 is logged-in the SNS page. Then, the mobile terminal 100 may display a screen 1110 for receiving input of the user authentication information to log-in to the SNS page. Here, if the motion of the mobile terminal 100 is the same as the motion of the wearable device 200, the mobile terminal 100 may log-in to the SNS page, and display a page 1120 corresponding to the SNS page.

Accordingly, if the user has already authenticated on a site by using the wearable device 200, the user authentication may be performed on the site only by performing a motion (for example, holding and lifting the mobile terminal 100) without inputting the user authentication information to the mobile terminal 100.

Figure 12:
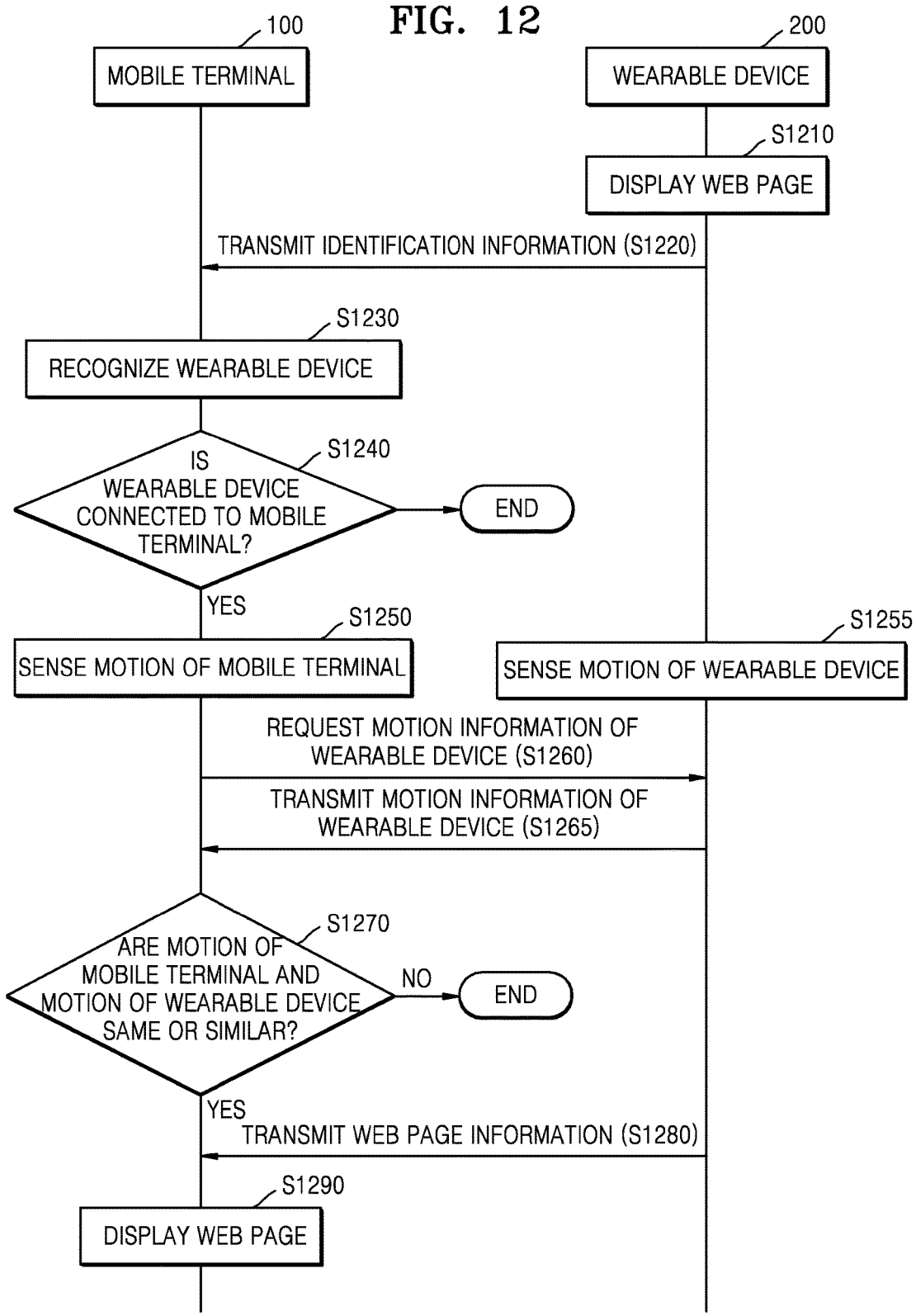
FIG. 12 is a flowchart illustrating a method of displaying a web page displayed on a wearable device, on a mobile terminal, according to an exemplary embodiment.
Figure 13:
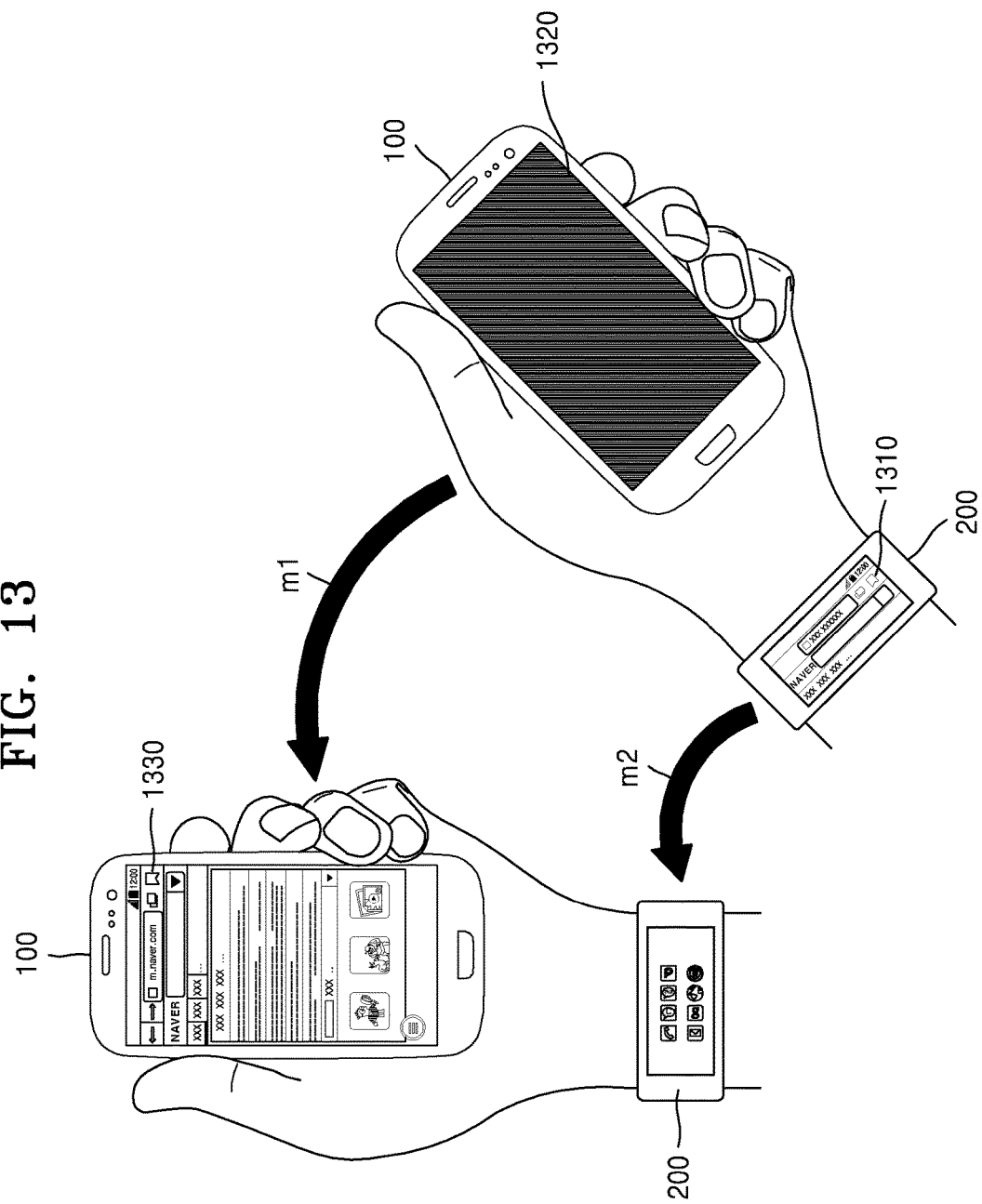
FIG. 13 is a diagram illustrating the method of FIG. 12.

FIG. 12 is a flowchart illustrating a method of displaying a web page displayed on the wearable device 200, on the mobile terminal 100, and FIG. 13 is a diagram illustrating the method of FIG. 12.

The mobile terminal 100 according to the exemplary embodiment may display a web page that is currently being displayed on the wearable device 200, on the mobile terminal 100, if the motion of the mobile terminal 100, sensed by the mobile terminal 100, is the same as the motion of the wearable device 200, sensed by the wearable device 200, connected to the mobile terminal 100. This will be described in detail as follows.

Web applications through which web browsing may be performed may be installed on the mobile terminal 100 and the wearable device 200 according to the exemplary embodiment.

Referring to FIG. 12, the wearable device 200 may display a web page in operation S1210.

For example, the user may execute a web application by using the wearable device 200, and when the web application is executed, a web page 1310 may be displayed on the display of the wearable device 200 as shown in FIG. 13. The web page 1310 is a page for representing web documents on the Internet, and may represent various pieces of content.

Referring back to FIG. 12, the wearable device 200 may transmit identification information to the mobile terminal 100 that is within a distance range set in advance, in operation S1220.

The mobile terminal 100 may recognize the wearable device 200 that is within the distance range set in advance from the mobile terminal 100, in operation S1230.

Also, the mobile terminal 100 may determine whether the recognized wearable device 200 is connected thereto, in operation S1240.

In addition, operation S1210, in which the wearable device 200 displays the web page, is prior to operations S1220 to S1240 in the flowchart of FIG. 12, but is not limited thereto. That is, operation S1210 may be performed between operations S1220, S1230, and S1240, or may be performed between operations S1240 and S1250.

If the recognized wearable device 200 is connected to the mobile terminal 100, the mobile terminal 100 may sense the motion thereof to acquire the motion information of the mobile terminal 100, in operation S1250.

In addition, the wearable device 200 may acquire motion information thereof by sensing the motion of the wearable device 200, in operation S1255. Here, the wearable device 200 may sense the motion of the wearable device 200 at the same time when the mobile terminal 100 senses the motion of the mobile terminal 100 (operation S1250).

The mobile terminal 100 may request the wearable device 200 for the motion information of the wearable device 200, in operation S1260.

The wearable device 200 may transmit the motion information of the wearable device 200, sensed by the wearable device 200, to the mobile terminal 100, in operation S1265.

The mobile terminal 100 may determine whether the motion of the mobile terminal 100 is the same as the motion of the wearable device 200, in operation S1270.

Operations S1220 to S1270 of FIG. 12 correspond to operations S420 to S480 of FIG. 4, and thus, detailed descriptions thereof are omitted.

If it is determined that the motion of the mobile terminal 100 is the same as the motion of the wearable device 200, the mobile terminal 100 may receive information about the web page that is currently being displayed on the wearable device 200 from the wearable device 200, in operation S1280.

For example, the mobile terminal 100 may receive address information of the web page that is currently being displayed on the wearable device 200.

The mobile terminal 100 may display a web page 1330 that is the same as the web page currently being displayed on the display of the wearable device 200, on the display of the mobile terminal 100, based on the web page information transmitted from the wearable device 200, in operation S1290.

For example, referring to FIG. 13, the mobile terminal 100 that is in an inactivated state 1320 may execute the web application and display the web page 1330 that is the same as the web page currently being displayed on the wearable device 200, based on the web page information transmitted from the wearable device 200.

Here, the web page displayed on the mobile terminal 100 and the web page displayed on the wearable device 200 may vary depending on kinds of the devices displaying the web pages. For example, the mobile terminal 100 may display the web page of a version for the mobile terminal 100, and the wearable device 200 may display the web page of a version for the wearable device 200.

In addition, the wearable device 200 may switch the display of the wearable device 200 into an inactivated state or may display a screen including information (for example, time and weather) on the display of the wearable device 200, but is not limited thereto.

Accordingly, if the user browsing the web through the wearable device 200 wants to browse the web through the mobile terminal 100, the web page that is currently being displayed on the wearable device 200 may be displayed on the mobile terminal 100 only by performing a motion (for example, holding and lifting the mobile terminal 100) without inputting an address of the web page into the mobile terminal 100.

Also, the mobile terminal 100 may receive web browsing history data of the wearable device 200. Accordingly, the mobile terminal 100 is capable of displaying, on the mobile terminal 100, a previous web page that has been displayed on the wearable device 200, as well as the web page that is the same as the web page currently being displayed on the wearable device 200, if a back button input (an input for moving to the previous page of the current web page) is received.

Figure 14:
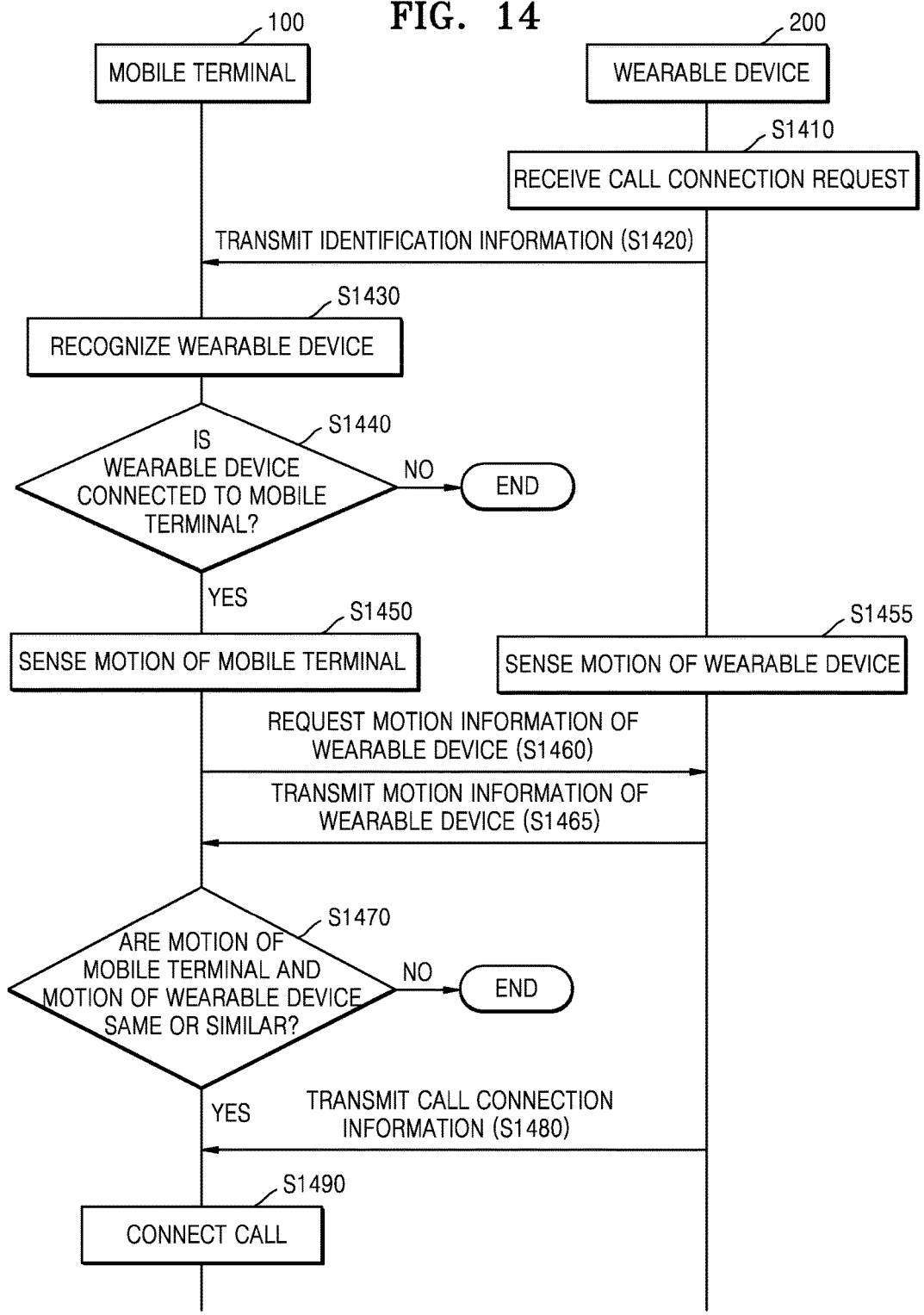
FIG. 14 is a flowchart illustrating a method of making a phone call by using a mobile terminal if a wearable device receives a call connection request, according to an exemplary embodiment.
Figure 15:
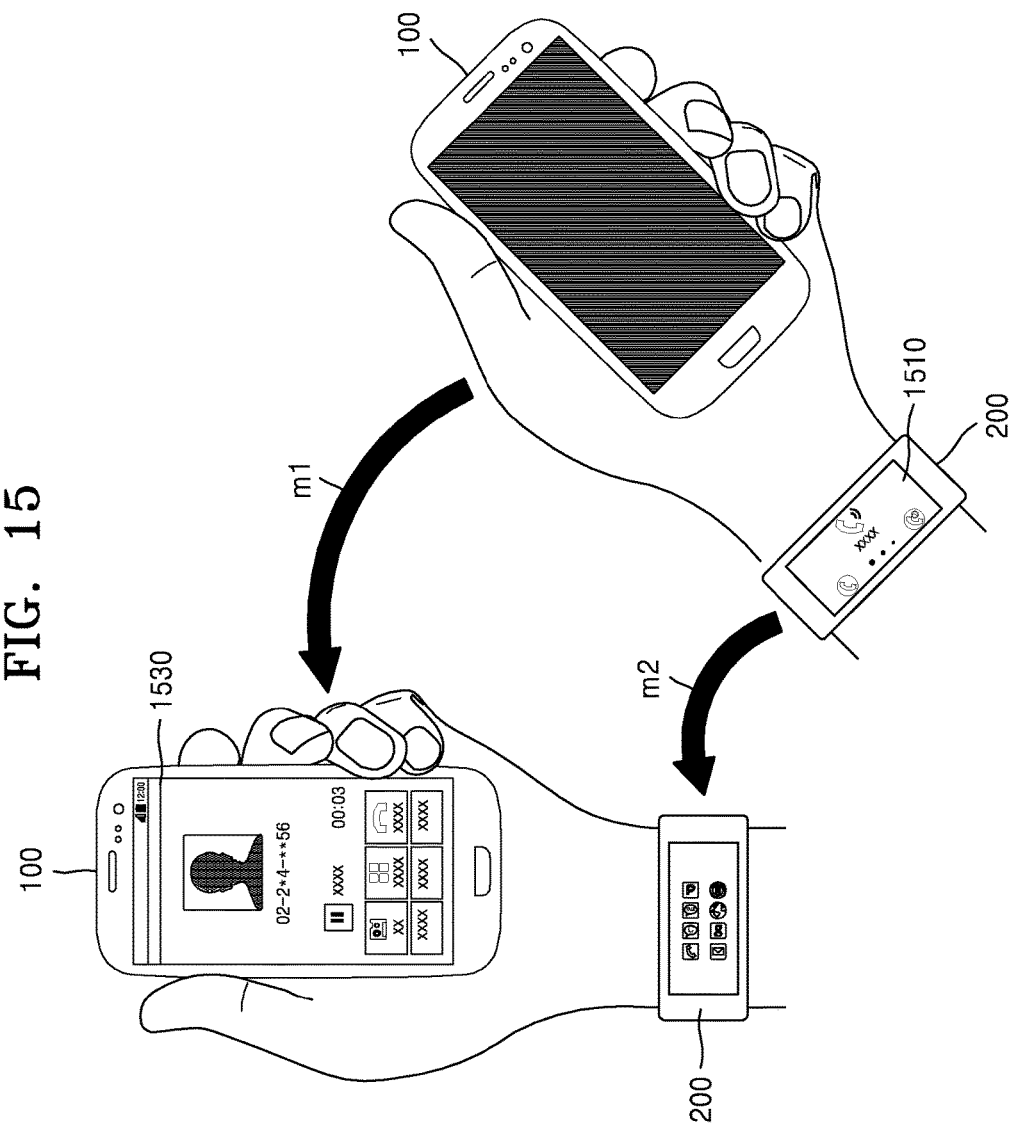
FIG. 15 is a diagram illustrating the method of FIG. 14.

FIG. 14 is a flowchart illustrating a method of making a phone call by using the mobile terminal 100 if the wearable device 200 receives a call connection request, according to an exemplary embodiment, and FIG. 15 is a diagram illustrating the method of FIG. 14.

If the motion of the mobile terminal 100, sensed by the mobile terminal 100, is the same as the motion of the wearable device 200, sensed by the wearable device, connected to the mobile terminal 100, the mobile terminal 100 may make a phone call that the wearable device 200 was requested. This will be described in more detail later.

Phone call applications that may make phone calls to external devices may be installed on the mobile terminal 100 and the wearable device 200 according to the exemplary embodiment.

Referring to FIG. 14, the wearable device 200 may receive a call connection request from an external device, in operation S1410.

For example, if the wearable device 200 receives a call connection request, a call connection request screen 1510 may be displayed on the wearable device 200 as shown in FIG. 15.

Here, the call connection request screen 1510 may indicate identification information of a counterpart device that has requested the call connection. The identification information of the counterpart device may include a phone number of the counterpart device, a user name of the counterpart device, or a nickname. Also, the call connection request screen 1510 may include a connection button or a block button.

In addition, if the wearable device 200 receives the call connection request, the mobile terminal 100 may simultaneously receive the call connection request from the same external device. However, one or more exemplary embodiments are not limited thereto.

Referring back to FIG. 14, the wearable device 200 may transmit identification information to the mobile terminal 100 that is in a distance range set in advance, in operation S1420.

The mobile terminal 100 may recognize the wearable device 200 that is in the preset distance range from the mobile terminal 100, in operation S1430.

Also, the mobile terminal 100 may determine whether the recognized device 200 is connected thereto, in operation S1440.

In addition, in the flowchart of FIG. 14, operation S1410, in which the wearable device 200 receives the call connection request, is prior to operations S1420 to S1440, but is not limited thereto. That is, operation S1410 may be performed between operations S1420, S1430, and S1440, or may be performed between operations S1440 and S1450.

If the recognized wearable device 200 is a wearable device connected to the mobile terminal 100, the mobile terminal 100 may sense the motion of the mobile terminal 100 to acquire the motion information of the mobile terminal 100, in operation S1450.

In addition, the wearable device 200 may acquire the motion information of the wearable device 200 by sensing the motion of the wearable device 200, in operation S1455. Here, the wearable device 200 may sense the motion of the wearable device 200 at the same time when the mobile terminal 100 senses the motion of the mobile terminal 100 (operation S1450).

The mobile terminal 100 may request the wearable device 200 for the motion information of the wearable device 200, in operation S1460.

The wearable device 200 may transmit the motion information of the wearable device 200 to the mobile terminal 100, in operation S1465.

The mobile terminal 100 may determine whether the motion of the mobile terminal 100 is the same as the motion of the wearable device 200, in operation S1470.

Operations S1420 to S1470 of FIG. 14 correspond to operations S420 to S480 of FIG. 4, and thus, detailed descriptions thereof are omitted.

If it is determined that the motion of the mobile terminal 100 is the same as the motion of the wearable device 200, the wearable device 200 may transmit call connection information corresponding to the call connection request that the wearable device 200 has received, to the mobile terminal 100, in operation S1480.

For example, the mobile terminal 100 may receive the identification information of the counterpart device that requested the wearable device 200 for the call connection, and may display a call connection request screen 1530 as shown in FIG. 15.

The mobile terminal 100 may connect the call with the counterpart device that has requested the wearable device 200 for the call connection based on the call connection information, in operation S1490.

Accordingly, if the wearable device 200 displays the call connection screen, the user may receive the call only by performing a motion (for example, holding and lifting the mobile terminal 100) without inputting a call connection button to the mobile terminal 100.

Figure 16:
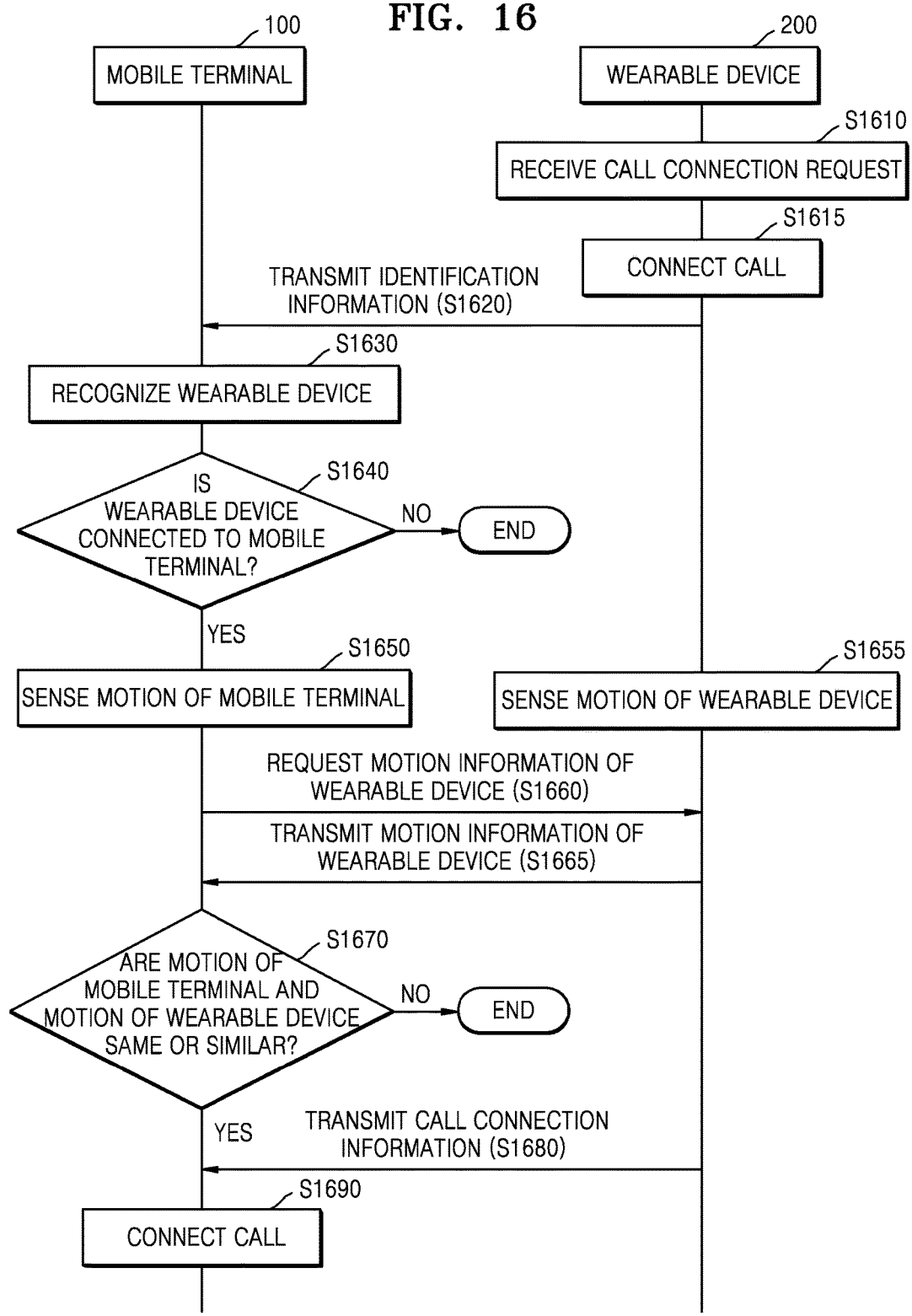
FIG. 16 is a flowchart illustrating a method of performing a phone call with an external device by using a mobile terminal, while the phone call is made with the external device by using a wearable device, according to an exemplary embodiment.
Figure 17:
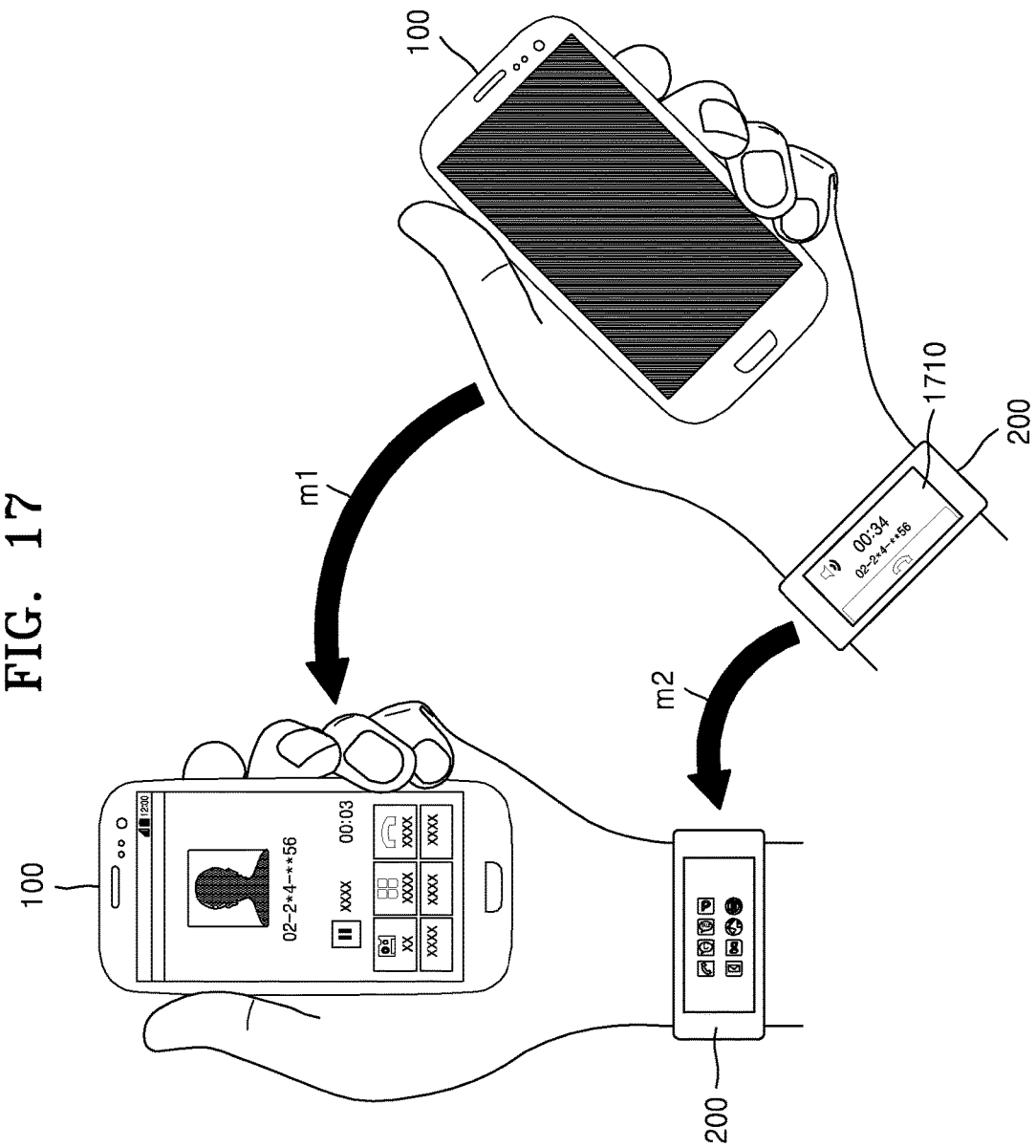
FIG. 17 is a diagram illustrating the method of FIG. 16.

FIG. 16 is a flowchart illustrating a method of performing a phone call with an external device by using the mobile terminal 100, while the phone call is made with the external device by using the wearable device 200, according to an exemplary embodiment, and FIG. 17 is a diagram illustrating the method of FIG. 16.

If the motion of the mobile terminal 100, sensed by the mobile terminal 100, is the same as the motion of the wearable device 200, sensed by the wearable device 200, connected to the mobile terminal 100, the mobile terminal 100 according to the exemplary embodiment may perform the phone call that has been made by the wearable device 200. This will be described in more detail as follows.

Referring to FIG. 16, the wearable device 200 may receive a call connection request from an external device in operation S1610.

For example, if the wearable device 200 receives the call connection request, a call connection request screen 1710 may be displayed as shown in FIG. 17. In addition, the user may select a call connection button included in the call connection request screen 1710 to connect the call with the external device, in operation S1615.

Referring to FIG. 16, the wearable device 200 may transmit identification information to the mobile terminal 100 that is within a distance range set in advance, in operation S1620.

The mobile terminal 100 may recognize the wearable device 200 that is in the distance range set in advance from the mobile terminal 100, in operation S1630.

Also, the mobile terminal 100 may determine whether the recognized device 200 is a wearable device connected thereto, in operation S1640.

In addition, in the flowchart of FIG. 16, operation S1610, in which the wearable device 200 receives the call connection request, is prior to operations S1620 to S1640, but is not limited thereto. That is, operation S1610 may be performed between operations S1620, S1630, and S1640, or may be performed between operations S1640 and S1650.

If the recognized wearable device 200 is connected to the mobile terminal 100, the mobile terminal 100 may sense the motion of the mobile terminal 100 to acquire the motion information of the mobile terminal 100, in operation S1650.

In addition, the wearable device 200 may acquire the motion information of the wearable device 200 by sensing the motion of the wearable device 200, in operation S1655. Here, the wearable device 200 may sense the motion of the wearable device 200 at the same time when the mobile terminal 100 senses the motion of the mobile terminal 100 (operation S1650).

The mobile terminal 100 may request the wearable device 200 for the motion information of the wearable device 200, in operation S1660.

The wearable device 200 may transmit the motion information of the wearable device 200 to the mobile terminal 100, in operation S1665.

The mobile terminal 100 may determine whether the motion of the mobile terminal 100 is the same as the motion of the wearable device 200, in operation S1670.

Operations S1620 to S1670 of FIG. 16 correspond to operations S420 to S480 of FIG. 4, and thus, detailed descriptions thereof are omitted.

If it is determined that the motion of the mobile terminal 100 is the same as the motion of the wearable device 200, the wearable device 200 may transmit call connection information to the mobile terminal 100, in operation S1680.

For example, the mobile terminal 100 may receive identification information of the counterpart device that currently connects the call with the wearable device 200.

The mobile terminal 100 may connect a call to the counter device that is currently calling with the wearable device 200, based on the call connection information transmitted from the wearable device 200, in operation S1690. Here, when the call connection between the mobile terminal 100 and the counterpart device is performed, the call connection between the wearable device 200 and the counterpart device may be terminated. For example, the mobile terminal 100 may transmit the call connection information to a base station or a server of a communication provider, and the base station or the server of the communication provider may connect a call between the counterpart device calling with the wearable device 200 and the mobile terminal 100 (for example, routing) based on the call connection information that has transmitted from the mobile terminal 100.

Otherwise, the mobile terminal 100 may be used as a call interface while the call connection between the wearable device 200 and the counterpart device is maintained. For example, the wearable device 200 may transmit a voice signal transmitted from the counterpart device to the mobile terminal 100 via the base station or the server of the communication provider. The mobile terminal 100 may output the voice signal transmitted from the wearable device 200, and may transmit a voice signal input into the mobile terminal 100 to the wearable device 200. The wearable device 200 may transmit the voice signal to the counterpart device via the base station or the server of the communication provider.

Accordingly, if the user wants to make a call by using the mobile terminal 100 instead of using the wearable device 200 when the user is making a call with a counterpart (user of the external device) by using the wearable device 200, the user may perform a call connection with the external device only by performing a motion (for example, holding and lifting the mobile terminal 100). Therefore, the user does not need to hang up on the counterpart while using the wearable device 200 and to make a call again by using the mobile terminal 100.

Figure 18:
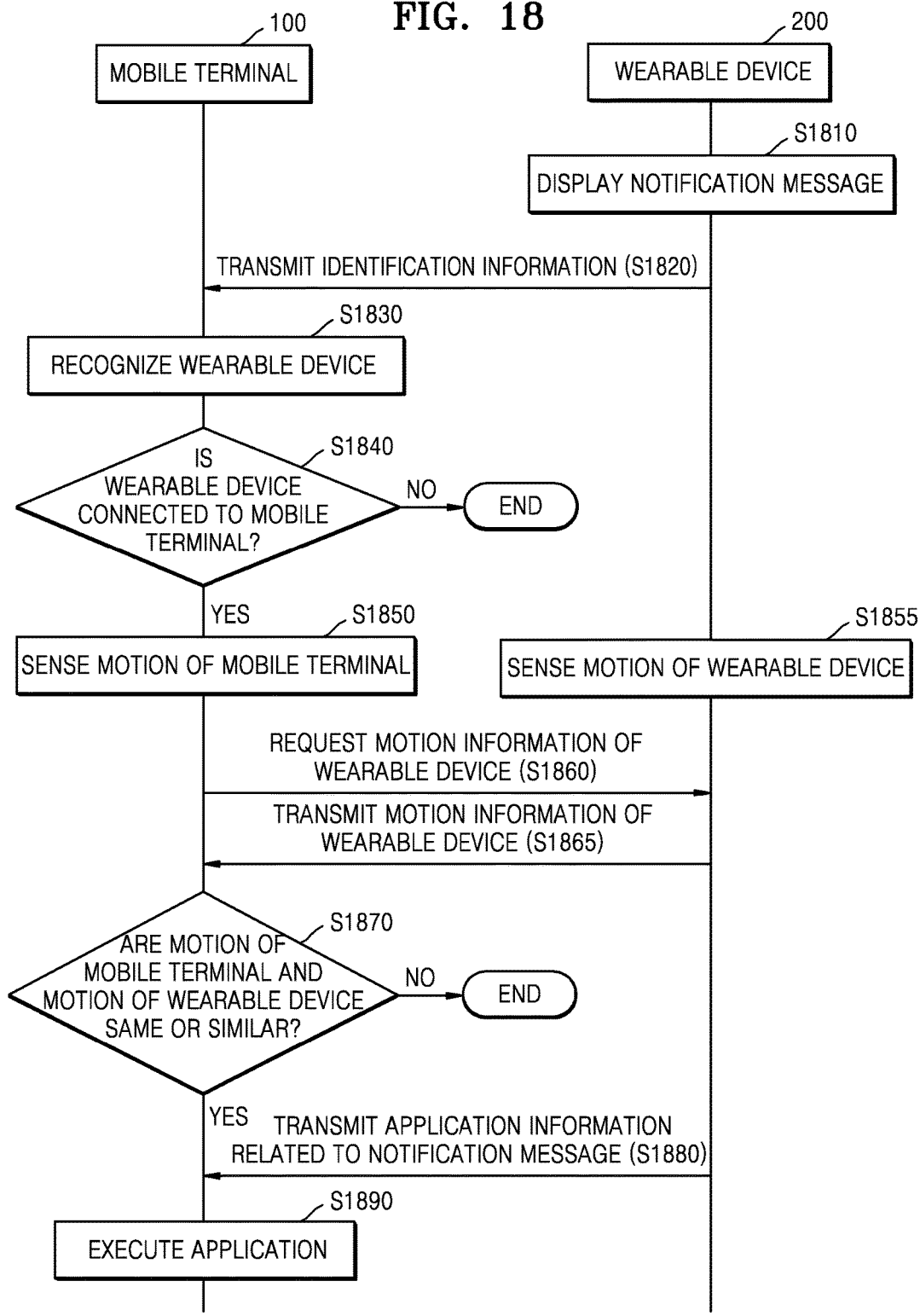
FIG. 18 is a flowchart illustrating a method of executing an application related to a notification message in a mobile terminal, when a wearable device receives the notification message, according to an exemplary embodiment.
Figure 19:
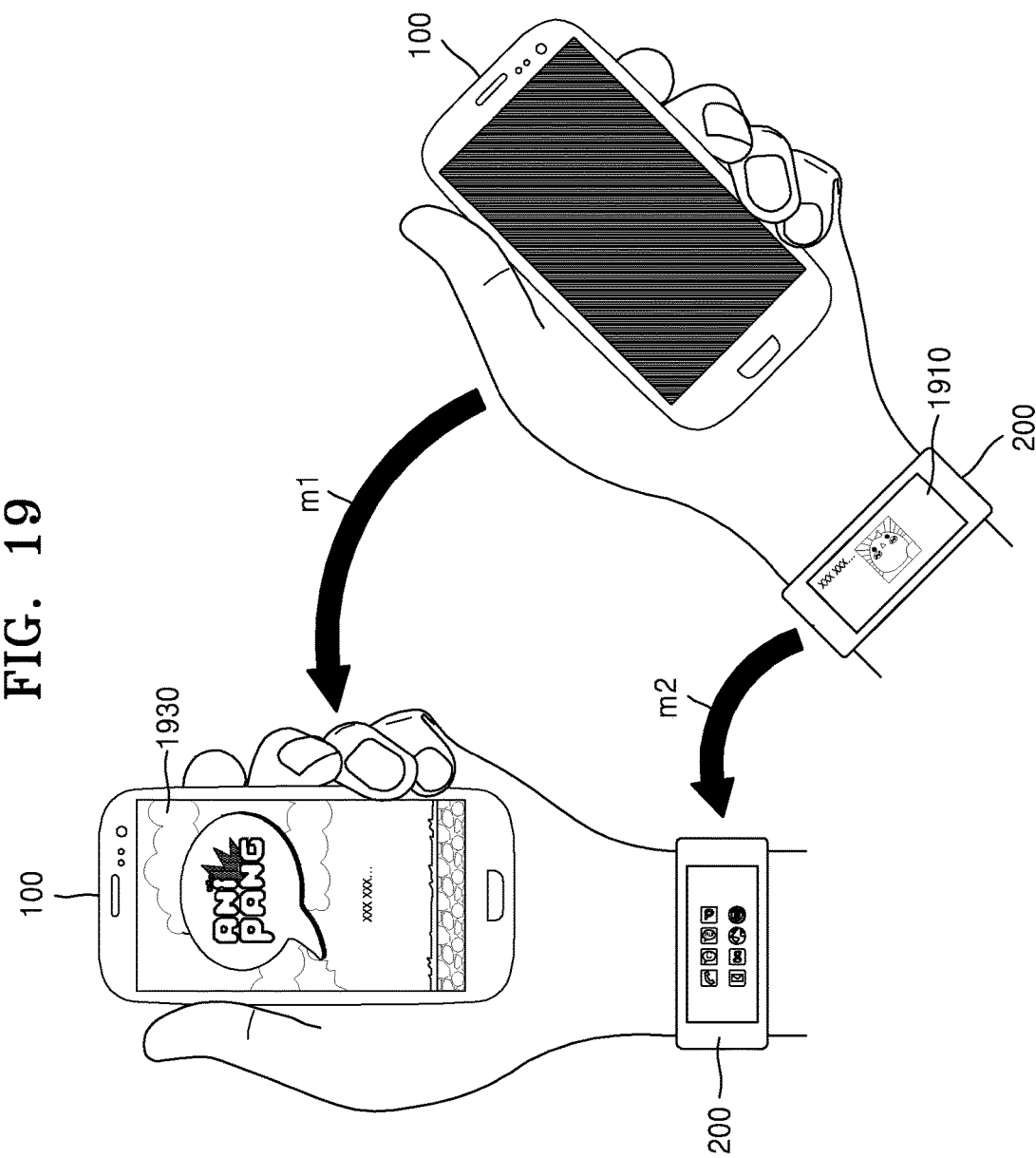
FIGS. 19 and 20 are diagrams illustrating the method of FIG. 18.
Figure 20:
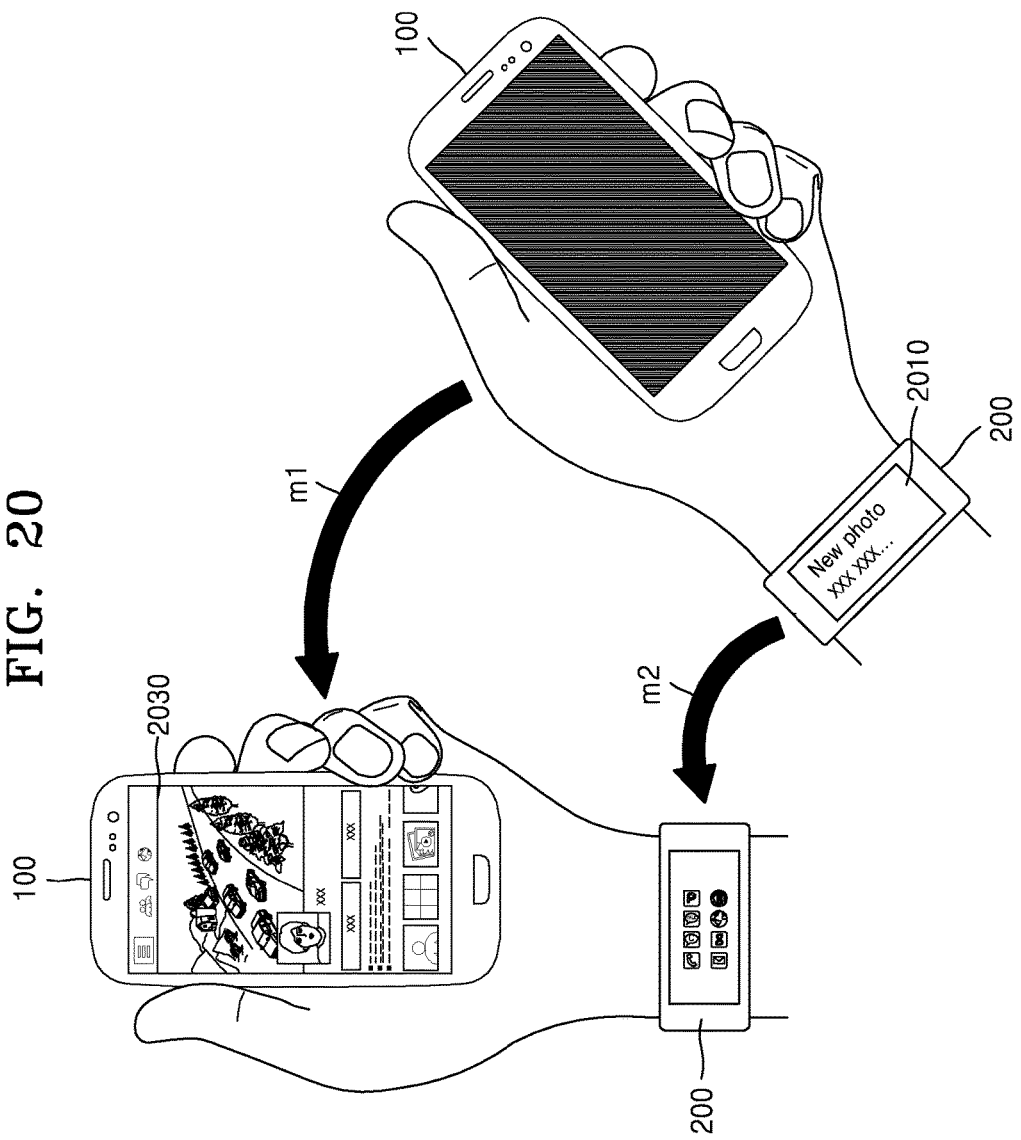

FIG. 18 is a flowchart illustrating a method of executing an application related to a notification message in the mobile terminal 100, when the wearable device 200 receives the notification message, according to an exemplary embodiment, and FIGS. 19 and 20 are diagrams illustrating the method of FIG. 18.

If the motion of the mobile terminal 100, sensed by the mobile terminal 100, is the same as the motion of the wearable device 200, sensed by the wearable device 200, connected to the mobile terminal 100, the mobile terminal 100 according to the exemplary embodiment may execute an application related to a notification message that the wearable device 200 has received. This will be described in more detail as follows.

Referring to FIG. 18, the wearable device 200 may display a notification message in operation S1810.

For example, as shown in FIG. 19, the wearable device 200 may receive a notification message 1910 relating to a game application and display the notification message 1910 on the display. Otherwise, as shown in FIG. 20, the wearable device 200 may receive a notification message 2010 relating to an SNS application and display the notification message 2010 on the display. However, one or more exemplary embodiments are not limited thereto, that is, the wearable device 200 may receive notification messages relating to various applications and display the notification messages on the display. Also, the notification message may be displayed as a pop-up window.

Referring back to FIG. 18, the wearable device 200 may transmit identification information to the mobile terminal 100 that is within a distance range set in advance, in operation S1820.

The mobile terminal 100 may recognize the wearable device 200 existing within the preset distance range from the mobile terminal 100, in operation S1830.

Also, the mobile terminal 100 may determine whether the recognized wearable device 200 is a wearable device connected to the mobile terminal 100, in operation S1840.

In addition, in the flowchart of FIG. 18, operation S1810, in which the wearable device 200 displays a notification message, is prior to operations S1820 to S1840, but is not limited thereto. That is, operation S1810 may be performed between operations S1820, S1830, and S1840, or may be performed between operations S1840 and S1850.

If the recognized wearable device 200 is a wearable device connected to the mobile terminal 100, the mobile terminal 100 may sense the motion of the mobile terminal 100 to acquire the motion information of the mobile terminal 100, in operation S1850.

In addition, the wearable device 200 may sense the motion of the wearable device 200 to acquire the motion information of the wearable device 200 in operation S1855. Here, the wearable device 200 may sense the motion of the wearable device 200 at the same time when the mobile terminal 100 senses the motion of the mobile terminal (operation S1850).

The mobile terminal 100 may request the wearable device 200 for the motion information of the wearable device 200 in operation S1860.

The wearable device 200 may transmit the motion information of the wearable device 200 to the mobile terminal 100, in operation S1865.

The mobile terminal 100 may determine whether the motion of the mobile terminal 100 is the same as the motion of the wearable device 200, in operation S1870.

Operations S1820 to S1870 of FIG. 18 correspond to operations S420 to S480 of FIG. 4, and thus, detailed descriptions thereof are omitted.

If it is determined that the motion of the mobile terminal 100 is the same as the motion of the wearable device 200, the wearable device 200 may transmit application information related to the notification message to the mobile terminal 100, in operation S1880.

For example, the application information related to the notification message may include name of the application, a kind of the application, version information of the application, or execution information of the application (information for executing the application).

The mobile terminal 100 may execute the application corresponding to the notification message displayed on the wearable device 200, based on the application information related to the notification message transmitted from the wearable device 200, in operation S1890.

Here, the application related to the notification message displayed on the wearable device 200 may be already installed on the mobile terminal 100.

For example, the mobile terminal 100 may execute a game application 1930 related to the game notification message 1910 displayed on the wearable device 200, as shown in FIG. 19.

Accordingly, if the user wants to execute the application related to the notification message displayed on the wearable device 200 in the mobile terminal 100, the user does not need to select and execute the application on the mobile terminal 100, but may execute the application, which is related to the notification message displayed on the wearable device 200, in the mobile terminal 100 only by performing a motion (for example, holding and lifting the mobile terminal 100).

FIG. 20 is a diagram illustrating a method of executing an SNS application 2030 in the mobile terminal 100 when the notification message 2010 relating to the SNS application is displayed on the wearable device 200, according to the exemplary embodiment.

As shown in FIG. 20, the wearable device 200 may receive and display the notification message 2010 regarding an SNS application.

For example, the wearable device 200 may display a message notifying that a social friend included in the same social group as the user has uploaded a new photo on the SNS.

As described in above operations S1850 to S1870, if it is determined that the motion of the mobile terminal 100 is the same as the motion of the wearable device 200, the mobile terminal 100 may receive SNS application information and SNS notification message information from the wearable device 200.

The SNS application information may include a name of the SNS application, the kind of the SNS application, version information of the SNS application, or execution information of the SNS application (information for executing the SNS application). The SNS notification message information may include information about a social page relating to the notification message 2010 displayed on the wearable device 200 (for example, if the notification message 2010 includes updated content on a web page of the social friend, information about the web page address of the social page).

The mobile terminal 100 may execute the application 2030 related to the SNS notification message 2010 displayed on the wearable device 200, based on the SNS application information and the SNS notification message information transmitted from the wearable device 200.

For example, as shown in FIG. 20, if the notification message 2010 displayed on the wearable device 200 notifies that the social friend included in the same social group as that of the user of the wearable device 200 has uploaded a new photo on the SNS site, the mobile terminal 100 may execute the SNS application 2030 corresponding to the notification message 2010 to display a web page of the social friend or a web page including the photo that the social friend has uploaded. However, one or more exemplary embodiments are not limited thereto.

Accordingly, if the user wants to identify the content regarding the SNS notification message 2010, which is displayed on the wearable device 200, on the mobile terminal 100, the user does not need to select and execute the SNS application 2030 in the mobile terminal 100, but only performs a motion (for example, holding and lifting the mobile terminal 100) to check the content related to the notification message 2010 displayed on the wearable device 200 via the mobile terminal 100.

Figure 21:
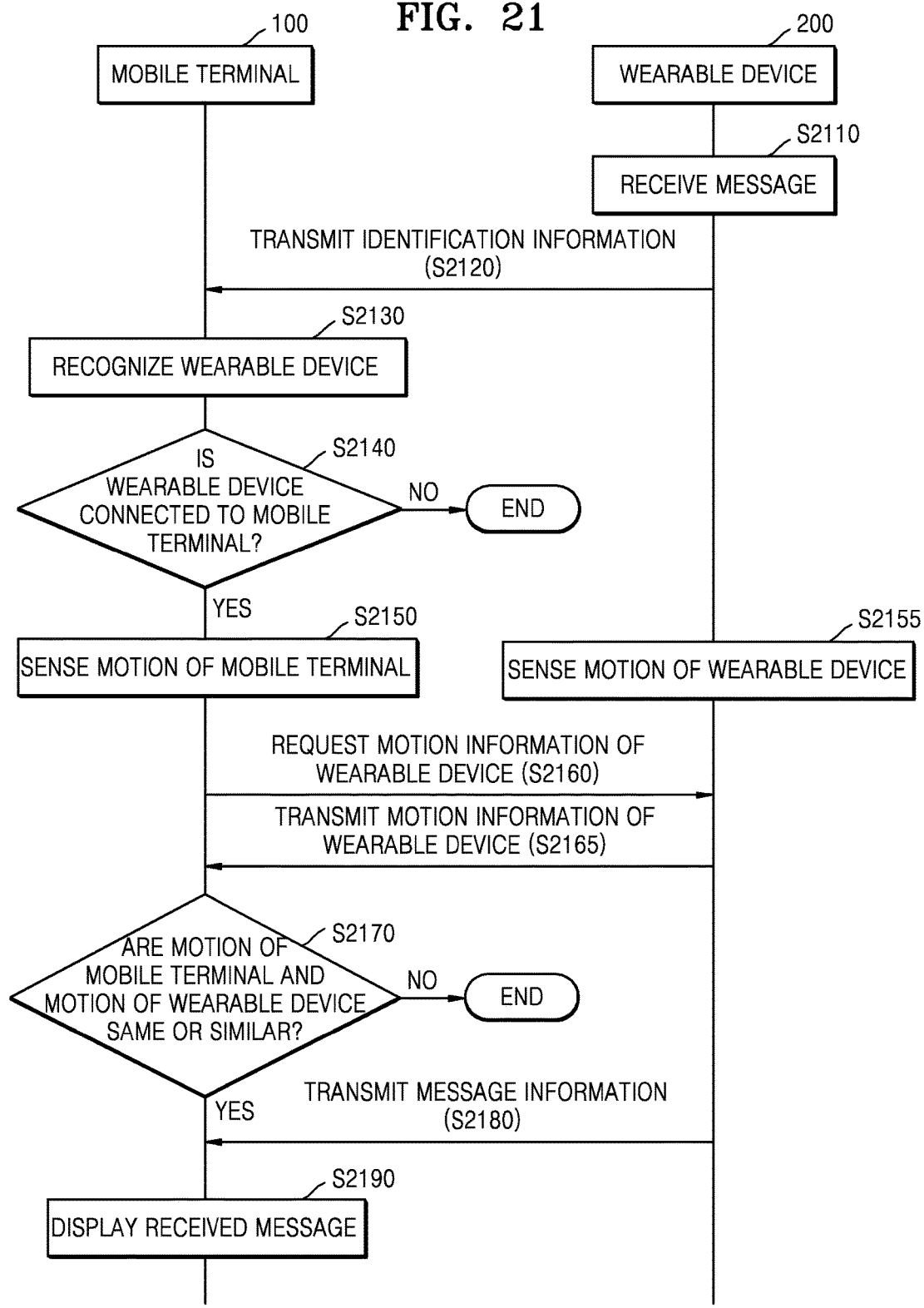
FIG. 21 is a flowchart illustrating a method of displaying a message on a mobile terminal, when a wearable device receives the message, according to an exemplary embodiment.
Figure 22:
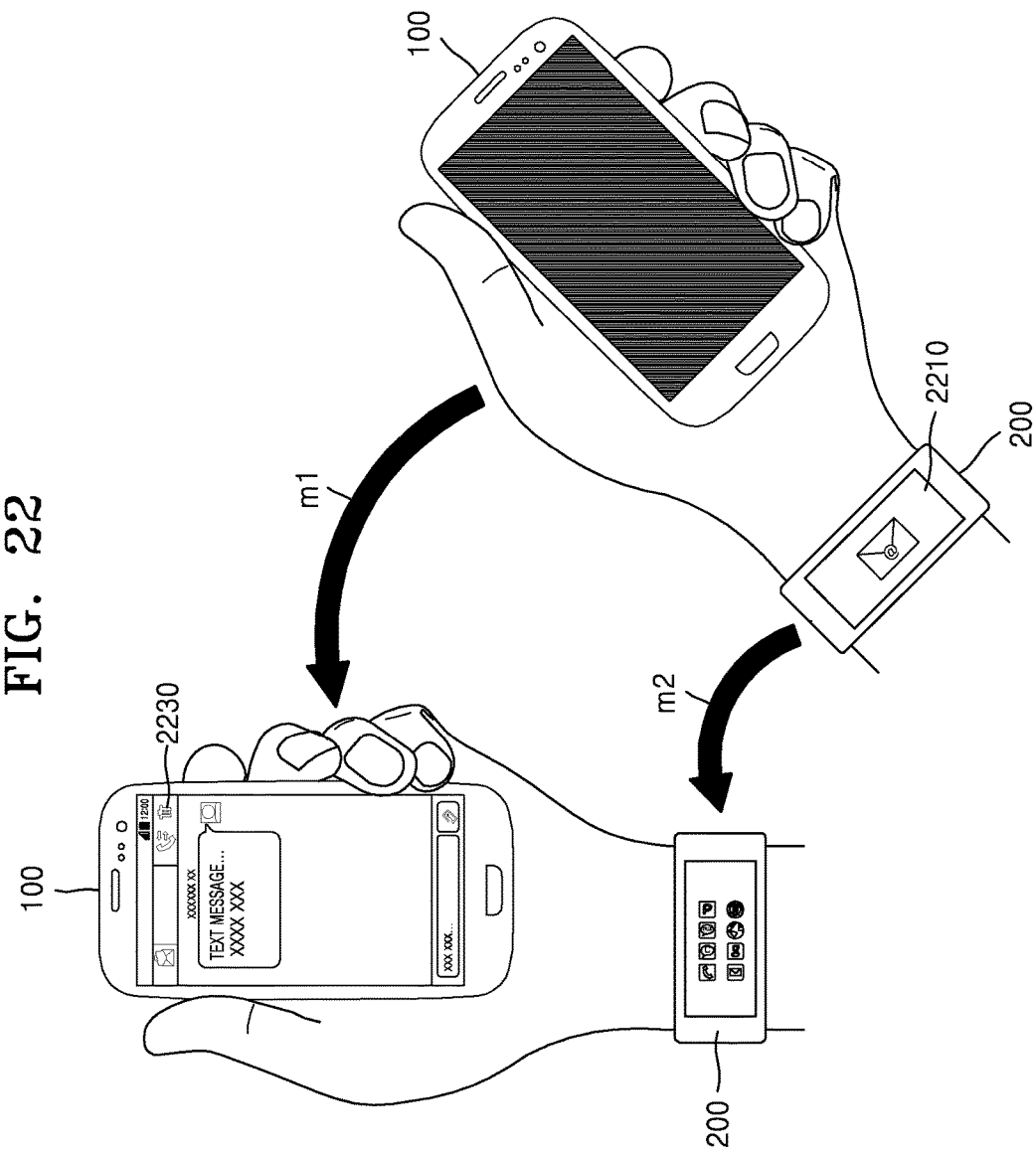
FIG. 22 is a diagram illustrating the method of FIG. 21.

FIG. 21 is a flowchart illustrating a method of displaying a message on the mobile terminal 100, when the wearable device 200 receives the message, according to an exemplary embodiment, and FIG. 22 is a diagram illustrating the method of FIG. 21.

If the motion of the mobile terminal 100, sensed by the mobile terminal 100, is the same as the motion of the wearable device 200, sensed by the wearable device 200, the mobile terminal 100 may display the message that the wearable device 200 has received. This will be described in more detail as follows.

Referring to FIG. 21, the wearable device 200 may receive a message in operation S2110.

The message may include a text message, an instant message, a chatting message, or an e-mail transmitted from an external device. Also, the wearable device 200 may output an alarm when receiving the message. For example, as shown in FIG. 22, a notification message 2210 indicating the receipt of the message may be displayed on the display of the wearable device 200, or an alarm or vibration may be output. However, one or more exemplary embodiments are not limited thereto.

Referring to FIG. 21, the wearable device 200 may transmit identification information to the mobile terminal 100 that is within a distance range set in advance, in operation S2120.

The mobile terminal 100 may recognize the wearable device 200 existing within the distance range set in advance from the mobile terminal 100, in operation S2130.

Also, the mobile terminal 100 may determine whether the recognized wearable device 200 is connected to the mobile terminal 100, in operation S2140.

In addition, in the flowchart of FIG. 21, operation S2110, in which the wearable device 200 receives the message, is prior to operations S2120 to S2140, but is not limited thereto. That is, operation S2110 may be performed between operations S2120, S2130, and S2140, or may be performed between operations S2140 and S2150.

If the recognized wearable device 200 is a wearable device connected to the mobile terminal 100, the mobile terminal 100 may sense the motion of the mobile terminal 100 to acquire the motion information of the mobile terminal 100, in operation S2150.

In addition, the wearable device 200 may sense the motion of the wearable device 200 to acquire the motion information of the wearable device 200 in operation S2155. Here, the wearable device 200 may sense the motion of the wearable device 200 at the same time when the mobile terminal 100 senses the motion of the mobile terminal (operation S2150).

The mobile terminal 100 may request the wearable device 200 for the motion information of the wearable device 200, in operation S2160.

The wearable device 200 may transmit the motion information of the wearable device 200 to the mobile terminal 100, in operation S2165.

The mobile terminal 100 may determine whether the motion of the mobile terminal 100 is the same as the motion of the wearable device 200, in operation S2170.

Operations S2120 to S2170 of FIG. 21 correspond to operations S420 to S480 of FIG. 4, and thus, detailed descriptions thereof are omitted.

If it is determined that the motion of the mobile terminal 100 is the same as the motion of the wearable device 200, the wearable device 200 may transmit message information to the mobile terminal 100, in operation S2180.

The mobile terminal 100 may display the message that the wearable device 200 has received, based on the message information transmitted from the wearable device 200, in operation S2190.

Referring to FIG. 22, an application related to the message transmitted from the wearable device 200 may be a message application 2230 that has been already installed on the mobile terminal 100, and the mobile terminal 100 may execute the message application 2230 to display the message transmitted from the wearable device 200.

Accordingly, if the user wants to check the message that the wearable device 200 has received via the mobile terminal 100, the user does not need to select and execute the message application on the mobile terminal 100, but only performs a motion (for example, holding and lifting the mobile terminal 100) to check the message that the wearable device 200 has received.

Figure 23:
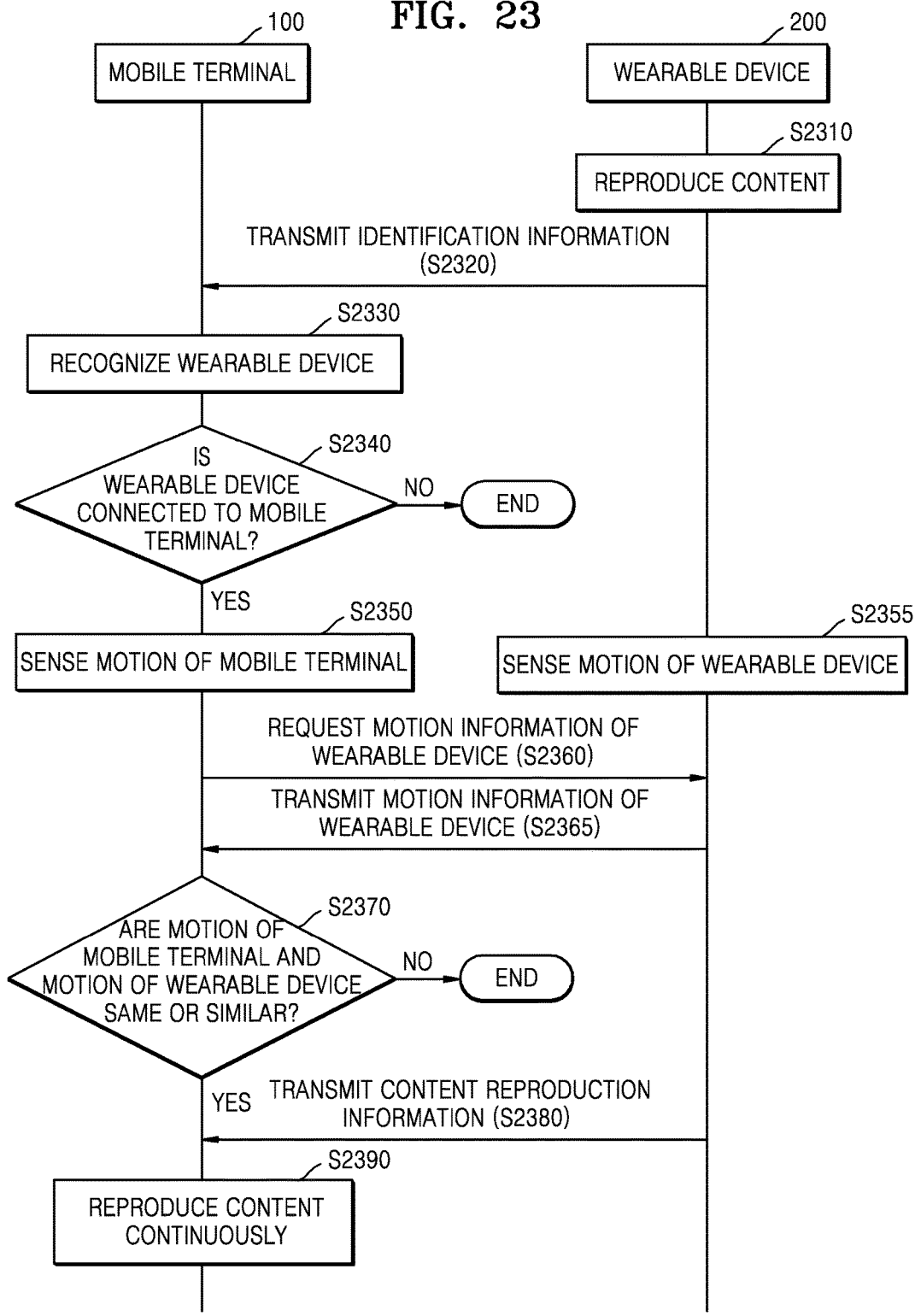
FIG. 23 is a flowchart illustrating a method of reproducing content in a mobile terminal, when the content is being reproduced by a wearable device, according to an exemplary embodiment.
Figure 24:
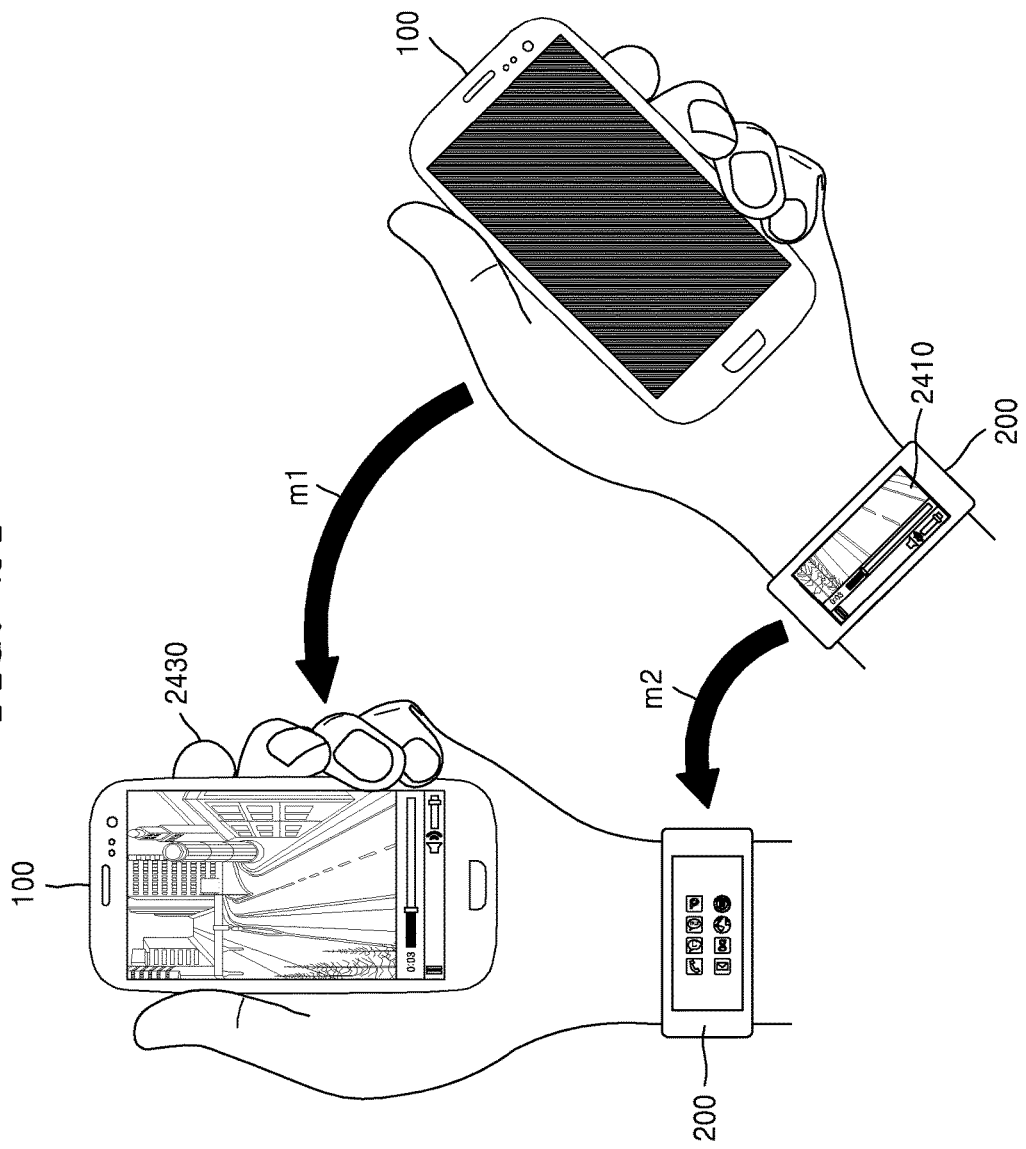
FIG. 24 is a diagram illustrating the method of FIG. 23.

FIG. 23 is a flowchart illustrating a method of reproducing content in the mobile terminal 100, when the content is being reproduced by the wearable device 200, according to the exemplary embodiment, and FIG. 24 is a diagram illustrating the method of FIG. 23.

If the motion of the mobile terminal 100, sensed by the mobile terminal 100, is the same as the motion of the wearable device 200, sensed by the wearable device 200, the mobile terminal 100 according to the exemplary embodiment may successively reproduce the content that is currently being reproduced by the wearable device 200. This will be described in more detail as follows.

Referring to FIG. 23, the wearable device 200 may reproduce a piece of content in operation S2310.

The wearable device 200 may reproduce the content stored therein, or a piece of content uploaded in an external server such as a web server or an SNS server. Here, the content may include text, images, audio, or video.

For example, as shown in FIG. 24, the wearable device 200 may reproduce a video 2410 stored in the wearable device 200 or reproduce a video stored in a web server after downloading the video from the web server.

Referring back to FIG. 23, the wearable device 200 may transmit identification information to the mobile terminal 100 that is within a preset distance range, in operation S2320.

The mobile terminal 100 may recognize the wearable device 200 existing within the preset distance range from the mobile terminal 100, in operation S2330.

Also, the mobile terminal 100 may determine whether the recognized wearable device 200 is a wearable device connected to the mobile terminal 100, in operation S2340.

In addition, in the flowchart of FIG. 23, operation S2310, in which the wearable device 200 reproduces the content, is prior to operations S2320 to S2340, but is not limited thereto. That is, operation S2110 may be performed between operations S2320, S2330, and S2340, or may be performed between operations S2340 and S2350.

If the recognized wearable device 200 is a wearable device connected to the mobile terminal 100, the mobile terminal 100 may sense the motion of the mobile terminal 100 to acquire the motion information of the mobile terminal 100, in operation S2350.

In addition, the wearable device 200 may acquire the motion information of the wearable device by sensing the motion of the wearable device 200, in operation S2355. Here, the wearable device 200 may sense the motion of the wearable device 200 at the same time when the mobile terminal 100 senses the motion of the mobile terminal 100 (operation S2350).

The mobile terminal 100 may request the wearable device 200 for the motion information of the wearable device 200, in operation S2360.

The wearable device 200 may transmit the motion information sensed by the wearable device 200 to the mobile terminal 100, in operation S2365.

The mobile terminal 100 may determine whether the motion of the mobile terminal 100 is the same as the motion of the wearable device 200, in operation S2370.

Above described operations S2320 to S2370 of FIG. 23 correspond to operations S420 to S480 of FIG. 4, and thus, detailed descriptions thereof are omitted here.

If it is determined that the motion of the mobile terminal 100 is the same as the motion of the wearable device 200, the wearable device 200 may transmit content reproduction information of the content that is currently being reproduced on the wearable device 200 to the mobile terminal 100, in operation S2380.

Here, the content reproduction information is information for reproducing the content, and may include kind of the content, content name, information about a program for reproducing the content, version information of the program for reproducing the content, amount information, information about play time of the content, and information about a location where the content is stored (for example, information about the storage location on the mobile terminal 100 or information about an address of a server storing the content).

The mobile terminal 100 may continuously reproduce the content that is currently being reproduced on the wearable device 200, based on the content reproduction information, in operation S2390.

For example, the mobile terminal 100 may reproduce a video 2430 on the mobile terminal 100, wherein the video 2430 is the same as the video 2410 that is currently being reproduced on the wearable device 200, as shown in FIG. 24. Here, the mobile terminal 100 may reproduce the video 2430 continuously from a point that is reproduced on the wearable device 200 last, based on the content reproduction time information (for example, video reproduction time information) transmitted from the wearable device 200.

Accordingly, if the user who has viewed the video on the wearable device 200 wants to view the video on the mobile terminal 100, the user does not need to search for the video to reproduce the video on the mobile terminal 100, but only performs a motion (for example, holding and lifting the mobile terminal 100) to reproduce, on the mobile terminal 100, the video that has been reproduced on the wearable device 200.

Figure 25:
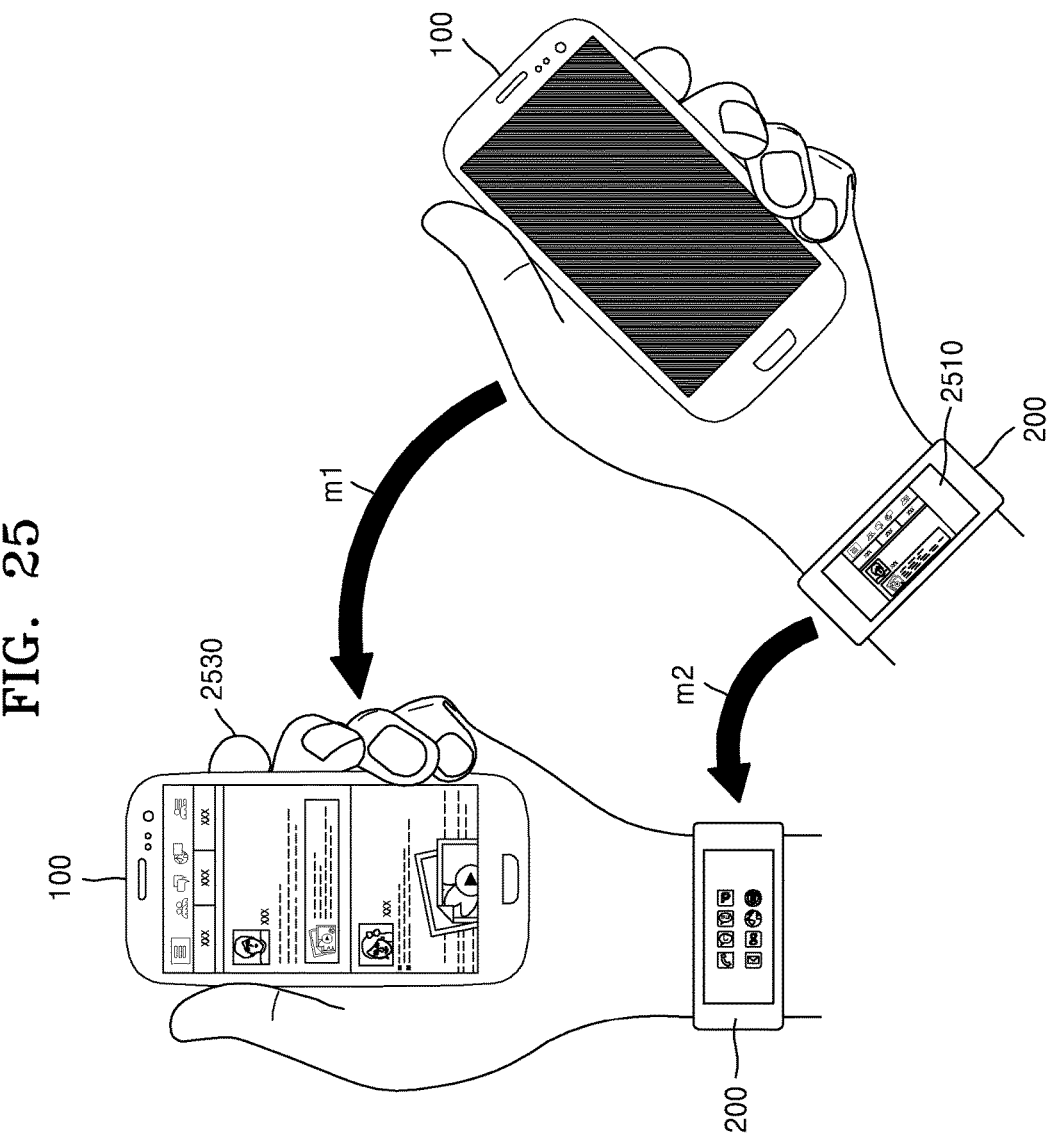
FIG. 25 is a diagram of a method of displaying content that is currently being displayed on a wearable device, on a mobile terminal, according to an exemplary embodiment.

FIG. 25 is a diagram illustrating a method of displaying content that is currently being displayed on the wearable device 200, on the mobile terminal 100, according to an exemplary embodiment.

As shown in FIG. 25, the wearable device 200 may display an image 2510.

As described above in operations S2350 to S2370 in FIG. 23, the mobile terminal 100 may receive information about the image 2510 that is currently being displayed on the wearable device 200 from the wearable device 200, if it is determined that the motion of the mobile terminal 100 is the same as the motion of the wearable device 200.

Based on the image information, the mobile terminal 100 may display the image that is currently being displayed on the wearable device 200. For example, as shown in FIG. 25, the mobile terminal 100 may expand the image 2510 displayed on the wearable device 200, and then, may display an expanded image 2530 on the mobile terminal 100.

Accordingly, if the user wants to display, on the mobile terminal 100, the image currently displayed on the wearable device 200, the user does not need to search for the image in the mobile terminal 100 to display the image on the mobile terminal 100, but only performs a motion (for example, holding and lifting the mobile terminal 100) to expand the image displayed on the wearable device 200 and display the expanded image on the mobile terminal 100.

Figure 26:
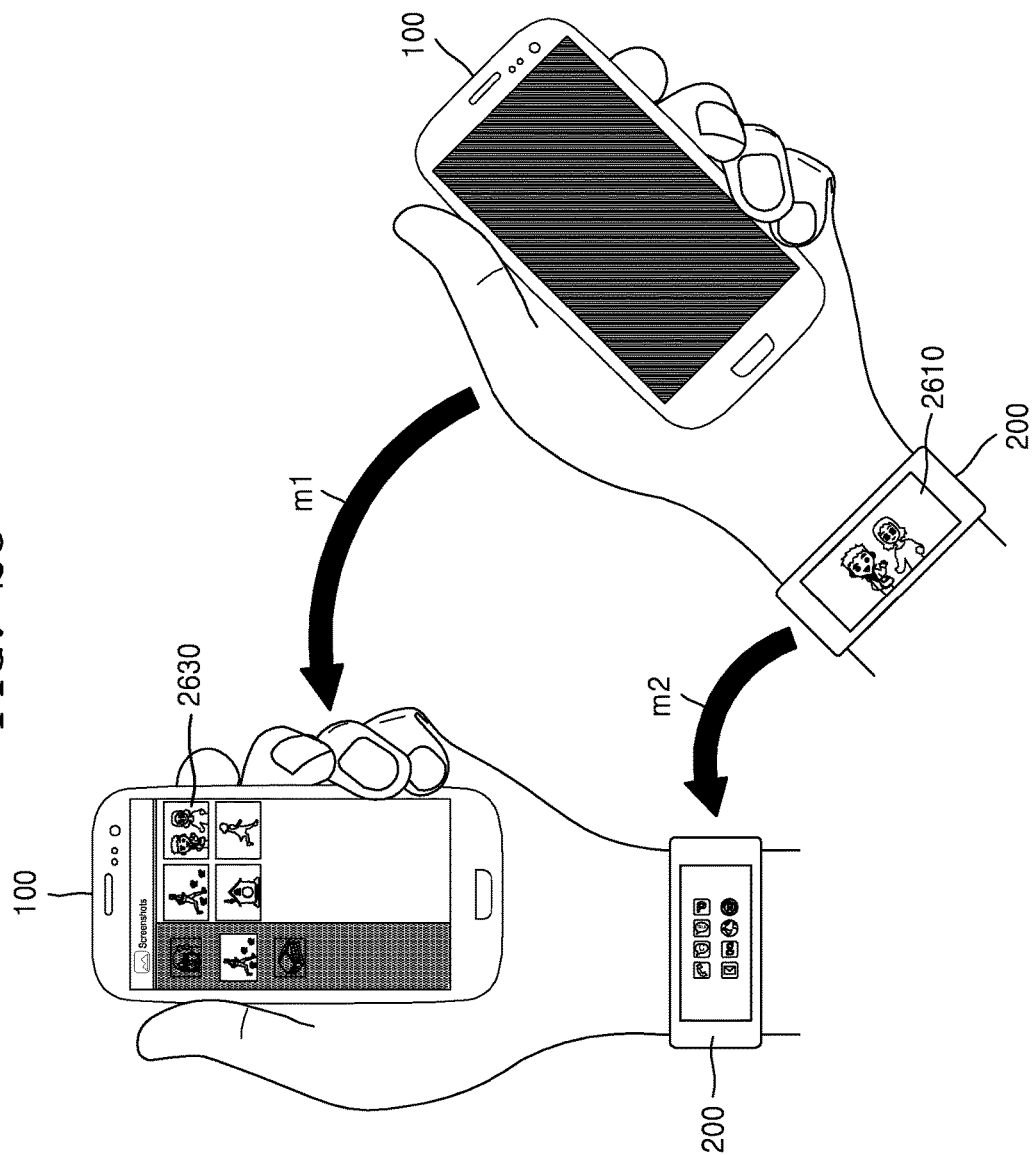
FIG. 26 is a diagram illustrating a method of transmitting data on a wearable device to a mobile terminal, according to an exemplary embodiment.

FIG. 26 is a diagram illustrating a method of transferring data on the wearable device 200 to the mobile terminal 100, according to an exemplary embodiment.

The wearable device 200 according to the exemplary embodiment may receive a user input for selecting a text, an image, a video, or an audio file that is to be transferred to the mobile terminal 100.

Here, the text, the image, the video, or the audio file to be transmitted to the mobile terminal 100 may be stored in the wearable device 200, that is, images captured by the wearable device 200 or an audio file recorded by using the wearable device 200.

For example, as shown in FIG. 26, the user of the wearable device 200 may select an image 2610 to be transmitted to the mobile terminal 100, and the wearable device 200 may display the selected image 2610 on the display.

If it is determined that the motion of the mobile terminal 100 is the same as the motion of the wearable device 200, the mobile terminal 100 may transmit the data of the wearable device 200 to the mobile terminal 100.

The mobile terminal 100 may determine a location to store the data transmitted from the wearable device 200, based on a kind of the data. For example, if the mobile terminal 100 receives the image 2610 as shown in FIG. 26, the mobile terminal 100 may store a received image 2630 in a photo application (for example, a gallery). Here, the data transmitted from the wearable device 200 may be automatically stored or may be stored according to a request from the user.

Figure 27:
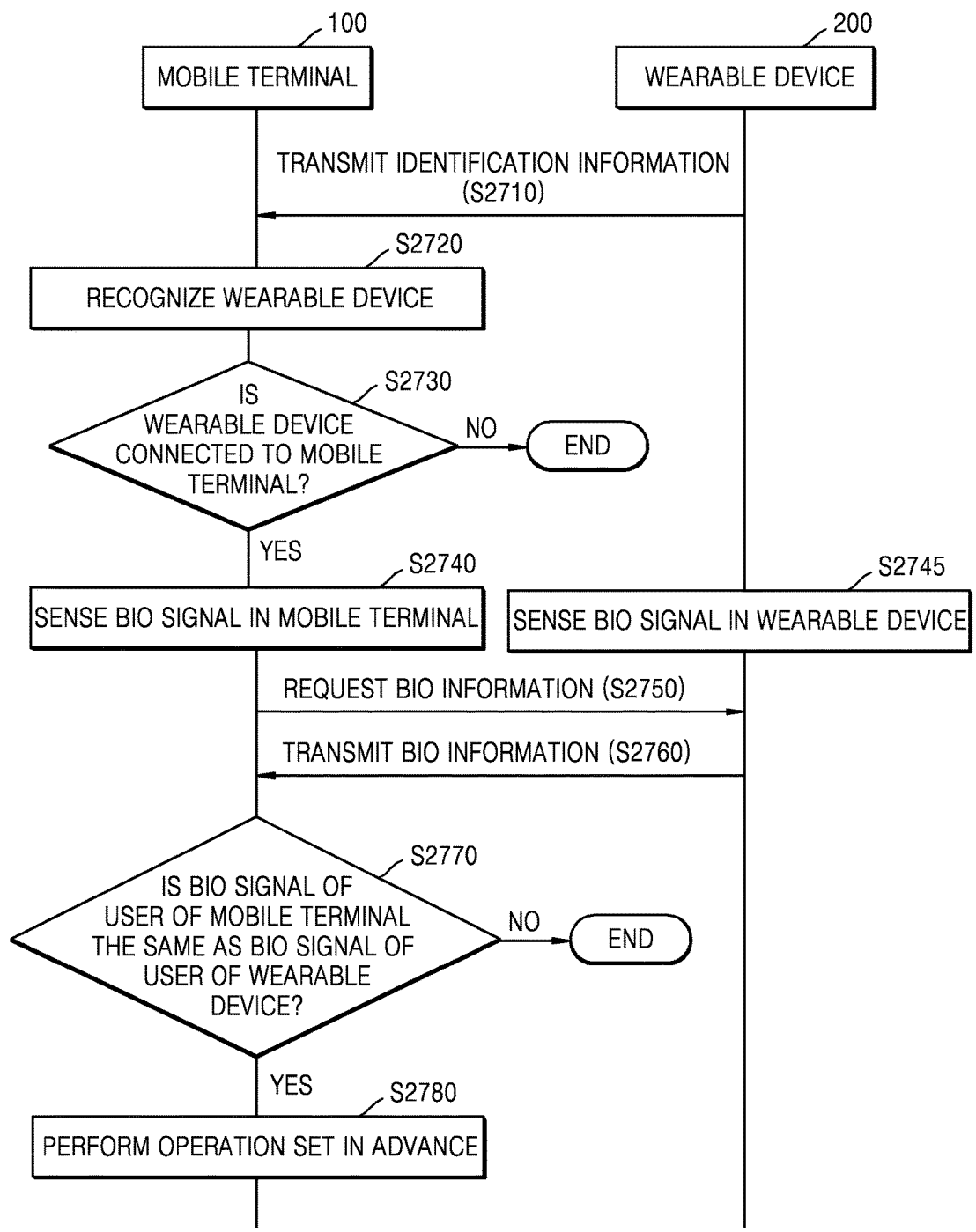
FIG. 27 is a flowchart illustrating a method of executing an operation set in advance in a mobile terminal, if a bio signal sensed by the mobile terminal is equal to a bio signal sensed by a wearable device, according to an exemplary embodiment.
Figure 28:
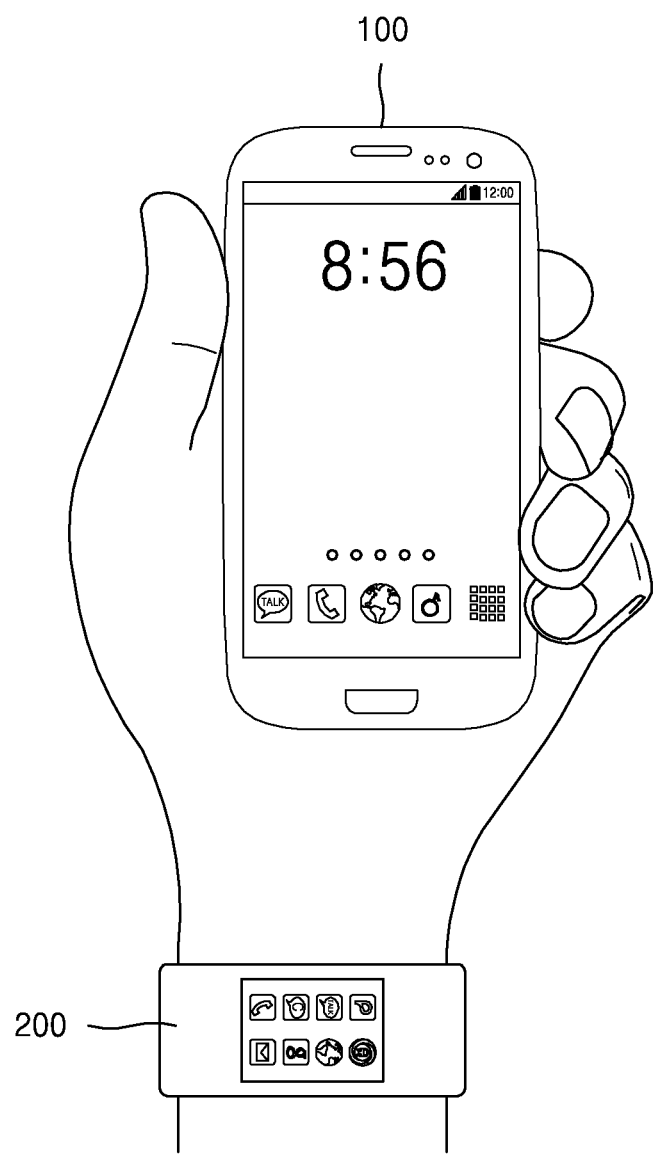
FIG. 28 is a diagram referred to describe the exemplary embodiment of FIG. 27.

FIG. 27 is a flowchart illustrating a method of performing a predetermined operation by the mobile terminal 100, when a bio signal sensed by the mobile terminal 100 is the same as a bio signal sensed by the wearable device 200, according to an exemplary embodiment, and FIG. 28 is a diagram illustrating the method of FIG. 27.

Referring to FIG. 27, the wearable device 200 may transmit identification information to the mobile terminal 100 that is within a distance range set in advance, in operation S2710.

The mobile terminal 100 may recognize the wearable device 200 that is within a distance range set in advance from the mobile terminal 100, in operation S2720.

Also, the mobile terminal 100 may determine whether the recognized wearable device 200 is connected to the mobile terminal, in operation S2730.

Operations S2710 to S2730 of FIG. 27 correspond to operation S420 to S440 of FIG. 4, and thus, detailed descriptions thereof are omitted here.

If the recognized wearable device 200 is connected to the mobile terminal 100, the mobile terminal 100 may acquire bio information by sensing a bio signal of the user of the mobile terminal 100, in operation S2740.

For example, the mobile terminal 100 may include a bio signal sensor for sensing the bio signal of the user of the mobile terminal 100. Here, the bio signal sensor is included in a portion contacting the hand of the user when the user holds the mobile terminal 100 in his/her hand as shown in FIG. 28, and thus, the bio signal may be automatically sensed when the user holds the mobile terminal 100 in his/her hand.

Accordingly, the mobile terminal 100 may measure a temperature, a pulse, an electrocardiogram (ECG), a heart rate, or a blood pressure of the user by using the bio signal sensor.

Also, the wearable device 200 connected to the mobile terminal 100 may acquire bio information by sensing a bio signal of the user wearing the wearable device 200, in operation S2745.

For example, the wearable device 200 may include a bio signal sensor for sensing the bio signal of the user. Here, the bio signal sensor is included in a portion contacting the body of the user when the user wears the wearable device 200 as shown in FIG. 28, and thus, the bio signal may be automatically sensed when the user wears the wearable device 200.

Accordingly, the wearable device 200 may measure a temperature, a pulse, an ECG, a heart rate, or a blood pressure of the user by using the bio signal sensor.

In addition, the mobile terminal 100 may request the wearable device 200 for the bio information of the user wearing the wearable device 200, in operation S2750.

The wearable device 200 may transmit the bio information of the user wearing the wearable device 200 to the mobile terminal 100, in operation S2760. For example, the wearable device 200 may transmit the bio signal information sensed by the wearable device 200 to the mobile terminal 100 via short-range communication. Here, short-range communication may be a Wi-Fi method, an NFC, a Bluetooth method, an infrared ray method, or a ZigBee method, but is not limited thereto.

The mobile terminal 100 compares the bio information of the user of the mobile terminal 100 with the bio information of the user wearing the wearable device 200 to determine whether the bio signal of the user of the mobile terminal 100 is the same as the bio signal of the user wearing the wearable device 200, in operation S2770.

Here, the bio information of the user of the mobile terminal 100 and the bio information of the user wearing the wearable device 200 may be the same kind of bio information. For example, if the bio information of the user of the mobile terminal 100 includes a pulse value of the user of the mobile terminal 100, the bio information of the user wearing the wearable device 200 may also include a pulse value of the user wearing the wearable device 200. Also, if the bio information of the user of the mobile terminal 100 is an ECG value of the user of the mobile terminal 100, the bio information of the user wearing the wearable device 200 may be also an ECG value of the user wearing the wearable device 200.

Also, that the bio signal of the user of the mobile terminal 100 and the bio signal of the user wearing the wearable device 200 are the same does not mean that they are physically the same as each other, but denotes that the bio information of the user of the mobile terminal 100 coincides with the bio information of the user wearing the wearable device 200 within a predetermined range.

For example, if the bio information of the user of the mobile terminal 100 is measured as a first value and the bio information of the user wearing the wearable device 200 is within a range of the first value±a preset error value, the mobile terminal 100 may determine that the bio information of the user of the mobile terminal 100 is the same as the bio information of the user wearing the wearable device 200.

Here, if the bio information of the user of the mobile terminal 100 is the same as the bio information of the user wearing the wearable device 200, the mobile terminal 100 determines that one user holds the mobile terminal 100 in his/her hand while wearing the wearable device 200 on his/her wrist, as shown in FIG. 28.

If it is determined that the bio information of the user of the mobile terminal 100 is the same as the bio information of the user wearing the wearable device 200, the mobile terminal 100 may perform an operation that is set in advance in the mobile terminal 100, in operation S2780. Here, the set operation may be related to an operation that the wearable device 200 performs.

For example, the mobile terminal 100 may perform the operations described above with reference to FIGS. 10 to 26. If the lock mode of the wearable device 200 is unlocked, the mobile terminal 100 may unlock the lock mode of the mobile terminal 100. Otherwise, if the wearable device 200 performs the user authentication, the mobile terminal 100 may also performs the user authentication. Otherwise, if the wearable device 200 displays a web page, the mobile terminal 100 may display a web page that is the same as the web page that is currently being displayed on the wearable device 200. Otherwise, if the wearable device 200 receives a call connection request, the mobile terminal 100 may perform the call connection. Otherwise, if the user is calling via the wearable device 200, the user may continuously perform the call via the mobile terminal 100. Otherwise, if the wearable device 200 is reproducing a piece of content, the mobile terminal 100 may continuously reproduce the content that has been reproduced by the wearable device 200.

Figure 29:
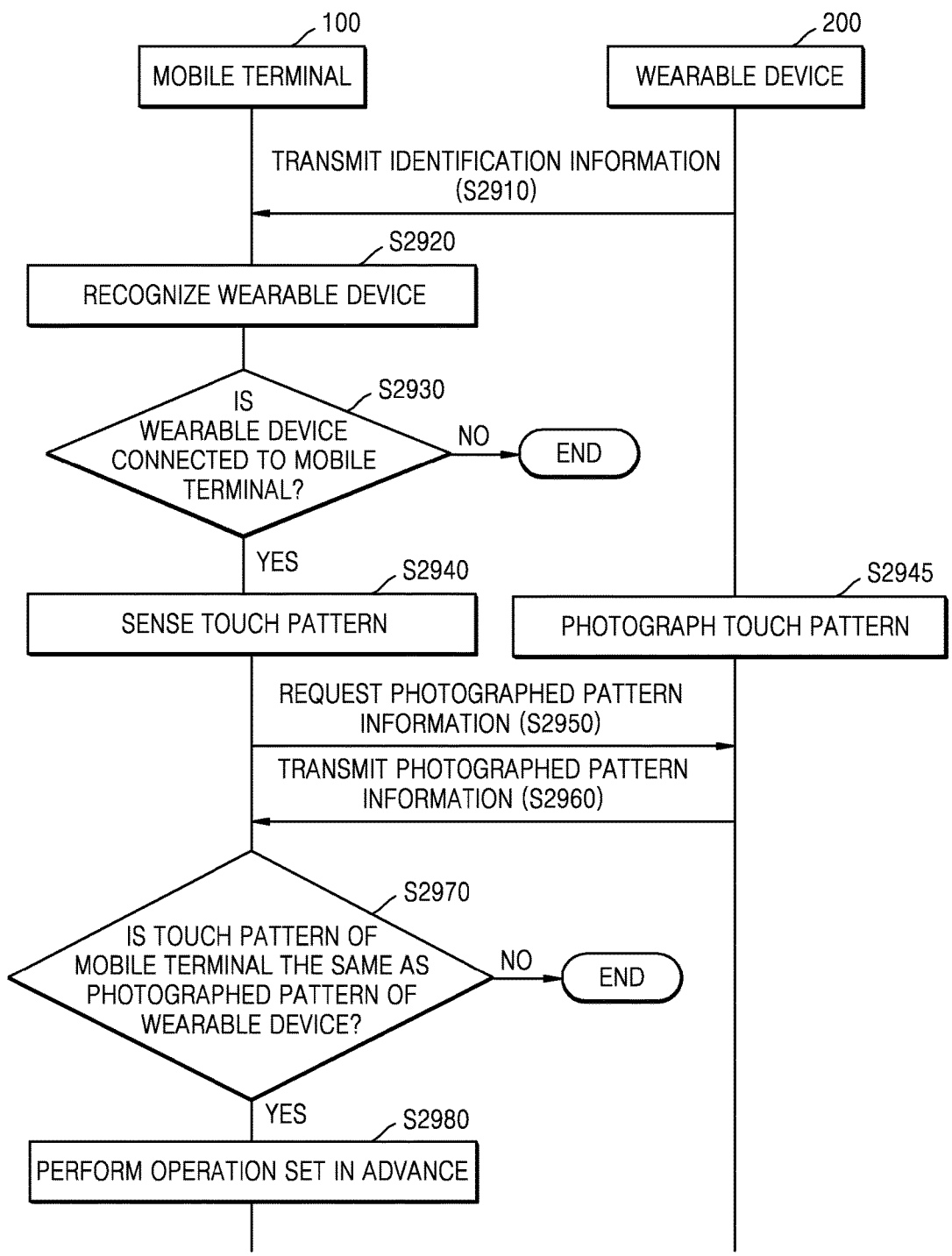
FIG. 29 is a flowchart illustrating a method of performing an operation set in advance in a mobile terminal, when a touch pattern sensed by the mobile terminal is the same as a pattern captured by a wearable device, according to an exemplary embodiment.
Figure 30:
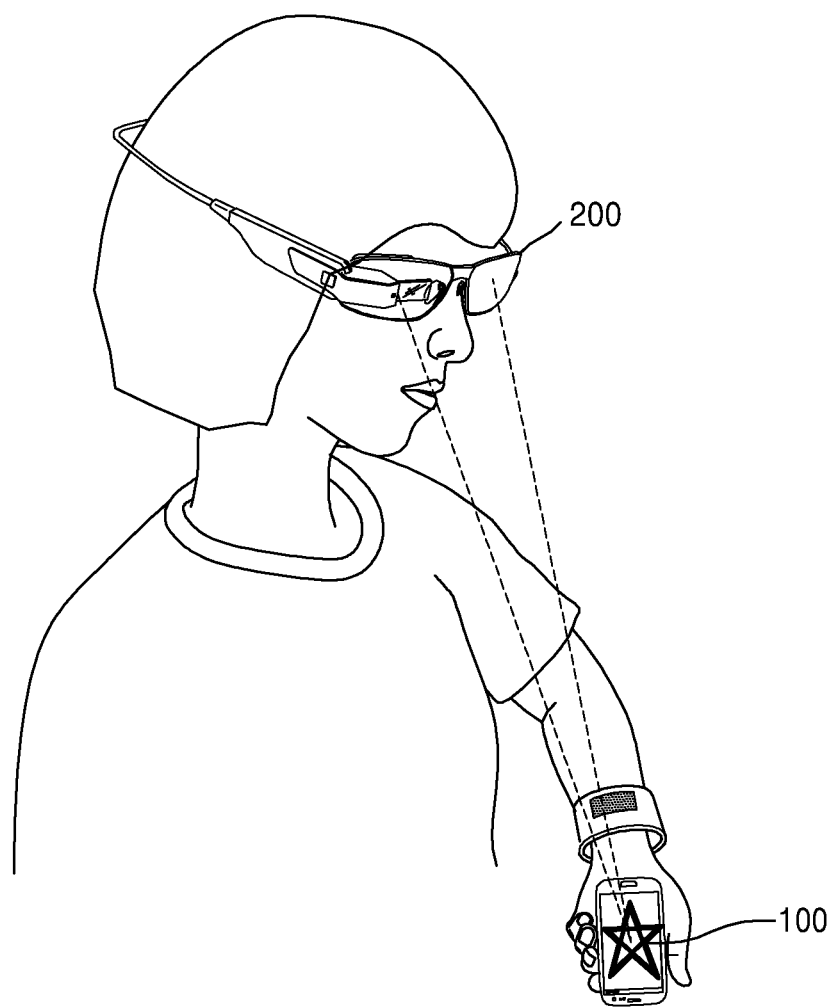
FIG. 30 is a diagram illustrating the method of FIG. 29.

FIG. 29 is a flowchart illustrating a method of performing an operation set in advance in the mobile terminal 100, when a touch pattern sensed by the mobile terminal 100 is the same as a pattern captured by the wearable device 200, according to an exemplary embodiment, and FIG. 30 is a diagram illustrating the method of FIG. 29.

Referring to FIG. 29, the wearable device 200 may transmit identification information to the mobile terminal 100 that is in a distance range set in advance, in operation S2910.

The mobile terminal 100 may recognize the wearable device 200 that is within a distance range set in advance from the mobile terminal 100, in operation S2920.

Also, the mobile terminal 100 may determine whether the recognized wearable device 200 is connected to the mobile terminal 100, in operation S2930.

Operations S2910 to S2930 of FIG. 29 correspond to operations S420 to S440 of FIG. 4, and thus, detailed descriptions thereof are omitted here.

If the recognized wearable device 200 is connected to the mobile terminal 100, the mobile terminal 100 may acquire touch pattern information by sensing a touch pattern input by the user, in operation S2940.

The mobile terminal 100 may include a touch screen module, and may sense the input touch pattern (hereinafter, referred to as a first pattern) by sensing a touch gesture on the touch screen. Here, the mobile terminal 100 may include various sensors in the touch screen or near the touch screen to sense the touch input or proximate touch on the touch screen.

As shown in FIG. 30, the user may input the touch pattern (first pattern) on the display formed of the touch screen in the mobile terminal 100 by using a finger or a touch tool.

For example, if the user inputs a star pattern on the display of the mobile terminal 100, the mobile terminal 100 may acquire touch pattern information (first pattern information) including information about a shape or a size of the touch pattern input by the user (for example, information indicating that the touch pattern input by the user is the star pattern).

Referring again to FIG. 29, if the user of the mobile terminal 100 inputs the touch pattern into the mobile terminal 100 in a state of wearing the wearable device 200 that includes a camera, the wearable device 200 may capture or photograph a touch gesture of the user of the mobile terminal 100 and the touch pattern (first pattern) displayed on the mobile terminal 100, in operation S2945.

For example, referring to FIG. 30, the wearable device 200 may be a head mounted display (HMD), but is not limited thereto. In addition, the HMD may include glasses, a helmet, or a hat, but is not limited thereto.

Also, the wearable device 200 includes the camera on a front portion thereof to capture the touch gesture of the user of the mobile terminal 100 and the touch pattern displayed on the mobile terminal 100, if the user sees the mobile terminal 100 while wearing the wearable device 200.

For example, the wearable device 200 may acquire captured pattern information (second pattern information) including information about a shape or a size of the pattern captured by the wearable device 200 (for example, information indicating that the pattern captured by the wearable device 200 is a star pattern).

The mobile terminal 100 may request the wearable device 200 for the captured or photographed pattern information (second pattern information), in operation S2950.

The wearable device 200 may transmit the captured or photographed pattern information (second pattern information) to the mobile terminal 100, in operation S2960. For example, the wearable device 200 may transmit the captured pattern information to the mobile terminal 100 via short-range communication. Here, short-range communication may include the Wi-Fi method, NFC, Bluetooth method, the infrared ray method, or ZigBee method, but is not limited thereto.

The mobile terminal 100 compares the first pattern information acquired by the mobile terminal 100 and the second pattern information acquired by the wearable device 200 with each other to determine whether the touch pattern (first pattern) of the mobile terminal 200 is the same as the captured or photographed pattern (second pattern) of the wearable device 200, in operation S2970.

That the touch pattern (first pattern) of the mobile terminal 100 is the same as the captured pattern (second pattern)

of the wearable device 200 does not mean that they are literally the same as each other, but denotes that the touch pattern (first pattern) of the mobile terminal 100 coincides with the captured pattern (second pattern) of the wearable device 200 within a predetermined range.

Here, if the first pattern is the same as the second pattern, as shown in FIG. 30, the mobile terminal 100 may determine that one user holds the mobile terminal 100 in his/her hand while wearing the wearable device 200 connected to the mobile terminal 100 on his/her head.

When it is determined that the first pattern is the same as the second pattern, the mobile terminal 100 may perform an operation that is set in advance in the mobile terminal 100, in operation S2980.

Because operation S2980 of FIG. 29 corresponds to operation S2780 of FIG. 27, detailed descriptions thereof are omitted.

Figure 31:
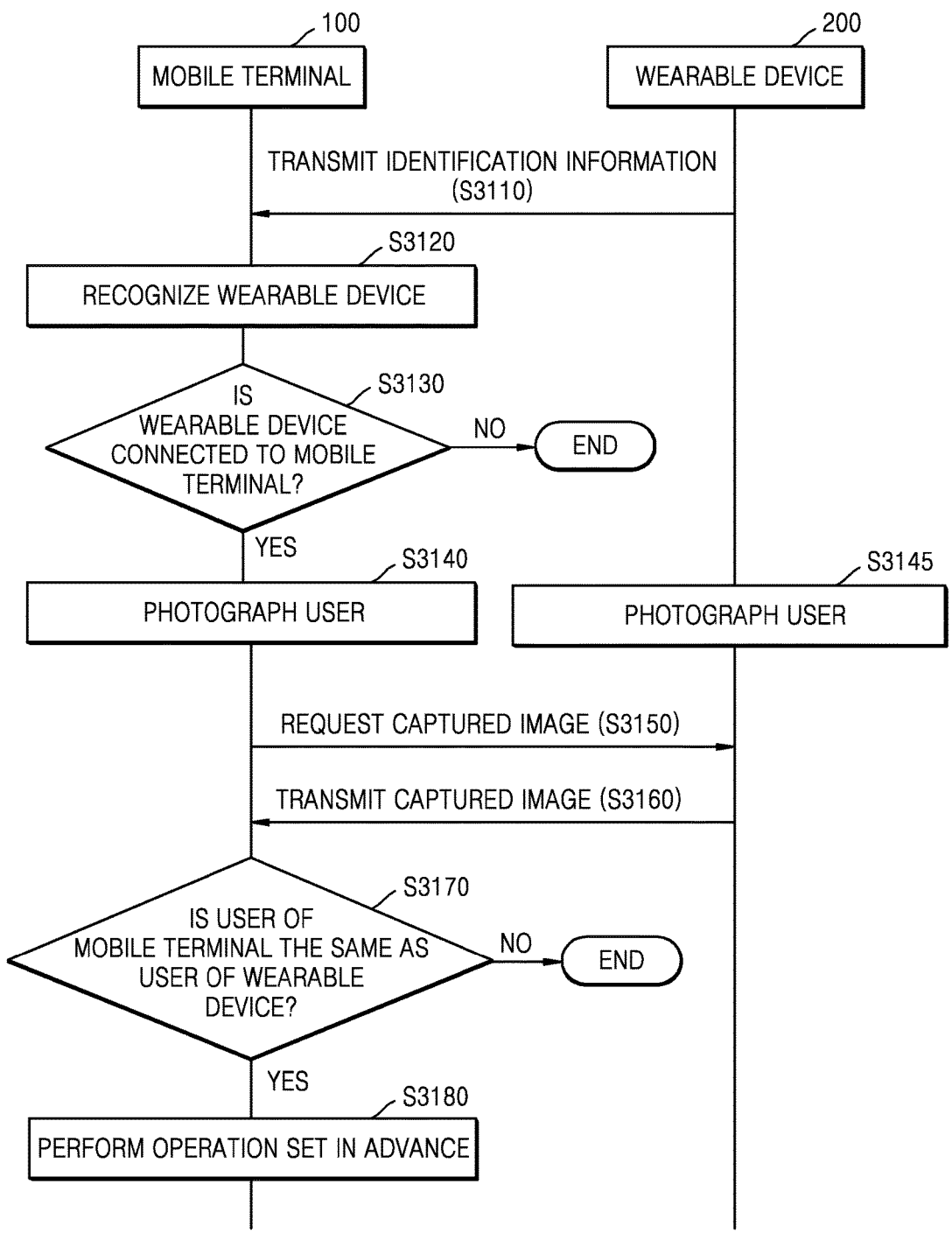
FIG. 31 is a flowchart illustrating a method of performing an operation set in advance in a mobile terminal, when a user video captured by the mobile terminal is the same as a user video captured by a wearable device, according to an exemplary embodiment.
Figure 32:
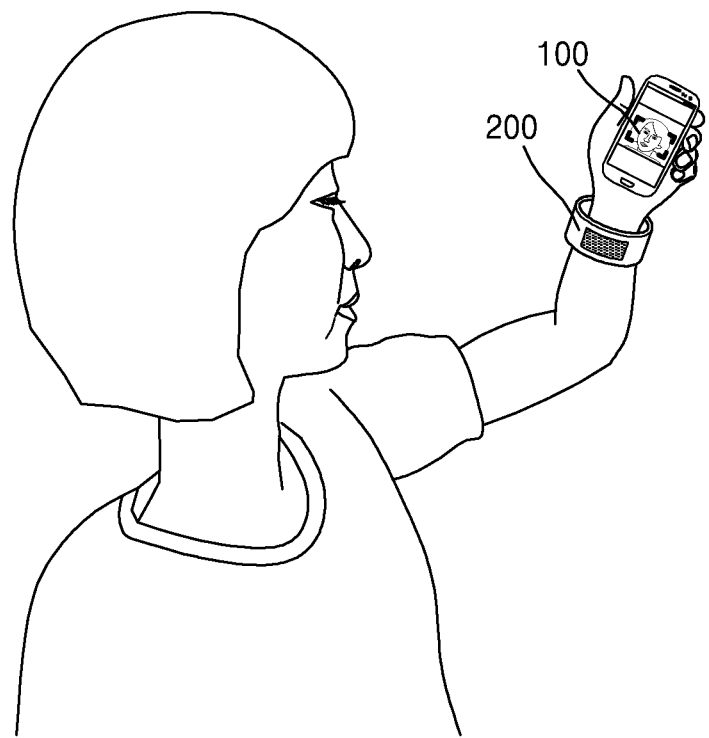
FIG. 32 is a diagram illustrating the method of FIG. 31.

FIG. 31 is a flowchart illustrating a method of performing an operation set in advance in the mobile terminal 100, when a user image captured by the mobile terminal 100 is the same as a user image captured by the wearable device 200, according to an exemplary embodiment, and FIG. 32 is a diagram illustrating the method of FIG. 31.

Referring to FIG. 31, the wearable device 200 may transmit identification information to the mobile terminal 100 that is within a distance range set in advance, in operation S3110.

The mobile terminal 100 may recognize the wearable device 200 that is within a distance range set in advance from the mobile terminal 100, in operation S3120.

Also, the mobile terminal 100 may determine whether the recognized wearable device 200 is connected to the mobile terminal, in operation S3130.

Operations S3110 to S3130 of FIG. 31 correspond to operation S420 to S440 of FIG. 4, and thus, detailed descriptions thereof are omitted here.

If the recognized wearable device 200 is connected to the mobile terminal 100, the mobile terminal 100 may photograph the face of the user of the mobile terminal 100 to obtain a user image (first image), in operation S3140.

For example, the mobile terminal 100 may include a camera for photographing the face of the user of the mobile terminal 100, and the camera is disposed on a front surface portion of the mobile terminal 100 as shown in FIG. 32 to easily photograph the face of the user holding the mobile terminal 100.

Referring again to FIG. 31, the wearable device 200 connected to the mobile terminal 100 may photograph the face of the user wearing the wearable device 200 by using a camera to obtain a user image (second image), in operation S3145.

Here, the wearable device 200 may photograph the user of the wearable device at the same time with the mobile terminal 100 photographing the user of the mobile terminal 100 (operation S3140).

In addition, the mobile terminal 100 may request the wearable device 200 for the captured user image of the wearable device 200, in operation S3150.

The wearable device 200 may transmit the captured user image (second image) to the mobile terminal 100, in operation S3160. For example, the wearable device 200 may transmit the second image to the mobile terminal 100 via short-range communication. Here, short-range communication may include the Wi-Fi method, NFC, Bluetooth method, the infrared ray method, or ZigBee method, but is not limited thereto.

The mobile terminal 100 compares the user image (first image) photographed by the mobile terminal 100 with the second image transmitted from the wearable device 200 to determine whether the user of the mobile terminal 100 is the same as the user of the wearable device 200, in operation S3170.

The mobile terminal 100 may determine whether the face of the user included in the first image and the face of the user included in the second image are the face of one person. For example, the mobile terminal 100 may determine whether the face included in the first image and the face included in the second image are the same face by analyzing symmetrical configuration of the user's face included in the first and second images, distances between eyes, nose, and mouth that are main parts in the face and shapes thereof, and color(s) of the eyes.

If it is determined that the user of the mobile terminal 100 is the same as the user of the wearable device 200, as shown in FIG. 32, the mobile terminal 100 may determine that one user holds the mobile terminal 100 while wearing the wearable device 200 connected to the mobile terminal 100.

For example, as shown in FIG. 32, if the wearable device 200 is a watch that the user may wear on his/her wrist and the user holding the mobile terminal 100 on his/her hand wears the wearable device 200 on his/her wrist, the mobile terminal 100 and the wearable device 200 may photograph the same person.

If it is determined that the user of the mobile terminal 100 is the same as the user of the wearable device 200, the mobile terminal 100 may perform an operation that is set in advance in the mobile terminal 100, in operation S3180.

Because operation S3180 of FIG. 31 corresponds to operation S2780 of FIG. 27, detailed descriptions thereof are omitted.

Figure 33:
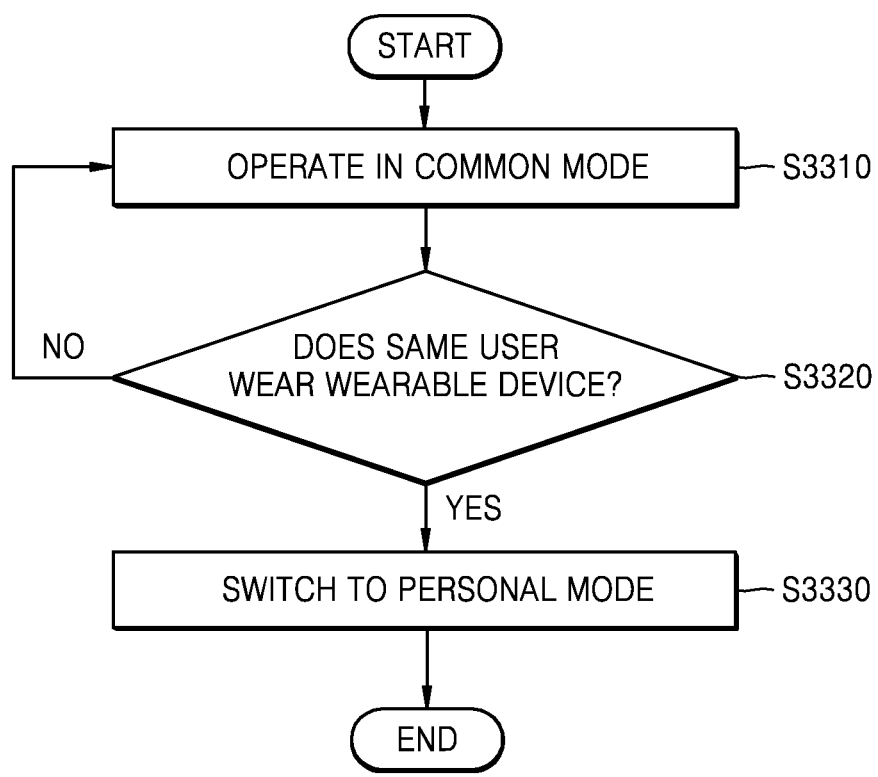
FIG. 33 is a flowchart of a method of operating a mobile terminal, according to an exemplary embodiment.

FIG. 33 is a flowchart illustrating a method of operating the mobile terminal 100, according to an exemplary embodiment.

Referring to FIG. 33, the mobile terminal 100 according to the exemplary embodiment may operate in a common mode, in operation S3310. For example, the common mode may be a mode, in which only some applications that are set in advance are shown on the home screen and execution of some other applications (for example, a gallery application, a phone book application, or a message application) is restricted.

Also, the common mode may be a mode, in which only some of functions may be performed when executing an application or only some content is displayed, and will be described in more detail later with reference to FIGS. 38 to 41.

The mobile terminal 100 may determine whether the wearable device 200 connected to the mobile terminal 100 is worn by the same user of the mobile terminal 100, in operation S3320.

As a result of determination, if the user of the mobile terminal 100 wears the wearable device 200 connected to the wearable device 200, the mobile terminal 100 may switch the operation mode of the mobile terminal 100 from the common mode to a personal mode, in operation S3330.

For example, in the personal mode, applications that have not been displayed in the common mode may be displayed on the home screen, and some of the applications, which are restricted to be executed in the common mode, may be executed.

Also, when executing applications, some functions that have been restricted in the common mode may be executed, and some content that is restricted to be displayed in the common mode may be displayed in the personal mode. This will be described in more detail later with reference to FIGS. 38 to 41.

FIGS. 34 to 37 are flowcharts illustrating methods of switching the common mode to the personal mode, based on whether the user of the mobile terminal 100 wears the wearable device 200 connected to the mobile terminal 100, according to exemplary embodiments.

Figure 34:
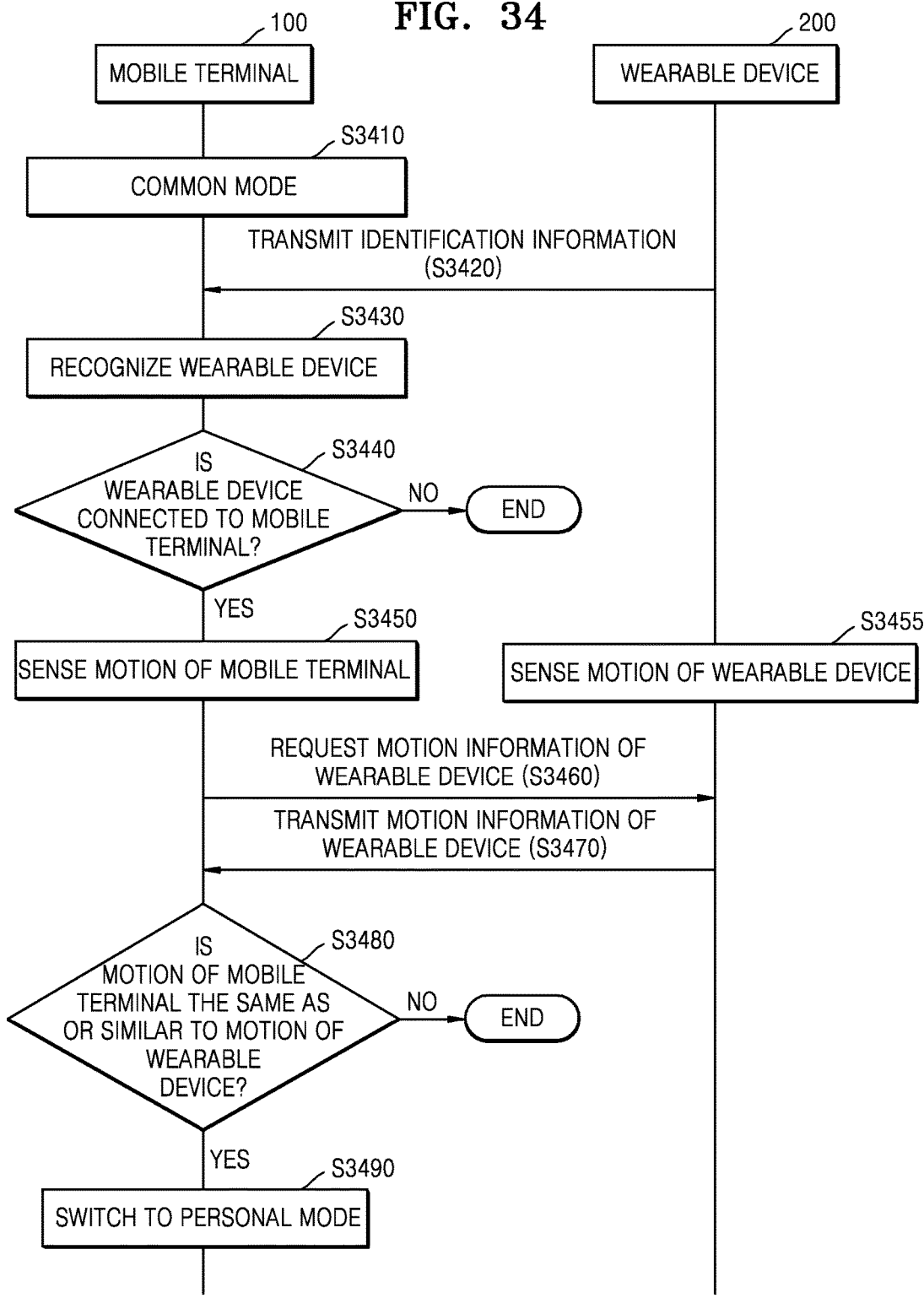
FIGS. 34 to 37 are flowcharts illustrating a method of switching a common mode to a personal mode, based on whether a user of the mobile terminal wears a wearable device connected to the mobile terminal, according to exemplary embodiments.

FIG. 34 is a flowchart illustrating a method of switching the operating state of the mobile terminal 100 from the common mode to the personal mode, when a motion sensed by the mobile terminal 100 is the same as the motion sensed by the wearable device 200.

Referring to FIG. 34, the mobile terminal 100 may be in the common mode in operation S3410. As described above with reference to FIG. 33, in the common mode, some applications that are set in advance are only displayed on the home screen, and some applications (e.g., a gallery application, a phone book application, and a message application) are restricted to be executed. Also, when executing an application, only some of the functions may be performed or only some content is displayed.

In addition, the wearable device 200 may transmit identification information to the mobile terminal 100 that is in a distance range set in advance, in operation S3420.

For example, if the mobile terminal 100 and the wearable device 200 are in within the distance range set in advance from each other, the mobile terminal 100 and the wearable device 200 may transmit/receive user identification information or device identification information to/from each other via short-range communication.

Accordingly, the mobile terminal 100 may recognize the wearable device 200 that is within the distance range set in advance from the mobile terminal 100, in operation S3430.

The mobile terminal 100 may determine whether the recognized wearable device 200 is connected to the mobile terminal 100, in operation S3440.

For example, the mobile terminal 100 may compare the identification information transmitted from the wearable device 200 with the identification information of the wearable device registered in the mobile terminal 100 to determine whether the recognized wearable device 200 is connected to the mobile terminal 100.

If the recognized wearable device 200 is connected to the mobile terminal 100, the mobile terminal 100 may acquire motion information by sensing the motion thereof, in operation S3450.

For example, the mobile terminal 100 may measure a direction, a velocity, and a variation in the velocity of a movement of the mobile terminal 100 by using a geomagnetic sensor, a location sensor, an acceleration sensor, a proximity sensor, or a gyroscope sensor.

In addition, the wearable device 200 may acquire motion information by sensing the motion thereof in operation S3455. Here, the wearable device 200 may acquire the motion information of the wearable device 200 by sensing the motion of the wearable device 200 at the same time when the mobile terminal 100 senses the motion thereof (operation S3450).

For example, the wearable device 200 may measure a direction, a velocity, and a variation in the velocity of a movement of the wearable device 200 by using a geomagnetic sensor, a location sensor, an acceleration sensor, a proximity sensor, or a gyroscope sensor.

In addition, the mobile terminal 100 may request the wearable device 200 for the motion information of the wearable device 200, in operation S3460.

The wearable device 200 may transmit the motion information of the wearable device 200, sensed by the wearable device 200, to the mobile terminal 100, in operation S3470.

The mobile terminal 100 compares the motion information of the mobile terminal 100 with the motion information of the wearable device 200 to determine whether the motion of the mobile terminal 100 is the same as or similar to the motion of the wearable device 200, in operation S3480.

Here, that the motion of the mobile terminal 100 is the same as the motion of the wearable device 200 does not denote that the physical motions are completely the same as each other, but denotes that the motion information of the mobile terminal 100 (e.g., the moving direction, moving amount, and velocity of the mobile terminal 100) coincides with the motion information of the wearable device 200 (e.g., the moving direction, moving amount, and velocity of the wearable device 200) within a predetermined range.

If it is determined that the motion of the mobile terminal 100 is the same as or similar to the motion of the wearable device 200, the mobile terminal 100 may determine that the user of the mobile terminal 100 and the user wearing the wearable device 200 are the same person, and may switch the operating state of the mobile terminal 100 from the common mode to the personal mode, in operation S3490.

As described above with reference to FIG. 33, in the personal mode, applications that have not been displayed in the common mode may be displayed on the home screen, and some applications that have been restricted to be executed in the common mode may be executed. Also, when executing an application, a function that has been restricted in the common mode may be performed, and the content that has not been displayed in the common mode may be displayed in the personal mode.

Figure 35:
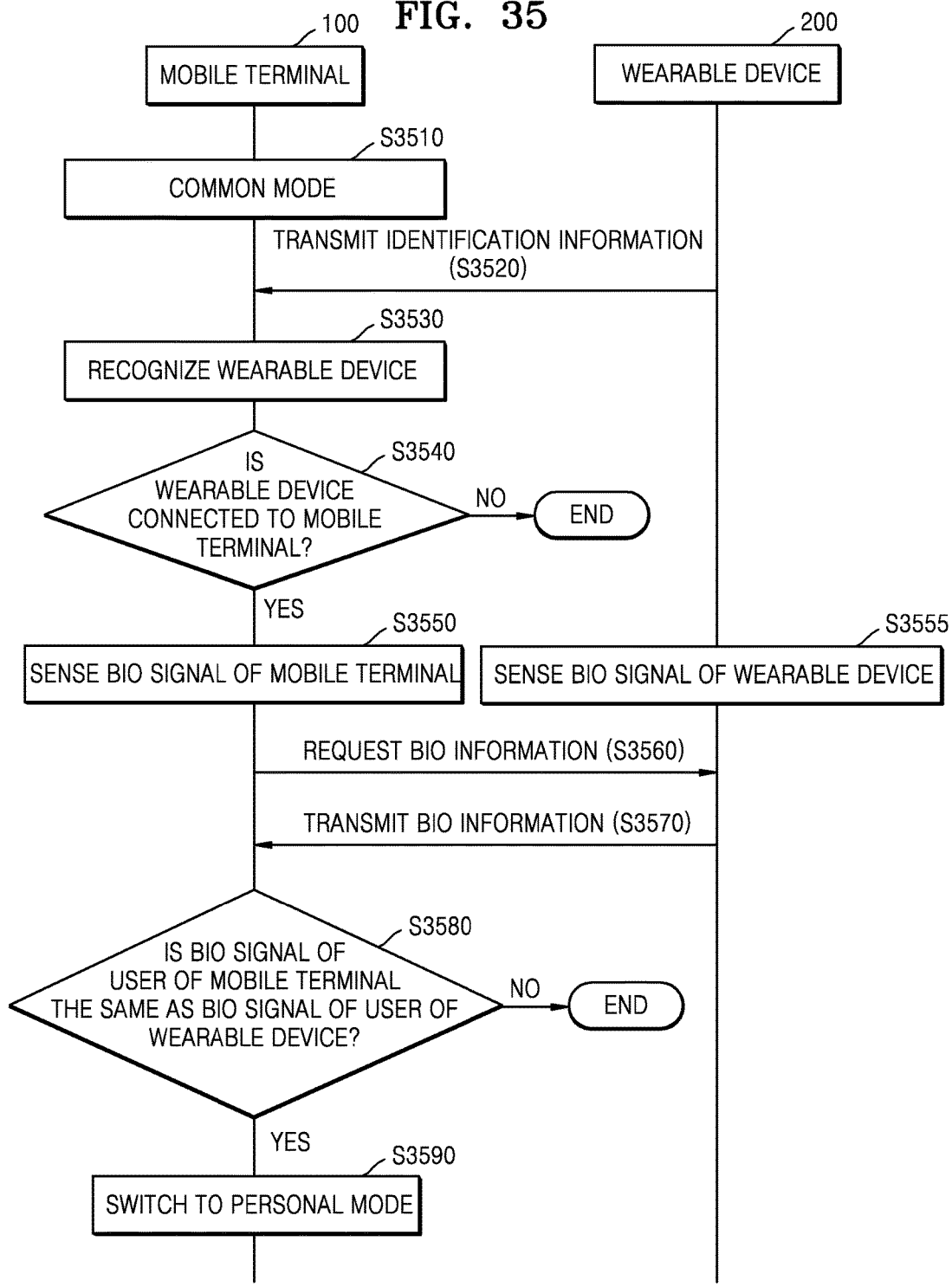

FIG. 35 is a flowchart illustrating a method of switching the operating state of the mobile terminal 100 from the common mode to the personal mode, when a bio signal sensed by the mobile terminal 100 is the same as a bio signal sensed by the wearable device 200.

Referring to FIG. 35, the mobile terminal 100 may be in the common mode, in operation S3510.

Referring to FIG. 35, the wearable device 200 may transmit identification information to the mobile terminal 100 that is within a distance range set in advance, in operation S3520.

The mobile terminal 100 may recognize the wearable device 200 that is within a distance range set in advance from the mobile terminal 100, in operation S3530.

The mobile terminal 100 may determine whether the recognized wearable device 200 is connected to the mobile terminal 100, in operation S3540.

Because operations S3510 to S3540 of FIG. 35 correspond to operations S3410 to S3440 of FIG. 34, detailed descriptions thereof are omitted.

If the recognized wearable device 200 is connected to the mobile terminal 100, the mobile terminal 100 senses a bio signal of the user of the mobile terminal 100 to acquire bio information, in operation S3550.

For example, the mobile terminal 100 may include a bio signal sensor for sensing the bio signal of the user of the mobile terminal 100. Here, the bio signal sensor is included in a portion contacting the hand of the user when the user is holding the mobile terminal 100 in his/her hand, so that the bio signal may be automatically sensed.

Accordingly, the mobile terminal 100 may measure a temperature, a pulse, an electrocardiogram (ECG), a heart rate, or a blood pressure of the user by using the bio signal sensor.

Also, the wearable device 200 connected to the mobile terminal 100 may acquire bio information by sensing a bio signal of the user wearing the wearable device 200, in operation S3555.

For example, the wearable device 200 may include a bio signal sensor for sensing the bio signal of the user. Here, the bio signal sensor is included in a portion contacting the body of the user when the user wears the wearable device 200, and thus, the bio signal may be automatically sensed when the user wears the wearable device 200.

Accordingly, the wearable device 200 may measure a temperature, a pulse, an ECG, a heart rate, or a blood pressure of the user by using the bio signal sensor.

In addition, the mobile terminal 100 may request the wearable device 200 for the bio information of the user wearing the wearable device 200, in operation S3560.

The wearable device 200 may transmit the bio information of the user wearing the wearable device 200 to the mobile terminal 100, in operation S3570.

The mobile terminal 100 may compare the bio information of the user of the mobile terminal 100 with the bio information of the user wearing the wearable device 200 to determine whether the bio signal of the user of the mobile terminal 100 is the same as the bio signal of the user wearing the wearable device 200, in operation S3580.

Here, the bio information of the user of the mobile terminal 100 and the bio information of the user wearing the wearable device 200 may be the bio information of the same kind. For example, if the bio information of the user of the mobile terminal 100 is a value measuring the pulse of the user of the mobile terminal 100, the bio information of the user wearing the wearable device 200 may be also a value of measuring the pulse of the user wearing the wearable device 200. Also, if the bio information of the user of the mobile terminal 100 is a value measuring the ECG of the user of the mobile terminal 100, the bio information of the user wearing the wearable device 200 may be also a value of measuring the ECG of the user wearing the wearable device 200.

Also, that the bio signal of the user of the mobile terminal 100 is the same as the bio signal of the user wearing the wearable device 200 does not denote that the bio signals are physically the same as each other, but denotes that the bio information of the user of the mobile terminal 100 coincides with the bio information of the user wearing the wearable device 200 within a predetermined range.

For example, if the bio information of the user of the mobile terminal 100 is measured as a first value and the bio information of the user wearing the wearable device 200 is within a range of the first value±a predetermined error value, the mobile terminal 100 may determine that the bio information of the user of the mobile terminal 100 is the same as the bio information of the user wearing the wearable device 200.

When it is determined that the bio signal of the user of the mobile terminal 100 is the same as the bio signal of the user wearing the wearable device 200, the mobile terminal 100 may determine that the user of the mobile terminal 100 and the user wearing the wearable device 200 are the same person, and may switch the operating mode of the mobile terminal 100 from the common mode to the personal mode, in operation S3590.

Because operation S3590 of FIG. 35 corresponds to operation S3490 of FIG. 34, detailed descriptions thereof are omitted.

Figure 36:
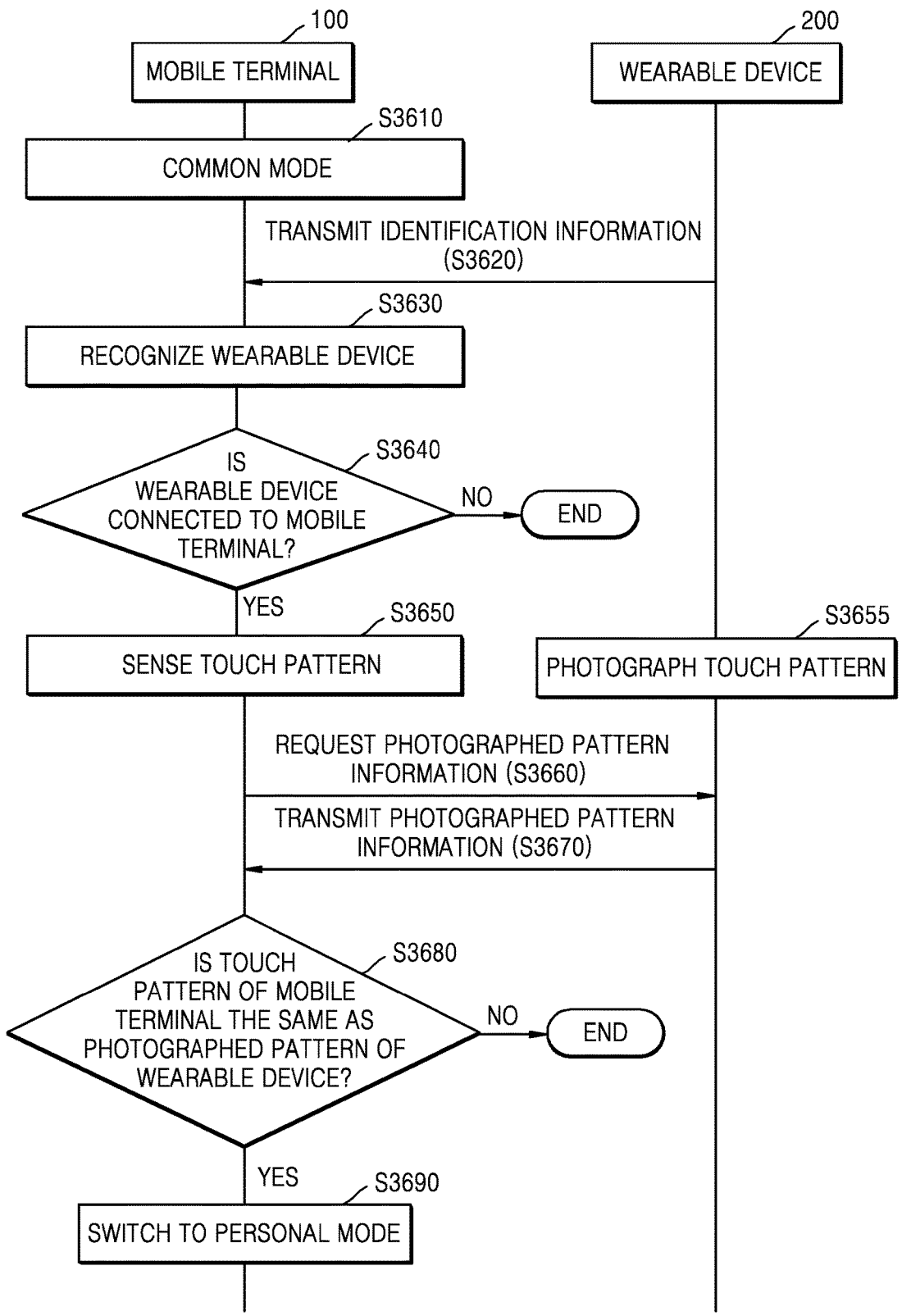

FIG. 36 is a flowchart illustrating a method of switching the operating state of the mobile terminal 100 from the common mode to the personal mode, when a touch pattern sensed by the mobile terminal 100 and a pattern photographed by the wearable device 200 are identical.

Referring to FIG. 36, the mobile terminal 100 may be in the common mode, in operation S3610.

Referring to FIG. 36, the wearable device 200 may transmit identification information to the mobile terminal 100 that is in a distance range set in advance, in operation S3620.

The mobile terminal 100 may recognize the wearable device 200 that is within a distance range set in advance from the mobile terminal 100, in operation S3630.

The mobile terminal 100 may determine whether the recognized wearable device 200 is connected to the mobile terminal 100, in operation S3640.

Because operations S3610 to S3640 of FIG. 36 correspond to operations S3410 to S3440 of FIG. 34, detailed descriptions thereof are omitted.

If the recognized wearable device 200 is connected to the mobile terminal 100, the mobile terminal 100 senses a touch pattern input by the user to acquire touch pattern information, in operation S3650.

The mobile terminal 100 may include a touch screen module and may sense a touch pattern (hereinafter, referred to as a first pattern) by sensing a touch gesture on the touch screen. Here, the mobile terminal 100 may include various sensors in the touch screen or around the touch screen to sense the touch input into the touch screen or a proximate touch.

Also, the user may input the touch pattern (first pattern) into the display including the touch screen of the mobile terminal 100 by using a finger or a touch tool.

For example, if the user inputs a star shape into the display of the mobile terminal 100, the mobile terminal 100 may acquire touch pattern information (first pattern information) including information about a shape or a size of the touch pattern input by the user (for example, information indicating that the touch pattern input by the user is formed as a star).

Also, if the user of the mobile terminal 100 inputs the touch pattern into the mobile terminal 100 while wearing the wearable device 200 including a camera, the wearable device 200 may photograph the touch gesture of the user of the mobile terminal 100 and the touch pattern (first pattern) displayed on the display of the mobile terminal 100, in operation S3655.

For example, the wearable device 200 may be an HMD that the user may wear on his/her head, but is not limited thereto. Also, the HMD may include glasses, a hat, or a helmet, but is not limited thereto.

In addition, the wearable device 200 may include the camera on a front portion thereof to be configured to photograph the touch gesture of the user of the mobile terminal 100 and the touch pattern displayed on the mobile terminal 100, when the user views the mobile terminal 100 while wearing the wearable device 200.

For example, the wearable device 200 may acquire photographed pattern information (second pattern information) including information about a shape or a size of the pattern photographed by the wearable device 200 (e.g., information indicating that the pattern photographed by the wearable device 200 is formed as a star).

In addition, the mobile terminal 100 may request the wearable device 200 for the photographed pattern information (second pattern information) in operation S3660.

The wearable device 200 may transmit the photographed pattern information (second pattern information) to the mobile terminal 100, in operation S3670.

The mobile terminal 100 may compare the first pattern information acquired by the mobile terminal 100 with the second pattern information transmitted from the wearable device 200 to determine whether the touch pattern (first pattern) of the mobile terminal 100 is the same as the photographed pattern (second pattern) of the wearable device 200, in operation S3680.

That the touch pattern (first pattern) of the mobile terminal 100 and the photographed pattern (second pattern) of the wearable device 200 are identical with each other does not denote that the first and second patterns are physically identical with each other, but denotes that the touch pattern (first pattern) of the mobile terminal 100 coincides with the photographed pattern (second pattern) of the wearable device 200 within a predetermined range.

If it is determined that the first pattern is the same as the second pattern, the mobile terminal 100 may determine that the user of the mobile terminal 100 and the user wearing the wearable device 200 are the same person, and may switch the operating state of the mobile terminal 100 from the common mode to the personal mode, in operation S3690.

Operation S3690 of FIG. 36 corresponds to operation S3490 of FIG. 34, and thus, detailed descriptions thereof are omitted.

Figure 37:
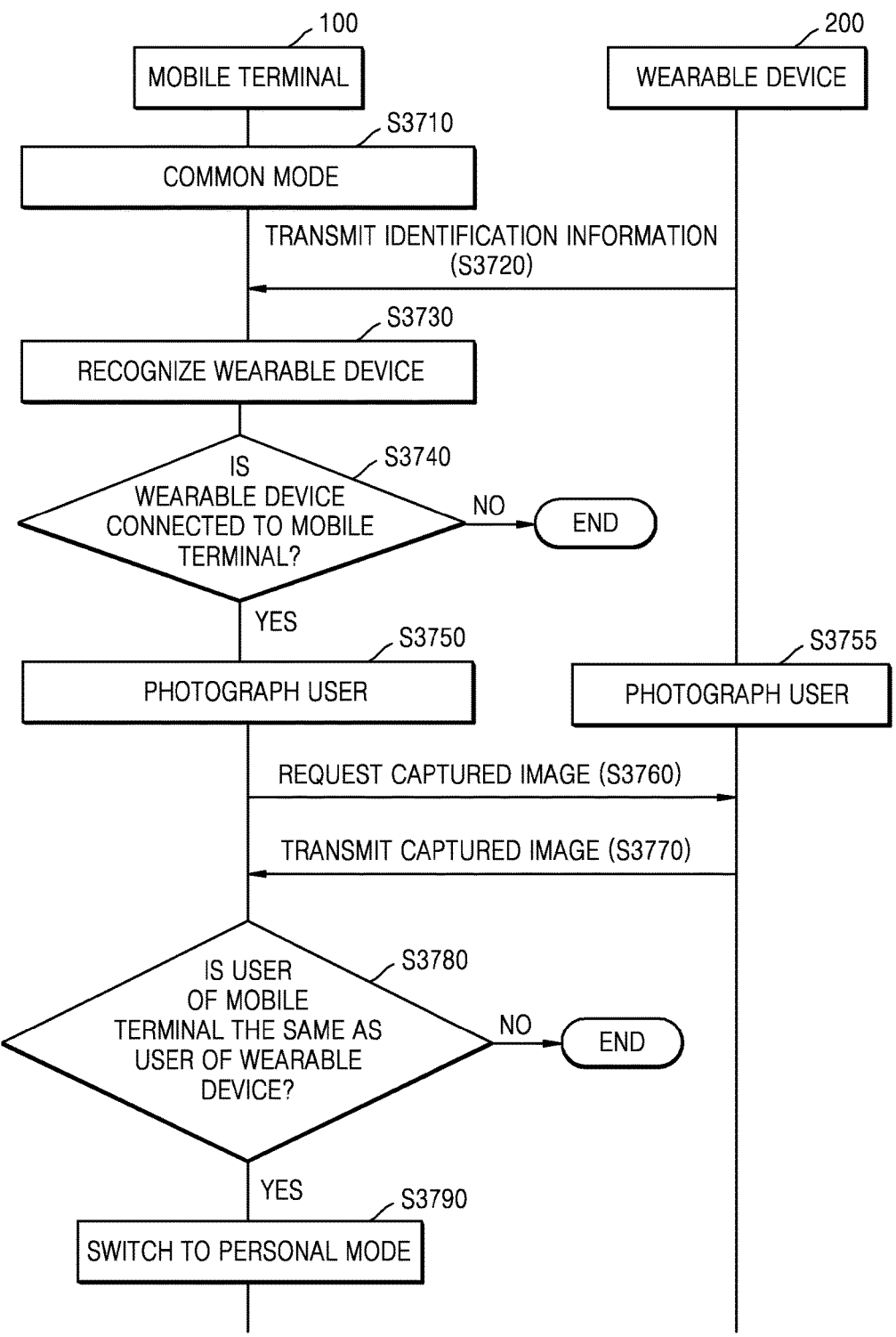

FIG. 37 is a flowchart illustrating a method of switching the operating state of the mobile terminal 100 from the common mode to the personal mode, when a user image captured by the mobile terminal 100 is the same as a user image captured by the wearable device 200, according to the exemplary embodiment.

Referring to FIG. 37, the mobile terminal 100 may be in the common mode, in operation S3710.

In addition, the wearable device 200 may transmit identification information to the mobile terminal 100 that is within a distance range set in advance, in operation S3720.

The mobile terminal 100 may recognize the wearable device 200 that is within a distance range set in advance from the mobile terminal 100, in operation S3730.

The mobile terminal 100 may determine whether the recognized wearable device 200 is connected to the mobile terminal 100, in operation S3740.

Because operations S3710 to S3740 of FIG. 37 correspond to operations S3410 to S3440 of FIG. 34, detailed descriptions thereof are omitted.

If the recognized wearable device 200 is connected to the mobile terminal 100, the wearable device 200 photographs a face of the user of the mobile terminal 100 to obtain a user image (first image), in operation S3750.

For example, the mobile terminal 100 may include a camera that may photograph the face of the user of the mobile terminal 100, and the camera is disposed on a front portion of the mobile terminal 100 to easily photograph the face of the user who is holding the mobile terminal 100.

The wearable device 200 connected to the mobile terminal 100 may photograph the face of the user wearing the wearable device 200 by using a camera to obtain a user image (second image), in operation S3755.

In addition, the mobile terminal 100 may request the wearable device 200 for the captured user image of the wearable device 200, in operation S3760.

The wearable device 200 may transmit the captured user image of the user wearing the wearable device 200 to the mobile terminal 100, in operation S3770.

The mobile terminal 100 may compare the user image (first image) captured by the mobile terminal 100 with the second image transmitted from the wearable device 200 to determine whether the user of the mobile terminal 100 is the same as the user of the wearable device 200, in operation S3780.

The mobile terminal 100 may determine whether the face of the user included in the first image and the face of the user included in the second image are the face of the same person. For example, the mobile terminal 100 may determine whether the face included in the first image is the same as the face included in the second image by analyzing a symmetrical configuration of the faces, distances and shapes of the eyes, the nose, and the mouth that are the main parts of the face, and color(s) of the eyes in the faces of the first image and the second image.

If it is determined that the user of the mobile terminal 100 is the same as the user of the wearable device 200, the mobile terminal 100 may determine that the user of the mobile terminal 100 and the user wearing the wearable device 200 are the same person, and may switch the operating state of the mobile terminal 100 from the common mode to the personal mode, in operation S3790.

Operation S3790 of FIG. 37 corresponds to operation S3490 of FIG. 34, and thus, detailed descriptions thereof are omitted.

Figure 38:
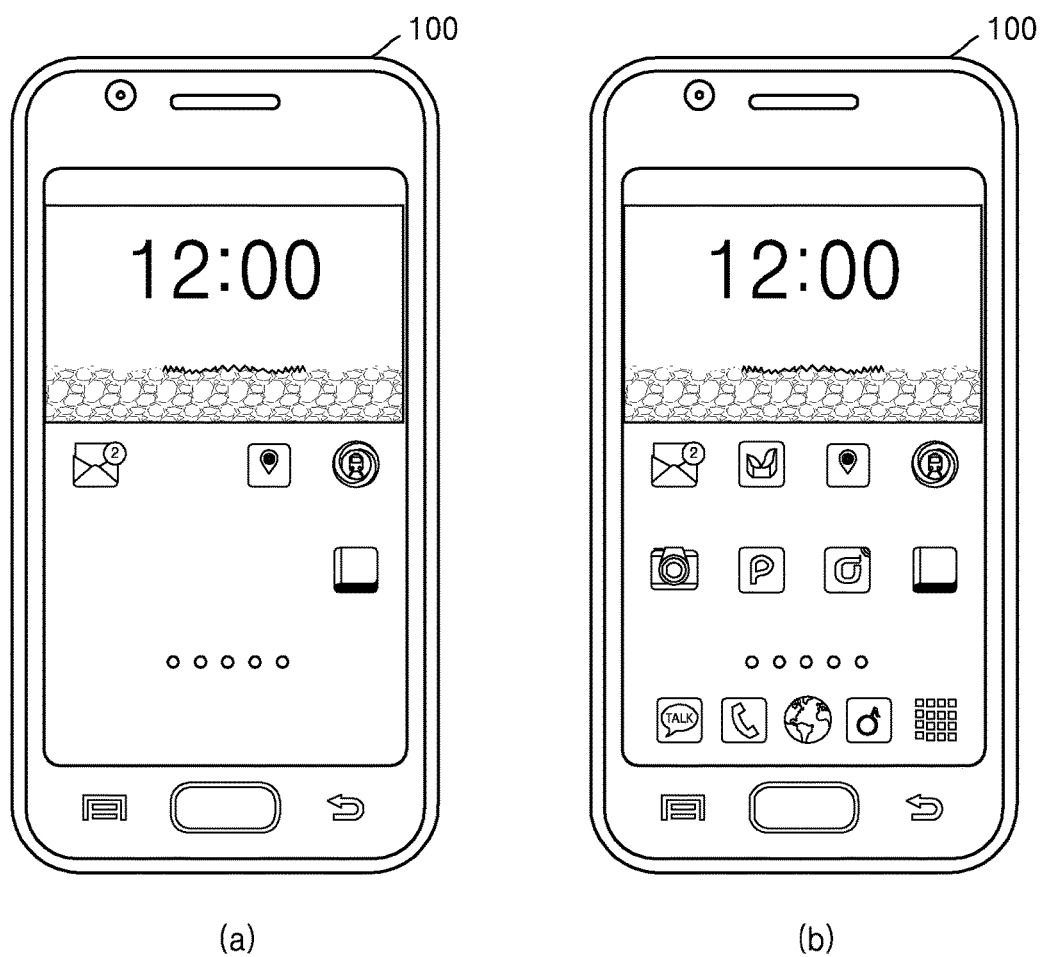
FIG. 38 is a diagram of a common mode and a personal mode of a mobile terminal, according to an exemplary embodiment.

FIG. 38 is a diagram of a common mode and a personal mode of the mobile terminal 100, according to an exemplary embodiment.

Referring to portion (a) of FIG. 38, in the common mode of the mobile terminal 100 according to the exemplary embodiment, menus of some applications may not be displayed.

Here, some applications that are not displayed in the common mode may include applications including personal information of the user of the mobile terminal 100 (e.g., a message application, a gallery application, and a phone book application), or applications set in advance by the user.

In addition, if it is determined that the user of the mobile terminal 100 and the user wearing the wearable device 200 are the same person, the mobile terminal 100 may switch the operating mode of the mobile terminal 100 from the common mode to the personal mode.

For example, cases where it is determined that the user of the mobile terminal 100 and the user of the wearable device 200 are the same person may include a case where the motion of the mobile terminal 100 is the same as the motion of the wearable device 200, a case where the bio signal of the user of the mobile terminal 100 is the same as the bio signal of the user wearing the wearable device 200, a case where the touch pattern of the mobile terminal 100 and the pattern photographed by the wearable device 200 are identical with each other, and a case where the user image of the mobile terminal 100 is the same as the user image of the wearable device 200, but are not limited thereto.

In addition, in the personal mode of the mobile terminal 100 according to the exemplary embodiment, menus of the applications that have not been displayed in the common mode may be displayed as shown in portion (b) of FIG. 38.

Also, if the menu of the application that is not displayed in the common mode is selected, the mobile terminal 100 may execute the selected application based on a user input.

Accordingly, the mobile terminal 100 may display and execute some of the applications (e.g., the applications including the personal information of the user of the mobile terminal 100) only when the user of the mobile terminal 100 is wearing the wearable device 200 that is connected to the mobile terminal 100, and thus, privacy of the user of the mobile terminal 100 may be protected.

Figure 39:
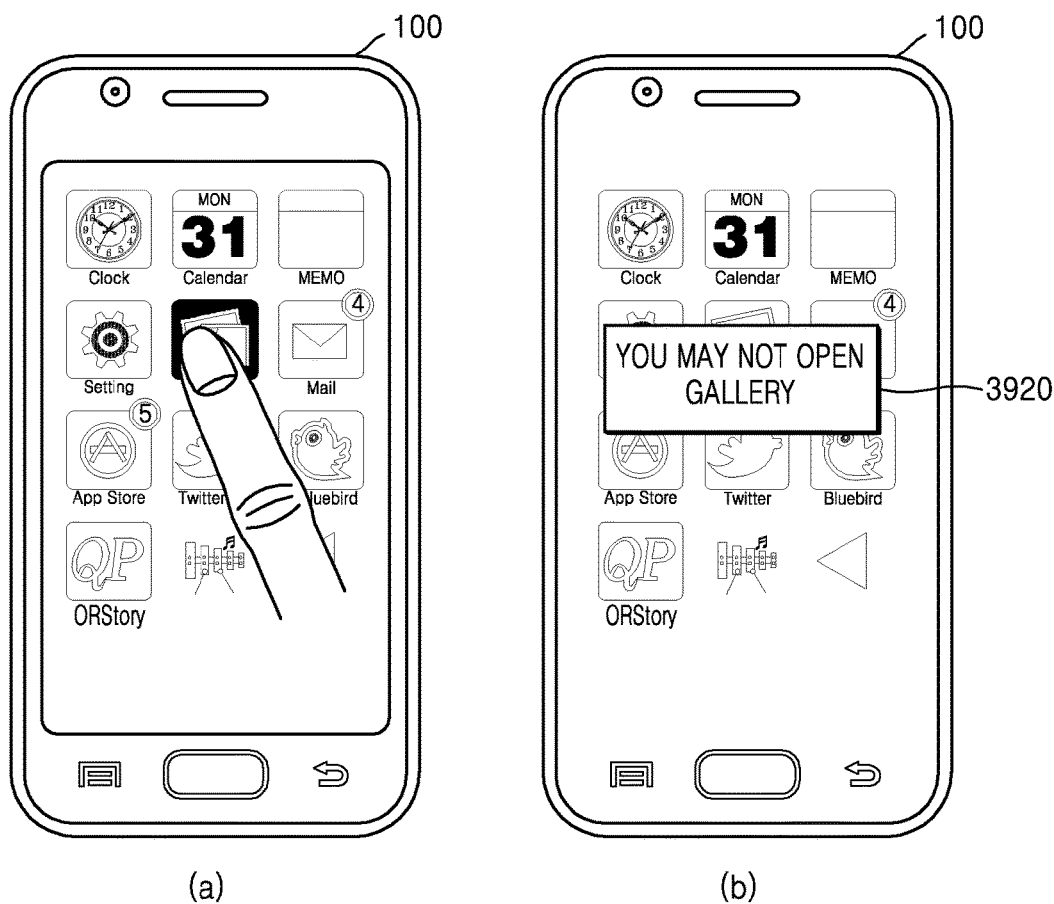
FIG. 39 is a diagram of a method of operating a mobile terminal in a common mode, according to an exemplary embodiment.
Figure 40:
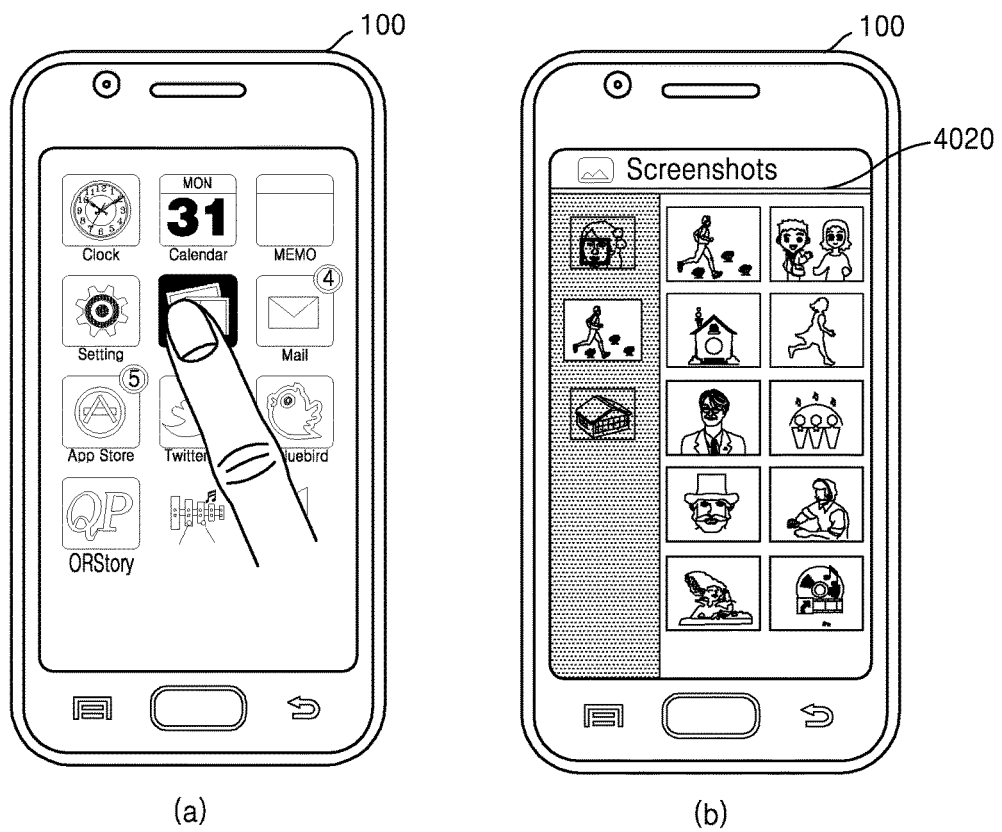
FIG. 40 is a diagram of a method of operating a mobile terminal in a personal mode, according to an exemplary embodiment.

FIG. 39 is a diagram of a method of operating the mobile terminal 100 in a common mode, and FIG. 40 is a diagram of a method of operating the mobile terminal 100 in a personal mode, according to an exemplary embodiment.

Referring to portion (a) of FIG. 39, the menus of the application installed on the mobile terminal 100 may be displayed in the common mode of the mobile terminal 100 according to the exemplary embodiment.

Here, if the user of the mobile terminal 100 selects some of the menus of the applications displayed on the display of the mobile terminal 100, the execution of the selected applications may be restricted.

The some applications, execution of which is restricted, may include applications including the personal information of the user of the mobile terminal 100 (e.g., the message application, the gallery application, and the phone book application), or other applications set in advance by the user.

Also, if the user selects the some applications that are restricted to be executed, the mobile terminal 100 may display a message notifying that the selected application may not be executed. For example, if the user of the mobile terminal 100 selects the gallery application as shown in portion (a) of FIG. 39, the mobile terminal 100 may display a message 3920 notifying that the gallery application may not be executed as shown in portion (b) of FIG. 39.

In addition, if it is determined that the user of the mobile terminal 100 and the user wearing the wearable device 200 are the same person, the mobile terminal 100 may switch the operating mode thereof to the personal mode.

Referring to portion (a) of FIG. 40, in the personal mode of the mobile terminal 100, menus of the applications installed on the mobile terminal 100 may be displayed.

Here, if the user of the mobile terminal 100 selects an application that is restricted to be executed in the common mode from among the menus of the applications displayed on the display (e.g., the application including the personal information of the user of the mobile terminal 100), the mobile terminal 100 may execute the selected application.

For example, if the user of the mobile terminal 100 selects the gallery application as shown in portion (a) of FIG. 40, the mobile terminal 100 may display an execution screen 4020 of the gallery application as shown in portion (b) of FIG. 40.

Accordingly, the mobile terminal 100 may execute some applications (e.g., applications including personal information of the user of the mobile terminal 100) only when the user of the mobile terminal 100 wears the wearable device 200 connected to the mobile terminal 100, and thus, the privacy of the user of the mobile terminal 100 may be protected.

Figure 41:
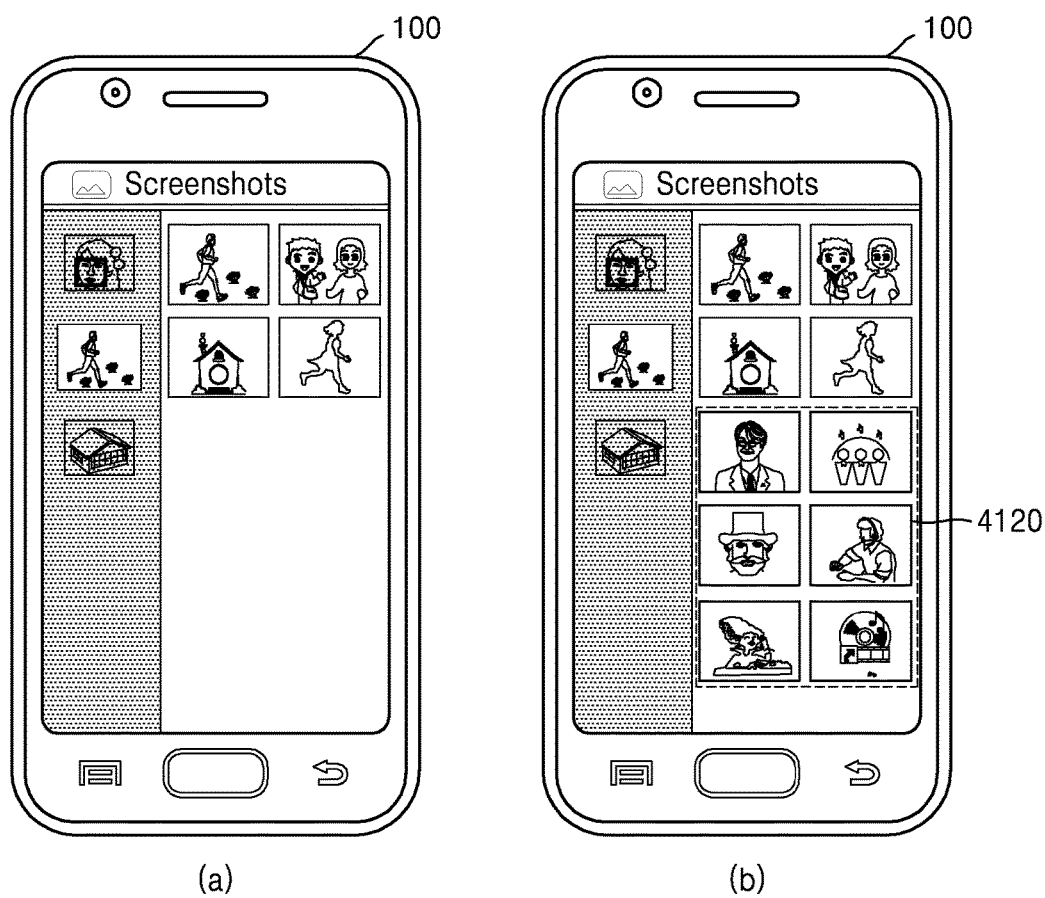
FIG. 41 is a diagram of a common mode and a personal mode of a mobile terminal, according to an exemplary embodiment.

FIG. 41 is a diagram of a common mode and a personal mode of the mobile terminal 100, according to an exemplary embodiment.

Referring to FIGS. 41A and 41B, some functions of an application may be restricted in the common mode of the mobile terminal 100 according to the exemplary embodiment.

For example, as shown in portion (a) of FIG. 41, if the gallery application is executed in the common mode of the mobile terminal 100, some images included in the gallery application may not be displayed. Here, the some images that are not displayed in the common mode may be set in advance by the user.

In addition, if it is determined that the user of the mobile terminal 100 and the user wearing the wearable device 200 are the same person, the mobile terminal 100 may switch the operating mode of the mobile terminal 100 into the personal mode.

In the personal mode of the mobile terminal 100 according to the exemplary embodiment, when the gallery application is executed as shown in portion (b) of FIG. 41, an image 4120 that is not displayed in the common mode may be displayed.

Accordingly, the mobile terminal 100 according to the exemplary embodiment may execute some functions of the application (e.g., restricted image display) only when the user of the mobile terminal 100 wears the wearable device 200 connected to the mobile terminal 100, and thus, protects the privacy of the user of the mobile terminal 100.

Figure 42:
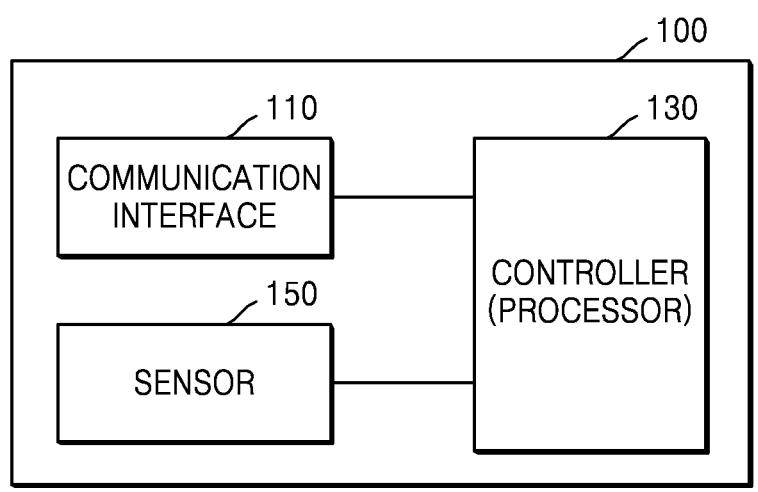
FIGS. 42 and 43 are block diagrams of a mobile terminal, according to exemplary embodiments.
Figure 43:
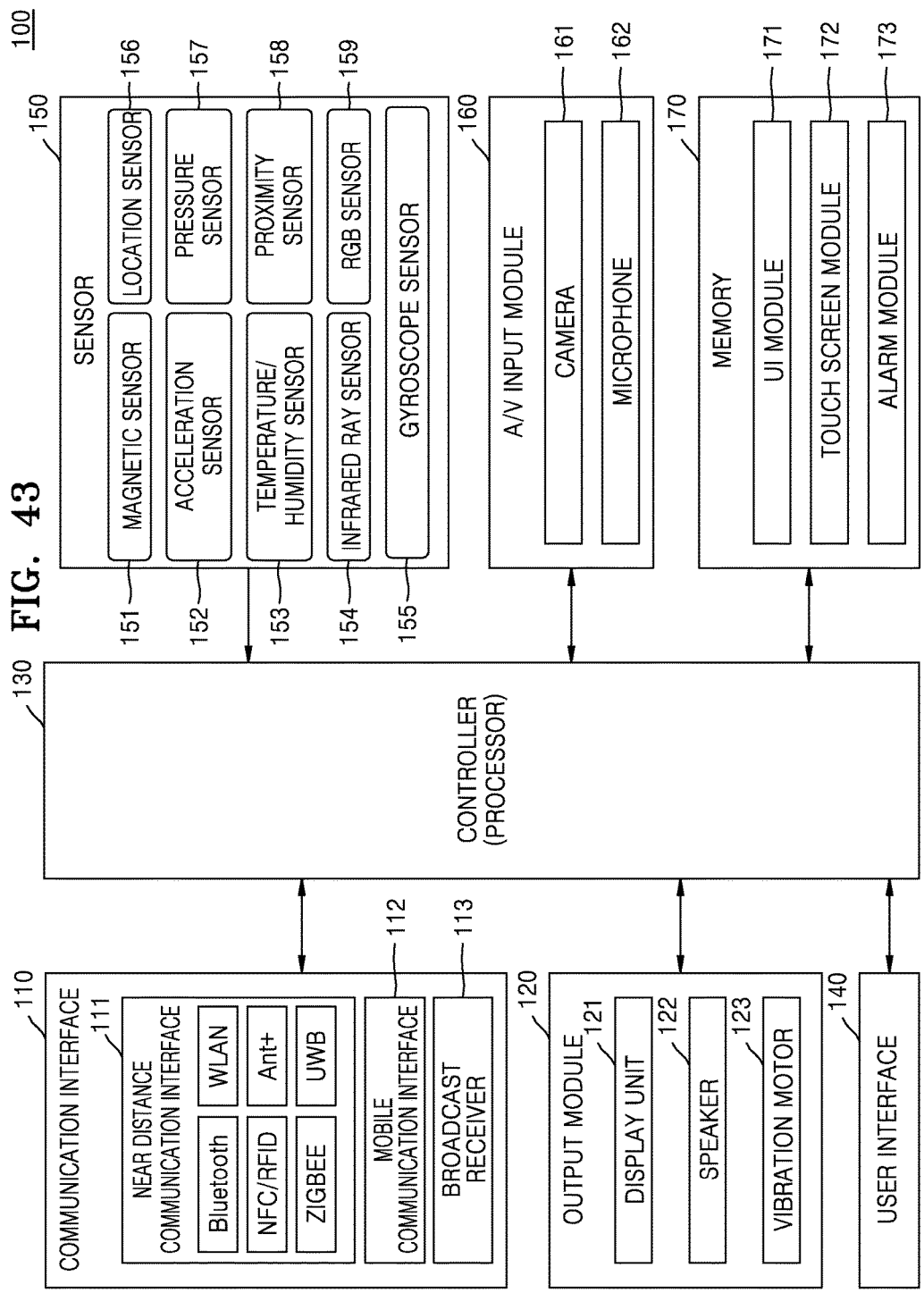

FIGS. 42 and 43 are block diagrams of the mobile terminal 100, according to exemplary embodiments.

Referring to FIG. 42, the mobile terminal 100 includes a communication interface 110, a controller 130, and a sensor 150. However, not all of the elements shown in FIG. 42 are essential elements, that is, the mobile terminal 100 may include more or less elements than those of FIG. 42.

For example, referring to FIG. 43, the mobile terminal 100 may further include an output module 120, a user interface 140, an audio/video (A/V) input module 160, and a memory 170, in addition to the communication interface 110, the controller 130, and the sensor 150.

The above elements will be described below.

The communication interface 110 may include one or more elements for performing communication between the mobile terminal 100 and the wearable device 200 or an external device. For example, the communication interface 110 may include a short-range communication interface 111, a mobile communication interface 112, and a broadcast receiver 113.

The short-range wireless communication interface 111 may include, but is not limited to, a Bluetooth communication interface, BLE communication interface, a Near Field Communication (NFC) interface, a WLAN (Wi-Fi) communication interface, a ZigBee communication interface, an IrDA communication interface, a Wi-Fi direct (WFD) communication interface, an ultra wideband (UWB) communication interface, or an Ant+ communication interface.

The mobile communication interface 112 exchanges a wireless signal with at least one selected from a base station, an external terminal, and a server on a mobile communication network. The wireless signal may include various types of data according to transmission of a sound call signal, a video call signal, or a text/multimedia message.

The broadcast receiver 113 receives a broadcast signal and/or information related to a broadcast from the outside through a broadcast channel. The broadcast channel may include a satellite channel and a ground wave channel. In another embodiment, the mobile terminal 100 may not include the broadcast receiver 113.

The communication interface 110 may transmit and receive data to/from the wearable device 200. Also, the communication interface 110 may receive the user authentication information or the device identification information of the wearable device 200 from the wearable device 200, and may transmit the user authentication information or the device identification information of the mobile terminal 100 to the wearable device 200.

Also, the communication interface 110 may receive the motion information of the wearable device 200, the bio information of the user wearing the wearable device 200, the pattern information captured by the wearable device 200, or the user image of the wearable device 200 from the wearable device 200 connected to the mobile terminal 100.

The output module 120 outputs an audio signal, a video signal, or a vibration signal, and may include a display 121, a speaker 122, and a vibration motor 123.

The display 121 displays and outputs the information processed by the mobile terminal 100. For example, if the wearable device 200 connected to the mobile terminal 100 exists within the preset distance range, the display 121 may display a motion unlock function notification message, and may display the home screen when the lock mode of the mobile terminal 100 is unlocked.

Also, the display 121 may display the web page or content that is currently being displayed on the wearable device 200, and may display the message transmitted from the wearable device 200.

In addition, if the display 121 and a touch pad form a mutual layer structure and then are formed as a touch screen, the display 121 may be used as both an output device and input device. The display 121 may include at least one of a liquid crystal display (LCD), a thin film transistor-liquid crystal display (TFT-LCD), an organic light-emitting diode (OLED) display, a flexible display, a 3D display, and an electrophoretic display. Also, according to a type of the mobile terminal 100, the mobile terminal 100 may include at least two displays 121.

The speaker 122 may output audio data that is received from the communication interface 110 or is stored in the memory 170. The speaker 122 may also output a sound signal (e.g., a call signal receiving sound, a message receiving sound, a notifying sound, or the like) related to capabilities performed by the mobile terminal 100. The speaker 122 may include a buzzer or the like.

The vibration motor 123 may output a vibration signal. For example, the vibration motor 123 may output the vibration signal that corresponds to an output of the audio data (e.g., the call signal receiving sound, the message receiving sound, or the like) or video data. Also, when a touch is input to the touch screen, the vibration motor 123 may output a vibration signal.

The controller 130 may control all operations of the mobile terminal 100. That is, the controller 130 may control the communication interface 110, the output module 120, the user interface 140, the sensor 150, and the A/V input module 160 by executing programs stored in the memory 170.

The controller 130 compares the motion information of the mobile terminal 100 with the motion information of the wearable device 200, and then, if the motion of the mobile terminal 100 is the same as the motion of the wearable device 200, the controller 130 may unlock the lock mode of the mobile terminal 100.

The controller 130 may determine whether the wearable device 200 is connected to the mobile terminal 100. The controller 130 may compare the motion of the mobile terminal 100 with a predetermined motion, and if the motion of the mobile terminal 100 is the same as the predetermined motion, the controller 130 may control the communication interface 110 to receive the motion information of the wearable device 200.

If the motion of the mobile terminal 100 is the same as the wearable device 200, the controller 130 may control the mobile terminal 100 to perform an operation related to the operation currently performed by the wearable device 200.

If the wearable device 100 is reproducing a piece of content and the motion of the mobile terminal 100 is the same as the motion of the wearable device 200, the controller 130 may control the mobile terminal 100 to reproduce the content reproduced by the wearable device 200 continuously.

If the wearable device 200 displays a web page and the motion of the mobile terminal 100 is the same as the motion of the wearable device 200, the controller 130 may control the mobile terminal 100 to display a web page that is the same as that displayed on the wearable device 200.

If the wearable device 200 receives a call connection request and the motion of the mobile terminal 100 is the same as the motion of the wearable device 200, the controller 130 may control the mobile terminal 100 to connect the call.

If the wearable device 200 receives a notification message and the motion of the mobile terminal 100 is the same as the motion of the wearable device 200, the controller 130 may control the mobile terminal 100 to execute an application related to the notification message.

The user interface 140 may be a device by which a user inputs data to control the mobile terminal 100. For example, the user interface 140 may include a key pad, a dome switch, a touch pad (a touch capacitive-type touch pad, a pressure resistive-type touch pad, an infrared beam-sensing-type touch pad, a surface acoustic wave-type touch pad, an integral strain gauge type touch pad, a piezoelectric effect-type touch pad, or the like), a jog wheel, and a jog switch, but one or more embodiments are not limited thereto.

The sensor 150 senses the state of the mobile terminal 100 or the state around the mobile terminal 100, and transmits the sensed information to the controller 130.

The sensor 150 may include at least one selected from a magnetic sensor 151, an acceleration sensor 152, a temperature/humidity sensor 153, an infrared ray sensor 154, a gyroscope sensor 155, a location sensor 156 (for example, a GPS), a pressure sensor 157, a proximity sensor 158, and an RGB (luminance) sensor 159, but is not limited thereto. Functions of the above sensors may be intuitively deduced by one of ordinary skill in the art from their names, and thus, detailed descriptions about the functions of the above sensors are not provided here.

The sensor 150 may sense the motion of the mobile terminal 100, bio signals of the user of the mobile terminal 100, and a touch signal input into the mobile terminal 100.

The A/V input module 160 inputs an audio signal or a video signal, and may include a camera 161 and a microphone 162. The camera 161 may obtain an image frame such as a still image or a moving picture via an image sensor during a video call mode or an image-capturing mode. An image that is captured via the image sensor may be processed by the controller 130 or a separate image processor (not shown).

The image frame that is processed by the camera 161 may be stored in the memory 170 or may be transmitted to an external source via the communication interface 110. According to a configuration of the mobile terminal 100, two or more cameras 161 may be arranged.

The microphone 162 receives an external sound signal as an input and processes the received sound signal into electrical voice data. For example, the microphone 162 may receive a sound signal from an external device or a speaker. To remove noise that occurs while the sound signal is externally input, the microphone 162 may use various noise removing algorithms.

The memory 170 may store a program for processing and controlling the controller 130, or may store a plurality of pieces of input/output data (e.g., an application, content, an address book, etc.).

The memory 170 may include a storage medium of at least one type of flash memory, hard disk, multimedia card memory, card memory such as an SD or XD card memory, Random Access Memory (RAM), Static Random Access Memory (SRAM), Read-Only Memory (ROM), Electrically Erasable Programmable Read-Only Memory (EEPROM), Programmable Read-Only Memory (PROM), magnetic memory, magnetic disc, and optical disc. Also, the mobile terminal 100 may run web storage or a cloud server that performs a storage function of the memory 170 on the Internet.

The programs stored in the memory 170 may be classified into a plurality of modules according to their functions, for example, into a UI module 171, a touch screen module 172, an alarm module 173, etc.

The UI module 171 may provide a specialized UI or GUI in connection with the mobile terminal 100 for each application. The touch screen module 172 may detect a user's touch gesture on the touch screen and transmit information related to the touch gesture to the controller 130. The touch screen module 172 may determine and analyze a touch code. The touch screen module 172 may be configured as additional hardware including a controller.

Various sensors may be arranged in or near the touch screen to detect a touch or a proximate touch on the touch sensor. An example of the sensor to detect the touch on the touch screen may include a tactile sensor. The tactile sensor detects a contact of an object at least as sensitively as a person can detect. The tactile sensor may detect various types of information such as the roughness of a contact surface, the hardness of the contact object, the temperature of a contact point, or the like.

An example of the sensor to detect the touch on the touch screen may include a proximity sensor.

The proximity sensor detects the existence of an object that approaches a predetermined detection surface or that exists nearby, by using a force of an electro-magnetic field or an infrared ray, instead of mechanical contact. Examples of the proximity sensor include a transmission-type photoelectric sensor, a direction reflection-type photoelectric sensor, a mirror reflection-type photoelectric sensor, a high frequency oscillation-type proximity sensor, a capacity-type proximity sensor, a magnetic proximity sensor, an infrared-type proximity sensor, or the like. The touch gesture of the user may include a tap gesture, a touch & hold gesture, a double tap gesture, a drag gesture, a panning gesture, a flick gesture, a drag & drop gesture, a swipe gesture, or the like.

The alarm module 173 may generate a signal for notifying the user about an occurrence of an event in the mobile terminal 100. Examples of the event that may occur in the mobile terminal 100 include a call signal receiving event, a message receiving event, a key signal input event, a schedule notifying event, or the like. The alarm module 173 may output an alarm signal in the form of a video signal via the display 121, an alarm signal in the form of an audio signal via the speaker 122, or an alarm signal in the form of a vibration signal via the vibration motor 123.

Figure 44:
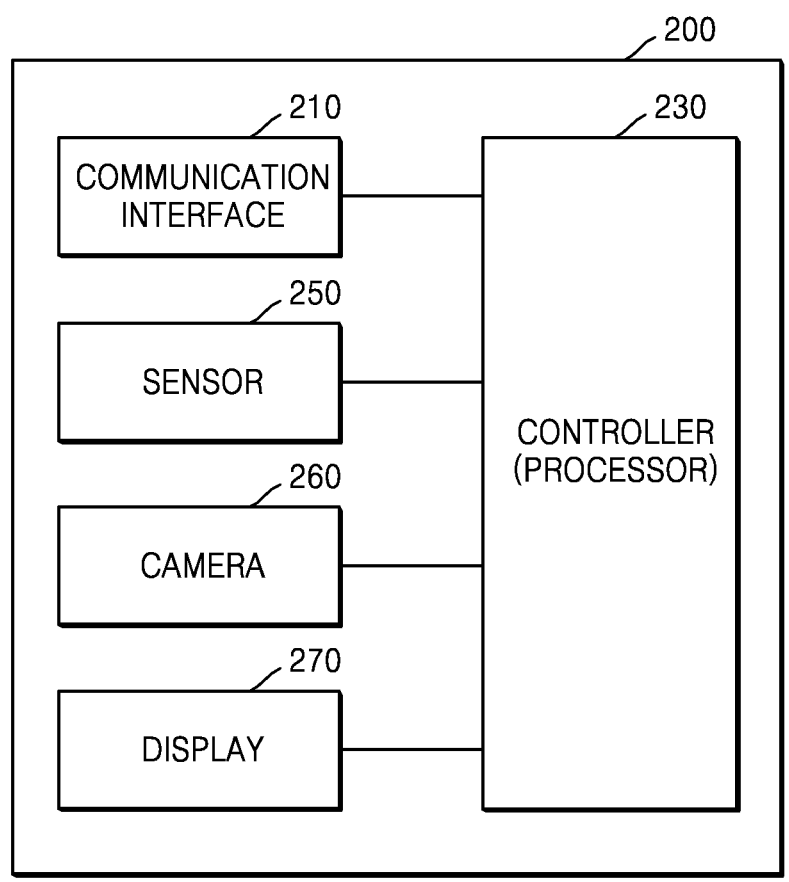
FIG. 44 is a block diagram of a wearable device, according to an exemplary embodiment.

FIG. 44 is a block diagram of the wearable device 200, according to an exemplary embodiment.

As shown in FIG. 44, the wearable device 200 includes a communication interface 210, a controller 230, a sensor 250, a camera 260, and a display 270. However, not all of the elements are essential. That is, the wearable device 200 may include more or less elements than those of FIG. 44.

Hereinafter, the above elements will be described as follows.

The communication interface 210 may include one or more elements for performing communication between the wearable device 200 and the mobile terminal 100 or an external device. For example, the communication interface 210 may include a short-range communication interface, a mobile communication interface, and a broadcast receiving interface. The short-range communication interface, the mobile communication interface, and the broadcast receiving interface correspond to short-range communication interface 111, the mobile communication interface 112, and the broadcast receiver 113 of FIG. 42, and detailed descriptions thereof are omitted.

The sensor 250 senses the state of the wearable device 200 or the state around the wearable device 200, and transmits the sensed information to the controller 230.

The sensor 250 may sense the motion of the wearable device 200 or the bio signal of the user wearing the wearable device 200.

Also, the sensor 250 may sense whether the wearable device 200 is worn by the user. For example, the sensor 250 may sense whether the user wears the wearable device 200 by using a pressure sensor or a ground sensor. This is described above with reference to FIG. 6, and thus, detailed descriptions thereof are omitted.

In addition, the sensor 250 may include at least one selected from a magnetic sensor, an acceleration sensor, a temperature/humidity sensor, an infrared ray sensor, a gyroscope sensor, a location sensor (for example, a GPS), a pressure sensor, a proximity sensor, and an RGB (luminance) sensor, but is not limited thereto.

The camera 260 may photograph the touch pattern input into the mobile terminal 200 or to photograph the user wearing the wearable device 200.

The camera may obtain an image frame such as a still image or a video via an image sensor in a video call mode or a photographing mode. The images captured by the image sensor may be processed by the controller 230 or an additional image processor (not shown). The image frame processed by the camera may be stored in a memory or transmitted to outside via the communication interface 210. According to configuration of the wearable device 200, two or more cameras may be provided.

The display 270 may display web pages and various pieces of content, and may display menus of applications installed on the wearable device 200.

The controller 230 controls overall operations of the wearable device 200. For example, the controller 230 may control the communication interface 210, the sensing unit 220, the camera 260, and the display 270.

Figure 45:
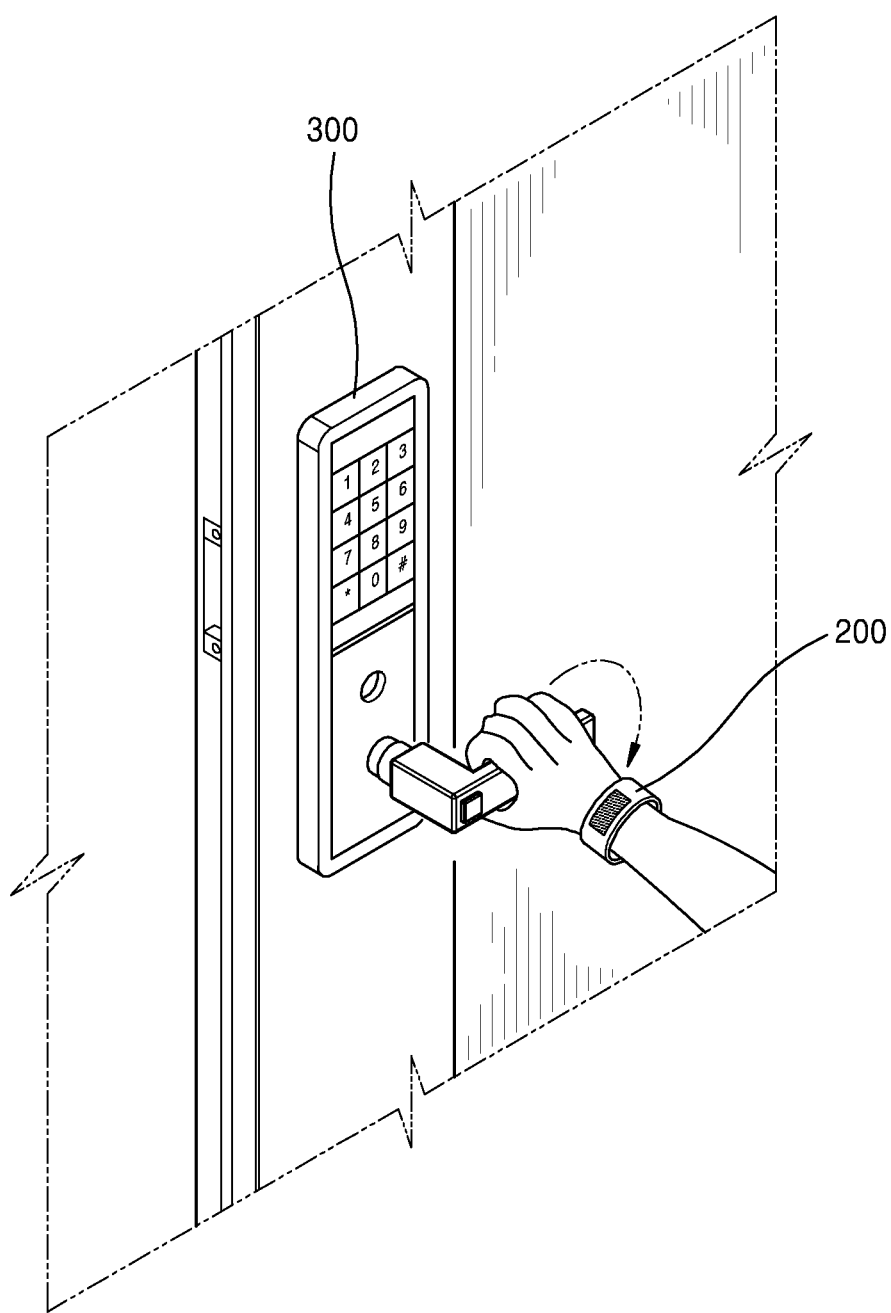
FIG. 45 is a diagram of an interaction between a smart door-lock and a wearable device, according to an exemplary embodiment.

FIG. 45 is a diagram of an interaction between a smart door-lock 300 and the wearable device 200, according to an exemplary embodiment.

The smart door-lock 300 according to the exemplary embodiment may be an example of the mobile terminal 100 illustrated with reference to FIG. 42, and may include the communication interface 110, the controller 130, and the sensor 150.

The wearable device 200 according to the exemplary embodiment may be in an unlock state. For example, the unlock state of the wearable device 200 may be a state in which the home screen is displayed on the display of the wearable device 200. Otherwise, menus of the applications installed on the wearable device 200 are displayed on the display of the wearable device 200, and when a menu of an application is selected, the selected application may be executed.

Also, the wearable device 200 may transmit identification information to the smart door-lock that exists within a distance range set in advance. For example, when the smart door-lock 300 and the wearable device 200 exist within the predetermined distance range, the smart door-lock 300 and the wearable device 200 may transmit and receive user authentication information or device identification information to/from each other via short-range communication. Accordingly, the smart door-lock 300 may recognize the wearable device 200 that is within the distance range set in advance from the smart door-lock 300.

The smart door-lock 300 may determine whether the recognized wearable device 200 is connected thereto. For example, the smart door-lock 300 compares the identification information transmitted from the wearable device 200 with the identification information of the wearable device registered in the smart door-lock 300 to determine whether the recognized wearable device 200 is connected to the smart door-lock 300.

If the recognized wearable device 200 is connected to the smart door-lock 300, the smart door-lock 300 may request the wearable device 200 for motion information of the wearable device 200. The wearable device 200 may measure a direction, a velocity, or a variation in the velocity of a movement of the wearable device 200 by using the magnetic sensor, the location sensor, the acceleration sensor, the proximity sensor, or the gyroscope sensor, in response to the request. Also, the wearable device 200 may transmit motion information of the wearable device 200, sensed by the wearable device 200, to the smart door-lock 300.

The smart door-lock 300 may determine whether the motion of the wearable device 200 is a user's motion to rotate a handle of the smart door-lock 300 (motion for rotating the smart door-lock to open), based on the motion information of the wearable device 200 transmitted from the wearable device 200. For example, the smart door-lock 300 may determine whether the motion information of the wearable device 200 and the motion information stored in advance (e.g., information about the motion of rotating the handle of the smart door-lock 300) have a correlation of a predetermined level or greater.

If the motion information of the wearable device 200 and the motion information stored in advance have the correlation of a predetermined level or greater, the smart door-lock 300 may unlock the lock state of the smart door-lock 300.

Figure 46:
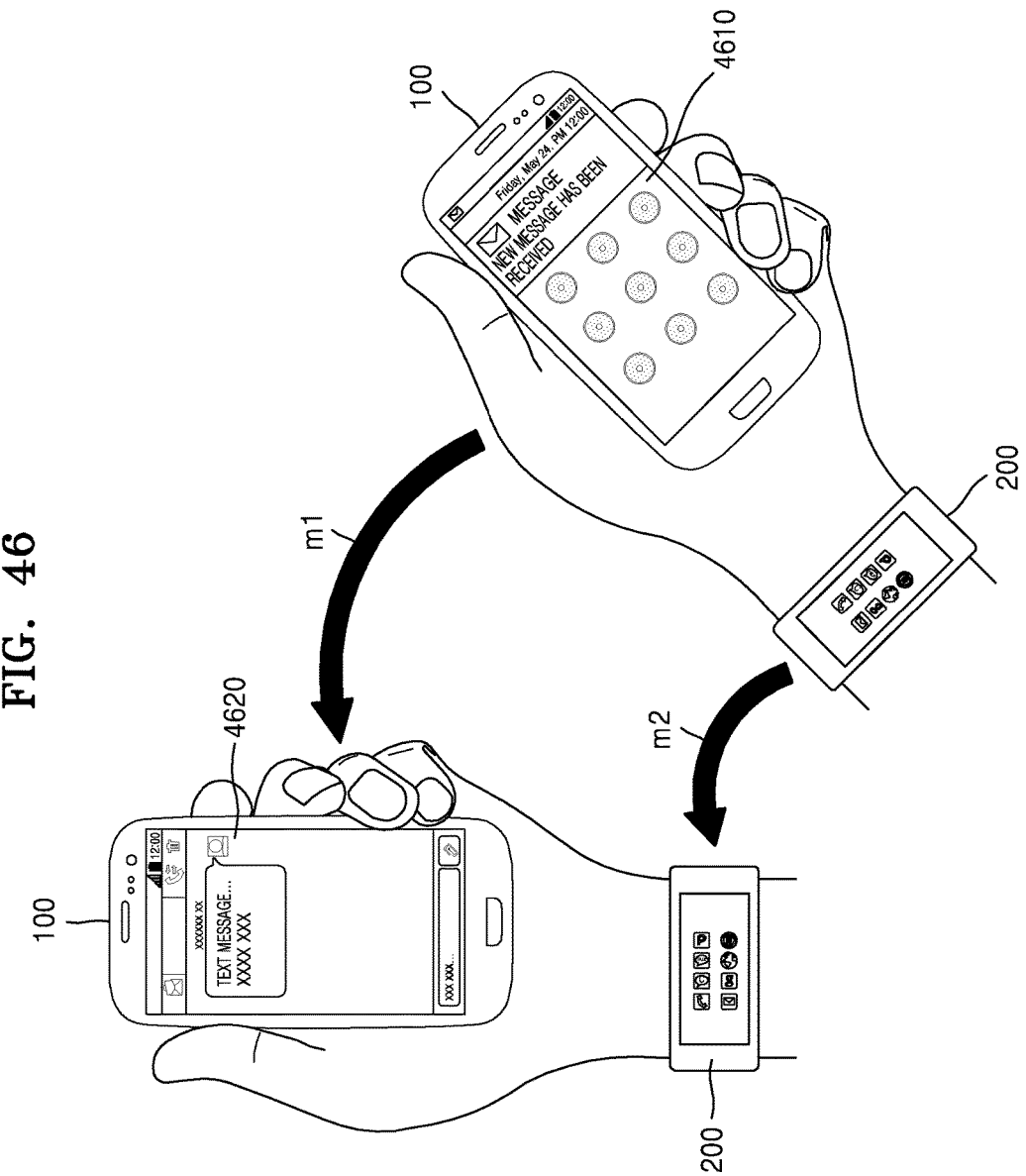
FIG. 46 is a diagram of a method of displaying detailed information of a notification message on a mobile terminal, when a motion of the mobile terminal is the same as a motion of a wearable device, according to an exemplary embodiment.

FIG. 46 is a diagram of a method of displaying detailed information of a notification message 4610 on the mobile terminal 100, when a motion of the mobile terminal 100 is the same as a motion of the wearable device 200, according to an exemplary embodiment.

Referring to FIG. 46, the mobile terminal 100 receives the notification message 4610 in the lock mode, and when the motion of the mobile terminal 100 is the same as the motion of the wearable device 200, the mobile terminal 100 may execute an application related to the notification message 4610.

For example, the mobile terminal 100 may receive various notification messages such as a notification message regarding an SNS application, a message notifying receipt of a message, or a notification message regarding a game application in the lock mode, and display the notification messages on the display thereof. Also, the notification message may be displayed as a pop-up window.

If the motion information sensed by the wearable device 200 connected to the mobile terminal 100 is the same as the motion information sensed by the mobile terminal 100 at the same time with the wearable device 200, the mobile terminal 100 may unlock the lock mode of the mobile terminal 100, and may execute the application related to the notification message 4610.

For example, as shown in FIG. 46, if the notification message 4610 is a message for notifying receipt of a message (e.g., a text message, an instant message, a chatting message, or an e-mail), the mobile terminal 100 may execute the application related to the message, and display a received message 4620 on the display.

Accordingly, if the mobile terminal 100 receives the notification message 4610 in the lock mode, there is no need to unlock the lock mode of the mobile terminal, to select and execute the application corresponding to the notification message 4610. Instead, the detailed content related to the notification message 4610 may be identified only by performing a motion (e.g., holding and lifting the mobile terminal 100).

In addition, the exemplary embodiments may also be implemented through computer-readable code and/or instructions on a medium, e.g., a non-transitory computer-readable medium, to control at least one processing element to implement any above-described embodiments. The medium may correspond to any medium or media which may serve as a storage and/or perform transmission of the computer-readable code.

The computer-readable code may be recorded and/or transferred on a medium in a variety of ways, and examples of the medium include recording media, such as magnetic storage media (e.g., ROM, floppy disks, hard disks, etc.) and optical recording media (e.g., compact disc read only memories (CD-ROMs) or digital versatile discs (DVDs)), and transmission media such as Internet transmission media. Thus, the medium may have a structure suitable for storing or carrying a signal or information, such as a device carrying a bitstream according to one or more exemplary embodiments. The medium may also be on a distributed network, so that the computer-readable code is stored and/or transferred on the medium and executed in a distributed fashion. Furthermore, the processing element may include a processor or a computer processor, and the processing element may be distributed and/or included in a single device.

The foregoing exemplary embodiments and advantages are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A mobile terminal comprising:
    a display configured to display a received notification message regarding at least one application installed on the mobile terminal, when the mobile terminal is in a locked state;
    a sensor configured to sense a motion of the mobile terminal;
    a communication interface configured to transmit, to a wearable device corresponding to the mobile terminal, a request for information of a motion of the wearable device and to receive, from the wearable device, the information of the motion of the wearable device and information indicating a state of the wearable device, the motion of the wearable device being sensed during a time period; and
    a controller configured to:

determine whether a correlation between a direction of the motion of the mobile terminal and a direction of the motion of the wearable device is greater than a threshold;

change a state of the mobile terminal from the locked state, in which a screen of the mobile terminal is deactivated or a lock screen is displayed by the mobile terminal, to an unlocked state in response to determining that the correlation between the direction of the motion of the mobile terminal and the direction of the motion of the wearable device is greater than the threshold and in response to determining that the state of the wearable device is an unlocked state according to the received information indicating the state of the wearable device; and automatically execute the at least one application related to the notification message in the unlocked state, when the state of the mobile terminal is changed from the locked state to the unlocked state based on the direction of the motion of the wearable device and the state of the wearable device, wherein the controller is further configured to recognize that the wearable device is within a distance range from the mobile terminal, and wherein the display is configured to display a message notifying that the mobile terminal may be unlocked if the motion of the mobile terminal and the motion of the wearable device are the same or similar, in response to the controller recognizing that the wearable device is within the distance range.

2. The mobile terminal of claim 1, wherein the sensor is further configured to sense the motion of the mobile terminal during a time period identical to the time period during which the motion of the wearable device is sensed.

3. The mobile terminal of claim 1, wherein the controller is further configured to determine whether the motion of the mobile terminal and a motion set in advance have a correlation greater than a threshold, and the communication interface is further configured to transmit, to the wearable device, the request for the information of the motion of the wearable device, in response to the controller determining that the motion of the mobile terminal and the motion set in advance have the correlation greater than the threshold.

4. The mobile terminal of claim 1, wherein the controller is further configured to control the mobile terminal to perform an operation corresponding to an operation that the wearable device is performing, in response to the controller determining that the direction of the motion of the mobile terminal and the direction of the motion of the wearable device have the correlation greater than the threshold.

5. The mobile terminal of claim 1, wherein the communication interface is further configured to receive, from the wearable device, information of content that the wearable device is reproducing, in response to the controller determining that the direction of the motion of the mobile terminal and the direction of the motion of the wearable device have the correlation greater than the threshold, and the controller is further configured to control the mobile terminal to reproduce the content based on the information of the content.

6. The mobile terminal of claim 1, wherein the communication interface is further configured to receive, from the wearable device, information of a web page that the wearable device is displaying, in response to the controller determining that the direction of the motion of the mobile terminal and the direction of the motion of the wearable device have the correlation greater than the threshold, and the display is further configured to display the web page based on the information of the web page.

7. The mobile terminal of claim 1, wherein the communication interface is further configured to receive, from the wearable device, information of a call the wearable device is connecting, in response to the controller determining that the direction of the motion of the mobile terminal and the direction of the motion of the wearable device have the correlation greater than the threshold, and the controller is further configured to control the mobile terminal to connect the call based on the information of the call.

8. The mobile terminal of claim 1, wherein the communication interface is further configured to receive, from the wearable device, information of an application corresponding to a message the wearable device receives, in response to the controller determining that the direction of the motion of the mobile terminal and the direction of the motion of the wearable device have the correlation greater than the threshold, and the controller is further configured to control the mobile terminal to execute the application based on the information of the application.

9. The mobile terminal of claim 1, wherein the information of the motion of the wearable device comprises a direction, a size, and a velocity of a movement of the wearable device.

10. The mobile terminal of claim 1, wherein the controller is configured to magnify or reduce the information on the motion of the wearable device by a predetermined ratio.

11. A method of operating a mobile terminal, the method comprising:

receiving a notification message regarding at least one application installed on the mobile terminal, when the mobile terminal is in a locked state;

displaying the notification message regarding the at least one application;

sensing a motion of the mobile terminal;

requesting, by transmitting a request to a wearable device corresponding to the mobile terminal, information of a motion of the wearable device;

receiving, from the wearable device corresponding to the mobile terminal, the information of the motion of the wearable device and information indicating a state of the wearable device, the motion of the wearable device being sensed during a time period;

determining whether a correlation between a direction of the motion of the mobile terminal and a direction of the motion of the wearable device is greater than a threshold;

changing a state of the mobile terminal from the locked state, in which a screen of the mobile terminal is deactivated or a lock screen is displayed by the mobile terminal, to an unlocked state, in response to the determining that the correlation between the direction of the motion of the mobile terminal and the direction of the motion of the wearable device is greater than the threshold and in response to determining that the state of the wearable device is an unlocked state according to the received information indicating the state of the wearable device; and automatically executing the at least one application related to the notification message in the unlocked state, when the state of the mobile terminal is changed from the locked state to the unlocked state based on the direction of the motion of the wearable device and the state of the wearable device, wherein the method further comprises:
recognizing that the wearable device is within a distance range from the mobile terminal, and
displaying a message notifying that the mobile terminal may be unlocked if the motion of the mobile terminal and the motion of the wearable device are the same or similar, in response to the recognizing that the wearable device is within the distance range.

12. The method of claim 11, wherein the sensing comprises sensing the motion of the mobile terminal during a time period identical to the time period during which the motion of the wearable device is sensed.

13. The method of claim 11, further comprising determining whether the motion of the mobile terminal and a motion set in advance have a correlation greater than a threshold,
wherein the requesting comprises requesting, from the wearable device, the information of the motion of the wearable device, in response to the determining that the motion of the mobile terminal and the motion set in advance have the correlation greater than the threshold.

14. The method of claim 11, further comprising performing an operation corresponding to an operation that the wearable device is performing, in response to the determining that the direction of the motion of the mobile terminal and the direction of the motion of the wearable device have the correlation greater than the threshold.

15. The method of claim 11, further comprising:
receiving, from the wearable device, information of content that the wearable device is reproducing, in response to the determining that the direction of the motion of the mobile terminal and the direction of the motion of the wearable device have the correlation greater than the threshold; and
reproducing the content based on the information of the content.

16. The method of claim 11, further comprising:
receiving, from the wearable device, information of a web page that the wearable device is displaying, in response to the determining that the direction of the motion of the mobile terminal and the direction of the motion of the wearable device have the correlation greater than the threshold; and
displaying the web page based on the information of the web page.

17. The method of claim 11, further comprising:
receiving, from the wearable device, information of a call the wearable device is connecting, in response to the determining that the direction of the motion of the mobile terminal and the direction of the motion of the wearable device have the correlation greater than the threshold; and
connecting the call based on the information of the call.

18. The method of claim 11, further comprising:
receiving, from the wearable device, information of an application corresponding to a message the wearable device receives, in response to the determining that the direction of the motion of the mobile terminal and the direction of the motion of the wearable device have the correlation greater than the threshold; and executing the application based on the information of the application.

19. A mobile terminal comprising:
a display configured to display a received notification message regarding at least one application installed on the mobile terminal, when the mobile terminal is in a locked state;
a sensor configured to sense an input for unlocking the mobile terminal, and a motion of the mobile terminal;
a communication interface configured to:
transmit, to a wearable device corresponding to the mobile terminal, a request for a motion of the wearable device, in response to the sensor sensing the input; and
receive, from the wearable device, information of the motion of the wearable device and information indicating a state of the wearable device, the motion of the wearable device being sensed during a time period; and
a controller configured to:
determine whether a correlation between a direction of the motion of the mobile terminal and a direction of the motion of the wearable device is greater than a threshold;
change a state of the mobile terminal from the locked state, in which a screen of the mobile terminal is deactivated or a lock screen is displayed by the mobile terminal, to an unlocked state, in response to determining that the correlation between the direction of the motion of the mobile terminal and the direction of the motion of the wearable device is greater than the threshold and in response to determining that the state of the wearable device is an unlocked state according to the received information indicating the state of the wearable device; and
automatically execute the at least one application related to the notification message in the unlocked state, when the state of the mobile terminal is changed from the locked state to the unlocked state based on the direction of the motion of the wearable device and the state of the wearable device,
wherein the controller is further configured to recognize that the wearable device is within a distance range from the mobile terminal, and
wherein the display is configured to display a message notifying that the mobile terminal may be unlocked if the motion of the mobile terminal and the motion of the wearable device are the same or similar, in response to the controller recognizing that the wearable device is within the distance range.

20. The mobile terminal of claim 19, wherein the input comprises a hold and a lift of the mobile terminal.

21. The mobile terminal of claim 19, wherein the sensor is further configured to sense the motion of the mobile terminal during a time period identical to the time period during which the motion of the wearable device is sensed.

22. The mobile terminal of claim 19, wherein the request includes information indicating the time period comprising a start time and an end time.

* * * * *